(12) United States Patent
Wakahara et al.

(10) Patent No.: US 7,898,583 B2
(45) Date of Patent: Mar. 1, 2011

(54) IMAGE PROCESSING DEVICE, IMAGE PROCESSING METHOD, AND IMAGE SENSING APPARATUS

(75) Inventors: Junya Wakahara, Habikino (JP); Kazuchika Sato, Kobe (JP); Koichi Kamon, Otokuni-gun (JP)

(73) Assignee: Konica Minolta Holdings, Inc., Tokyo (JP)

( * ) Notice: Subject to any disclaimer, the term of this patent is extended or adjusted under 35 U.S.C. 154(b) by 534 days.

(21) Appl. No.: 11/824,741

(22) Filed: Jul. 2, 2007

(65) Prior Publication Data

US 2008/0122953 A1 May 29, 2008

(30) Foreign Application Priority Data

Jul. 5, 2006 (JP) ............................. 2006-185415

(51) Int. Cl.
*H04N 5/208* (2006.01)
*G06K 9/40* (2006.01)

(52) U.S. Cl. .................... 348/252; 382/263; 382/266

(58) Field of Classification Search ................ 348/252, 348/254, 255, 354, 355; 382/255, 260–266
See application file for complete search history.

(56) References Cited

U.S. PATENT DOCUMENTS

| | | | | |
|---|---|---|---|---|
| 4,057,828 A * | 11/1977 | Monahan | ............... | 348/675 |
| 4,473,845 A * | 9/1984 | Davy | ............... | 348/616 |
| 4,561,022 A * | 12/1985 | Bayer | ............... | 348/622 |
| 5,526,446 A * | 6/1996 | Adelson et al. | ............... | 382/275 |
| 6,259,426 B1 * | 7/2001 | Harada et al. | ............... | 345/581 |
| 7,061,529 B2 * | 6/2006 | Nakamura | ............... | 348/222.1 |
| 7,302,104 B2 * | 11/2007 | Suino | ............... | 382/240 |
| 7,308,153 B1 * | 12/2007 | Wang | ............... | 382/262 |
| 7,355,755 B2 * | 4/2008 | Suino et al. | ............... | 358/3.15 |
| 2001/0035969 A1 * | 11/2001 | Kishimoto | ............... | 358/1.9 |
| 2006/0093233 A1 * | 5/2006 | Kano et al. | ............... | 382/254 |

FOREIGN PATENT DOCUMENTS

| | | | |
|---|---|---|---|
| JP | 2000-134625 A | 5/2000 | |
| JP | 2001-298621 A | 10/2001 | |

* cited by examiner

*Primary Examiner*—Sinh Tran
*Assistant Examiner*—Mark Monk
(74) *Attorney, Agent, or Firm*—Sidley Austin LLP

(57) ABSTRACT

An image processing device includes: a frequency divider for performing a frequency division processing of dividing an input image into a plurality of frequency components each having a frequency band; a noise remover for performing a noise component removal processing of removing a noise component from a high frequency component in the frequency components each having the frequency band obtained by the frequency division processing by the frequency divider; an edge preservation information calculator for detecting an edge intensity based on a low frequency component in the frequency components each having the frequency band obtained by the frequency division processing by the frequency divider, and calculating edge preservation information relating to a degree of preserving an edge component based on the detected edge intensity; an edge preserving section for preserving the edge component in the high frequency component, based on the edge preservation information calculated by the edge preservation information calculator; and a frequency synthesizer for synthesizing the high frequency component whose noise component is removed by the noise remover and whose edge component is preserved by the edge preserving section, and the low frequency component, in each of the frequency bands.

25 Claims, 25 Drawing Sheets

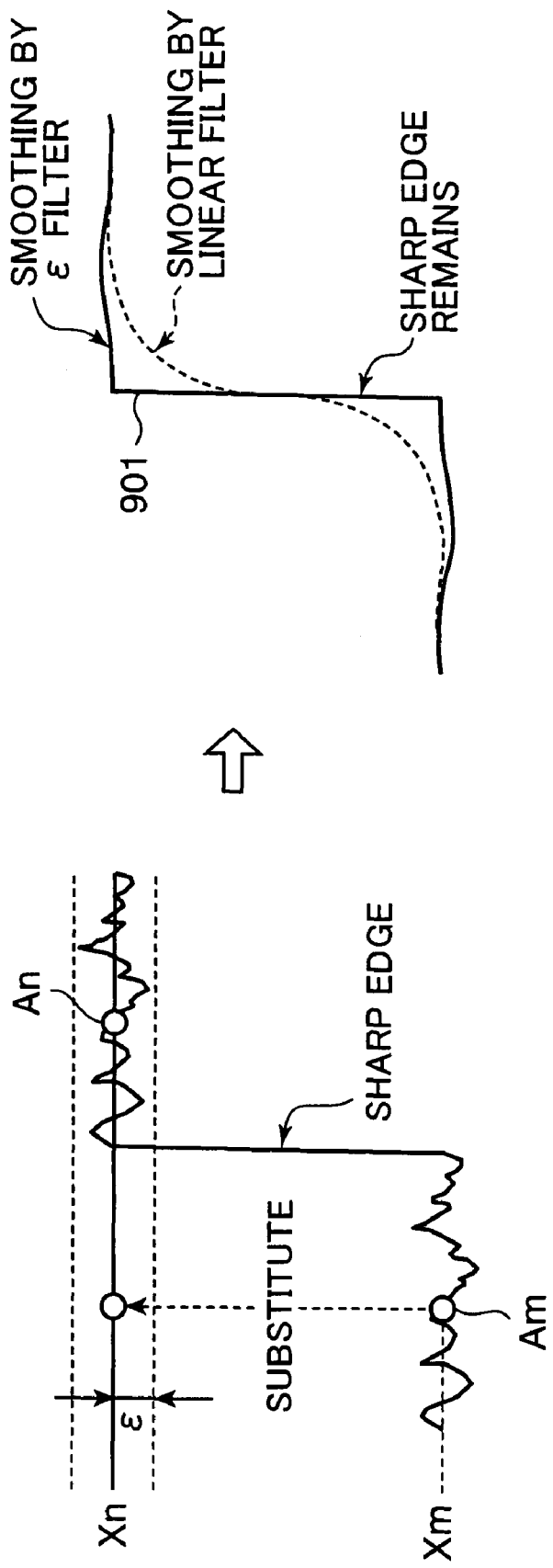

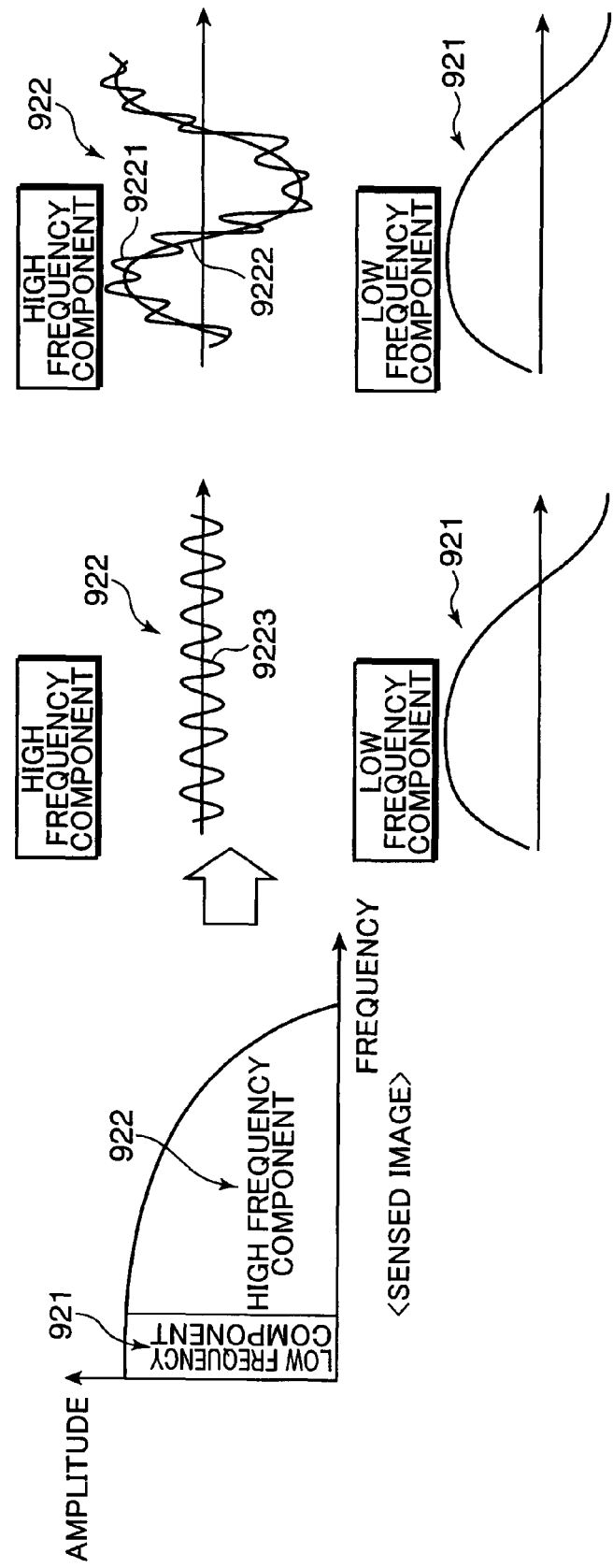

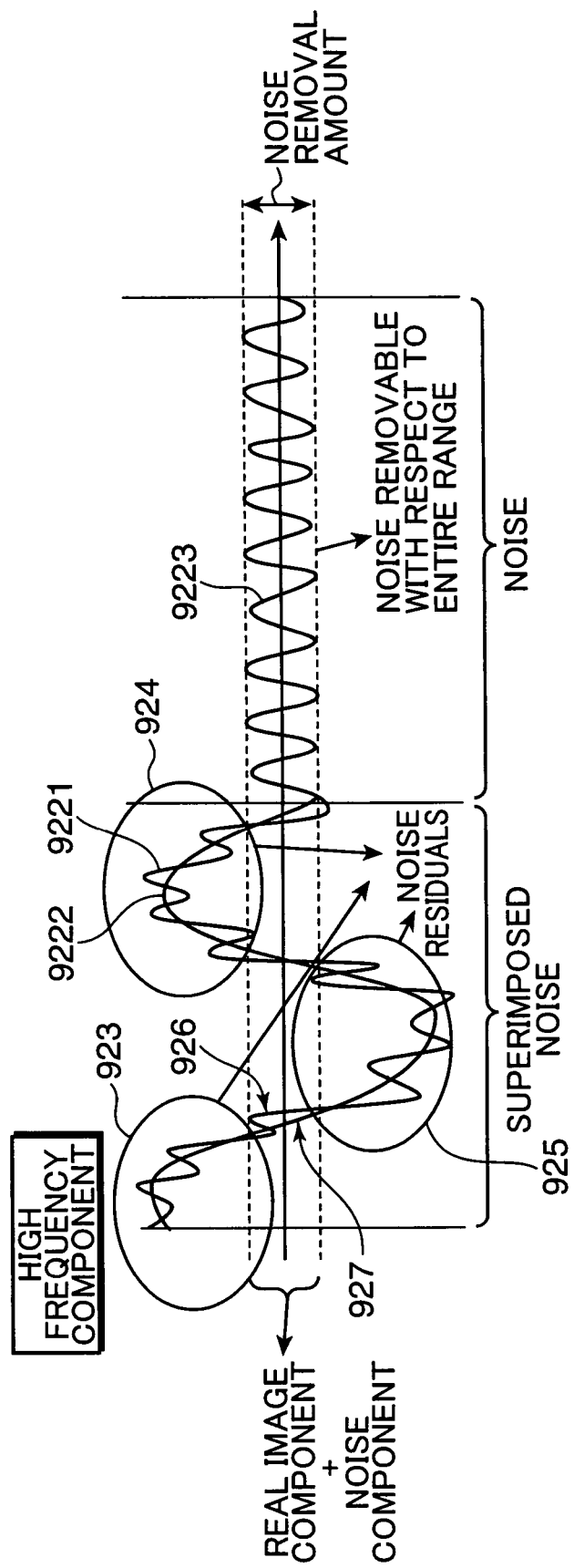

IMAGE PROCESSING DEVICE, IMAGE PROCESSING METHOD, AND IMAGE SENSING APPARATUS

This application is based on Japanese Patent Application No. 2006-185415 filed on Jul. 5, 2006, the contents of which are hereby incorporated by reference.

BACKGROUND OF THE INVENTION

1. Field of the Invention

The present invention relates to an image processing device capable of removing noise from an image, and more particularly to an image processing device that enables to remove noise from a wide dynamic range image obtained by an image sensing apparatus capable of performing a wide dynamic range imaging, an image processing method, and an image sensing apparatus using the image processing method.

2. Description of the Related Art

An image sensing apparatus such as a digital camera is provided with a predetermined image sensor to capture an image by an imaging operation of the image sensor. Generally, an image i.e. an image signal captured by an image sensor includes a noise component resulting from e.g. a dark current inherent to the image sensor. In response to a recent demand for a high-quality image, it is required to finely remove the noise component.

As an example of the conventional noise removal methods, there is known a method, as shown in FIG. 25, comprising: isolating a high-frequency component 922 including a noise component, or as a noise component by subtracting a low-frequency component 921 which does not include the noise component and is extracted by an LPF (low-pass filter) processing, from the captured image; and performing a noise removal processing i.e. a noise component removal processing such as a coring processing with respect to the high-frequency component 922 to remove the noise component. It is highly likely that the high-frequency component 922 which is isolated as the frequency component including noise may include a frequency component as a real component of the image i.e. a high-frequency component 9222, in other words, frequency noise is superimposed. The high-frequency component 9222 is a component whose frequency is higher than that of the low-frequency component 921, but is lower than that of a high-frequency component 9221, or a high-frequency component 9223 substantially equal to the high-frequency component 9221 in frequency level. If the noise removal is performed by the conventional method, the real image component may also be removed with the noise component.

FIG. 26 is a diagram showing the high-frequency components 9221, 9222, and 9223 on the same drawing for convenience of explanation. As shown in FIG. 26, the high-frequency components 9221 and 9223 are noise components, and the high-frequency component 9222 is an edge component, which is a real image component. In the case where a noise removal amount is set, and the noise component in the range of the noise removal amount is removed, it is possible to remove the entirety of the right-side-located high-frequency component 9223 without any processing. However, concerning the left-side-located high-frequency components 9221 and 9222, it is impossible to remove the noise component at the portions indicated by e.g. the reference numerals 923, 924, and 925, because these portions 923, 924, and 925 are out of the range of the noise removal amount. Further, if the portion of the high-frequency component 9221 indicated by e.g. the reference numeral 926 is attempted to be removed, because the portion 926 is in the range of the noise removal amount, an edge portion indicated by the reference numeral 927 i.e. the high-frequency component 9222 is also removed.

In view of the above, as a method for removing a noise component while preserving an edge component, there is disclosed a technique in e.g. Japanese Unexamined Patent Publication No. 2001-298621 (D1). D1 discloses a method comprising: generating a low-frequency component whose edge component is preserved by an epsilon filter processing using $\epsilon$ filters arranged in series; and performing a coring processing with respect to a high-frequency component generated by subtracting the low frequency component from an original image for noise removal. The epsilon filter processing is not a processing to be executed by hierarchical steps, which will be described later. With use of the technique, the low-frequency component can be extracted from the original image in such a manner that the edge component is included in the low-frequency component. In other words, the edge component is not included in the high-frequency component to be removed as the noise component. Accordingly, the edge component is preserved without being affected by the noise removal processing. However, in this technique, if superimposed noise that the noise component is superimposed over the real image component is included, it is impossible to exclusively remove the noise component from the superimposed noise.

In light of the above drawback, e.g. Japanese Unexamined Patent Publication No. 2000-134625 (D2) discloses a method comprising: dividing a high-frequency component including a superimposed noise component into plural frequency components; and isolating the noise component from the real image component for noise removal. Specifically, this method comprises: in performing a frequency band division processing of dividing an input image into plural frequency components i.e. frequency band components, referring to a high frequency component i.e. a middle frequency component generated by a succeeding division processing with respect to a high-frequency component to be removed as a noise component; and changing the currently generated high-frequency component based on a normalization coefficient to be used in edge detection, which has been calculated based on a maximal value of the succeedingly generated high-frequency component. The normalization coefficient is a coefficient having a property that the coefficient is set to a large value if the edge component is detected, and is set to a small value if the edge component is not detected. The edge component is preserved by multiplying the normalization coefficient with the high-frequency component to be removed as the noise component, and the noise component other than the edge component is removed. Thus, the noise component is isolated from the real image component in the high-frequency component by the frequency band division processing in calculating the normalization coefficient. Thus, the noise component is exclusively removed, even if the superimposed noise is included.

In recent years, as the high quality image is demanded in the technical field of image sensing apparatuses such as digital cameras, there is a task of increasing a luminance range i.e. a dynamic range of a subject to be handled by an image sensor. Concerning the technique of increasing the dynamic range, there are known e.g. an image sensor using logarithmic compression i.e. a logarithmic sensor, and a linear-logarithmic sensor. The logarithmic sensor is constructed in such a manner that an electric signal commensurate with an incident light amount is logarithmically transformed and outputted. The linear-logarithmic sensor has a photoelectric conversion characteristic including a linear characteristic that an electric signal is linearly transformed and outputted in a low luminance area, and a logarithmic characteristic that the electric signal is logarithmically transformed and outputted in a high luminance area. An image which is captured by the linear-logarithmic sensor, and has the linear characteristic and the logarithmic characteristic of the linear-logarithmic sensor is called a "linear-logarithmic image". With use of these image sensors, a naturally logarithmically transformed output is obtained with respect to the incident light amount. Accordingly, these image sensors are advantageous in capturing an image having a wider dynamic range, by a one-time exposure operation, as compared with an image sensor having a photoelectric conversion characteristic merely with a linear characteristic.

In the current technology, whereas a wide dynamic range is secured in an imaging system, as an imaging device such as the linear-logarithmic sensor has been developed, a wide dynamic range is not secured in a display system i.e. an image display device such as a monitor, as compared with the imaging system. Even if a wide dynamic range is secured in the imaging system, the effect of the wide dynamic range cannot be satisfactorily exhibited on the display system having a relatively narrow dynamic range, as compared with the imaging system. In other words, a captured image with a wide dynamic range is compressed in conformity with the dynamic range of the display system such as the monitor. Accordingly, a resultantly obtained image has a low contrast, which obstructs proper reproduction i.e. display of the captured image.

In view of the above, it is required to perform a gradation conversion processing i.e. a contrast emphasis processing such as dynamic range compression processing of e.g. extracting an illumination component and a reflectance component from a captured image, and compressing the illumination component so that the captured image with a wide dynamic range is displayed in the dynamic range of the display system. In the specification and the claims, an image with a wide dynamic range which requires a gradation conversion processing such as a dynamic range compression processing to reproduce the image on a display system having a narrow dynamic range, and consequently requires a gradation conversion processing such as a dynamic range compression processing with a larger compression rate e.g. a larger amplitude rate or a larger gradation conversion rate, as compared with an ordinary compression processing, is referred to as a "wide dynamic range image".

In the wide dynamic range image, the noise component as well as the real image component is greatly amplified by the gradation conversion processing. As a result, the noise is emphasized, as compared with an image having an ordinary dynamic range. (not a wide dynamic range) i.e. an ordinary dynamic range image or a standard dynamic range image. The techniques disclosed in D1 and D2 involve the following drawbacks, which are not involved in processing the ordinary dynamic range image by the conventional noise removal processing.

Specifically, in the technique disclosed in D1, it is impossible to isolate the noise component from the superimposed noise in a condition that the noise component is superimposed on the real image component, and accordingly, it is impossible to exclusively remove the noise component from the superimposed noise. However, as far as the ordinary dynamic range image is processed, a serious drawback is not involved, because the noise component with respect to the real image component is negligibly small. However, in the case where the wide dynamic range image is processed, it is highly likely that the noise component with respect to the real image component may be significantly large. As a result, the noise component in the image may be intolerably large.

In the technique disclosed in D2, as mentioned above, the succeedingly generated high-frequency component in the frequency band division processing is referred to for calculating the normalization coefficient to be used in edge detection. The high-frequency component is a component to be isolated in extracting the noise component in the noise removal processing. Therefore, it is highly likely that the noise component may remain in the high-frequency component. The edge component is preserved by referring to the high-frequency component. Accordingly, the noise component may be erroneously detected and preserved as the edge component. If such a phenomenon occurs, the noise component may adversely affect the image because it is highly likely that the noise component is non-negligibly large in the wide dynamic range image.

SUMMARY OF THE INVENTION

In view of the above problems residing in the conventional examples, it is an object of the present invention to provide an image processing device that enables to finely remove a noise component with less or no influence of the noise component in an image (i.e. to secure improved noise removal performance), and enables to finely preserve an edge component without likelihood that the noise component may be erroneously detected and preserved as the edge component (i.e. to secure improved edge preservation performance), and consequently enables to obtain a high-quality image, as well as an image processing method, and an image sensing apparatus using the image processing method.

An image processing device according to an aspect of the invention includes: a frequency divider for performing a frequency division processing of dividing an input image into a plurality of frequency components each having a frequency band; a noise remover for performing a noise component removal processing of removing a noise component from a high-frequency component in the frequency components in the respective frequency bands obtained by the frequency division processing by the frequency divider; an edge preservation information calculator for detecting an edge intensity based on a low-frequency component in the frequency components in the respective frequency bands obtained by the frequency division processing by the frequency divider, and calculating edge preservation information relating to a degree of preserving an edge component based on the detected edge intensity; an edge preserving section for preserving the edge component in the high-frequency component, based on the edge preservation information calculated by the edge preservation information calculator; and a frequency synthesizer for synthesizing the high-frequency component whose noise component is removed by the noise remover and whose edge component is preserved by the edge preserving section, and the low frequency component, in each of the frequency bands.

These and other objects, features and advantages of the present invention will become more apparent upon reading the following detailed description along with the accompanying drawing.

BRIEF DESCRIPTION OF THE DRAWINGS

FIG. 24 is a schematic diagram for describing an edge component of an image in the case where an LPF processing using an epsilon filter is performed according to the conventional art.

FIGS. 25 and 26 are schematic diagrams for describing a conventional noise removal processing.

DETAILED DESCRIPTION OF THE PREFERRED EMBODIMENTS

First Embodiment

Figure 1:
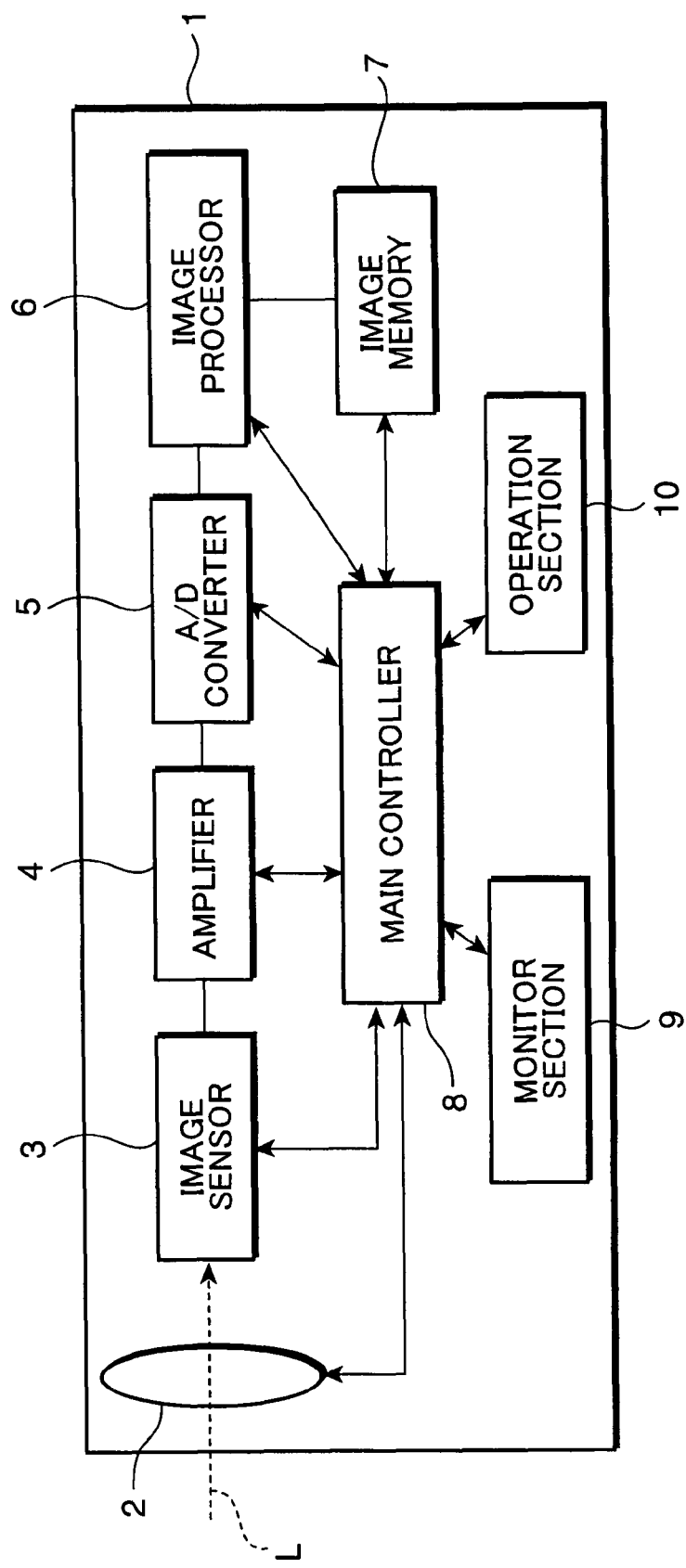
FIG. 1 is a block diagram primarily showing an imaging process to be executed by a digital camera, as an example of an image sensing apparatus to which an image processing device of a first embodiment of the invention is applied.

FIG. 1 is a block diagram primarily showing an imaging process to be executed by a digital camera, as an example of an image sensing apparatus to which an image processing device of a first embodiment of the invention is applied. As shown in FIG. 1, the digital camera 1 includes a lens section 2, an image sensor 3, an amplifier 4, an A/D converter 5, an image processor 6, an image memory 7, a main controller 8, a monitor section 9, and an operation section 10.

The lens section 2 functions as a lens aperture for taking subject light i.e. a light image, and serves as an optical lens system for guiding the subject light toward the image sensor 3 disposed in the interior of the camera body. The optical lens system is e.g. a lens group arranged in series along an optical axis L of the subject light, and including e.g. a zoom lens, a focus lens, and other fixed lens blocks. The lens section 2 includes a diaphragm (not shown) and a shutter (not shown) for adjusting a light transmission amount through the lens elements. The lens section 2 is so constructed that the diaphragm and the shutter are driven by the main controller 8.

Figure 4:
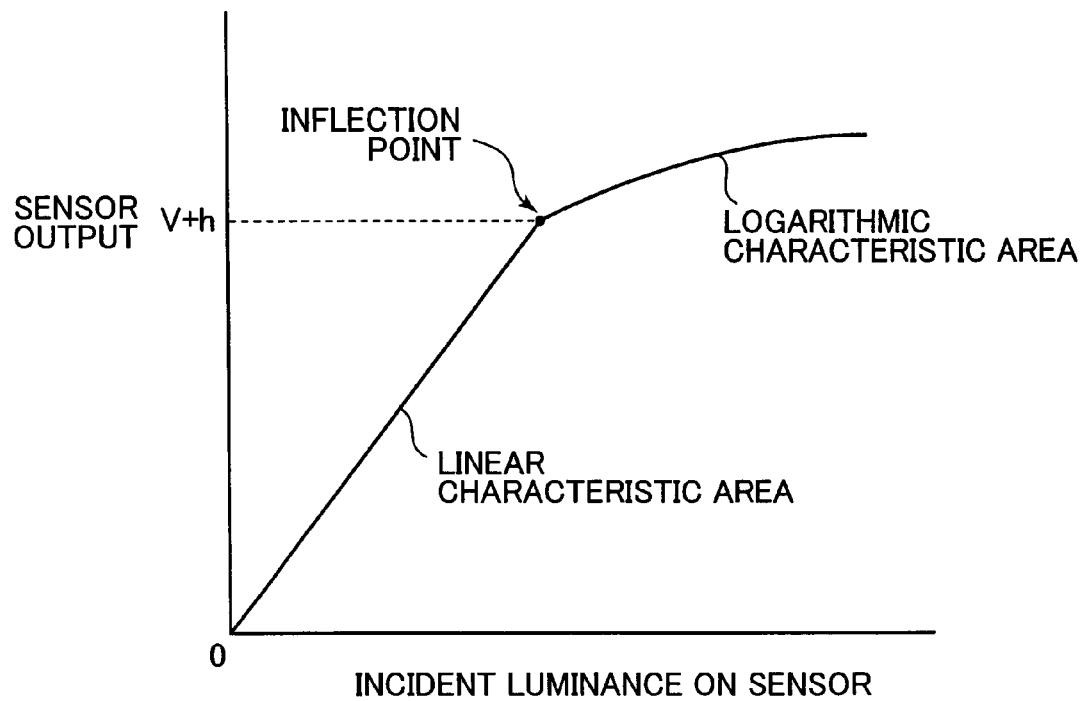
FIG. 4 is a graph showing a photoelectric conversion characteristic of the image sensor shown in FIG. 1.

The image sensor 3 is adapted to photoelectrically convert the subject light into image signals of respective colors components of R (red), G (green), and B (blue) commensurate with the light amount of the subject image formed in the lens section 2 for outputting the image signals to the amplifier 4 to be described later. In this embodiment, the image sensor 3 is a solid-state image sensor having a photoelectric conversion characteristic having different characteristic areas i.e. a photoelectric conversion characteristic, as shown in FIG. 4, including: a linear characteristic area where an output pixel signal i.e. an output electrical signal generated by photoelectric conversion is linearly transformed and outputted when the incident luminance of the light image obtained by the image sensor 3 is low, namely, the light image is dark; and a logarithmic characteristic area where the output pixel signal is logarithmically transformed and outputted when the incident luminance of the light image is high, namely, the light image is bright. In other words, the image sensor 3 has a photoelectric conversion characteristic with a linear curve in a low luminance range, and a logarithmic curve in a high luminance range. The image sensor 3 is also called as a "linear-logarithmic sensor". The image sensor 3 is also selectively settable to a photoelectric conversion characteristic merely having a linear characteristic or a logarithmic characteristic, in place of the photoelectric conversion characteristic having the linear/logarithmic characteristic. Also, a switching point (hereinafter, called as "inflection point") between the linear characteristic area and the logarithmic characteristic area of the photoelectric conversion characteristic is controllable based on a predetermined control signal applied to the respective pixel circuits of the image sensor 3 by e.g. changing a magnitude of a voltage difference between high (Hi) and low (Low) of a certain DC voltage to be used in driving a MOSFET to be described later.

Figure 2:
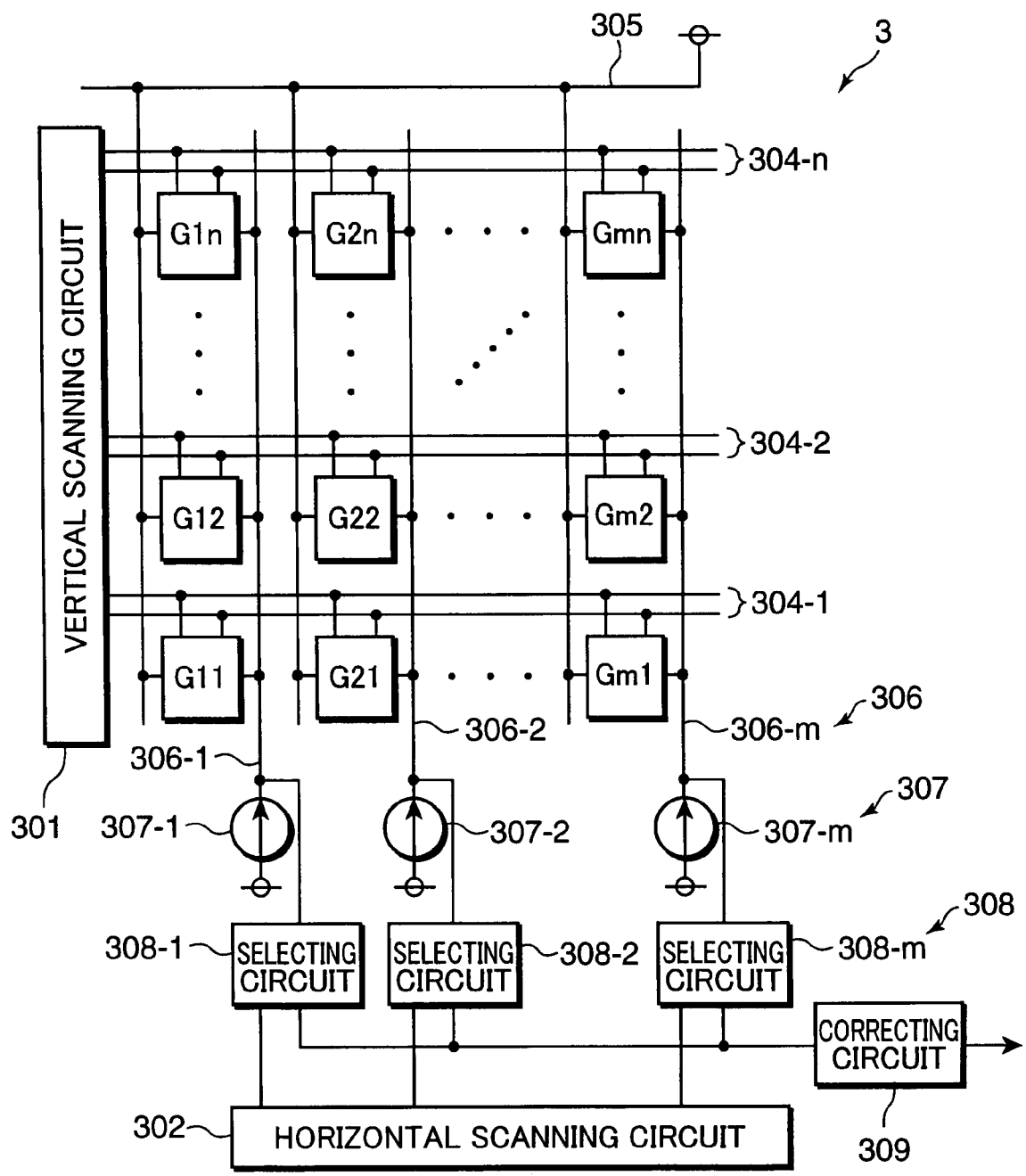
FIG. 2 is a diagram schematically showing a CMOS image sensor, as a two-dimensional MOS solid-state image sensor, as an example of an image sensor shown in FIG. 1.

FIG. 2 is a diagram schematically showing a CMOS image sensor, as a two-dimensional MOS solid-state image sensor, as an example of the image sensor 3. In FIG. 2, G11 through Gmn denote pixels arranged in a matrix pattern. A vertical scanning circuit 301 and a horizontal scanning circuit 302 are arranged near a perimeter of the pixel section constituted of the pixels G11 through Gmn. The vertical scanning circuit 301 sequentially scans signal lines 304-1, 304-2, ..., and 304-n (generically called as "row signal lines 304") arranged in a row direction. The horizontal scanning circuit 302 sequentially reads photoelectric conversion signals outputted from the respective pixels through output signal lines 306-1, 306-2, ..., and 306-m (generically called as "output signal lines 306") in a horizontal direction, pixel by pixel. An electric power is supplied to the pixels through a power source line 305 from a power source (not shown). Signal lines e.g. clock signal lines other than the row signal lines 304 and the output signal lines 306 are connected to the pixels, but are not illustrated in FIG. 2.

Constant current sources 307-1, 307-2, ..., and 307-m (generically called as "constant current sources 307") each constituting an amplifying circuit with a transistors T12 in pair are provided with respect to the output signal lines 306-1, 306-2, ..., and 306-m, respectively. A resistor or a transistor may constitute the amplifying circuit, in place of the constant current source 307. Image data to be used in capturing an image, and correction data to be used in resetting, which are outputted from the pixels via the output signal lines 306, are sequentially outputted to selecting circuits i.e. sample-and-hold circuits 308-1, 308-2, ..., and 308-m (generically called as "selecting circuits 308"). The image data and the correction data are outputted to the selecting circuits 308 row by row for sampling-and-holding. The sampled-and-held image data and correction data are outputted to a correcting circuit 309 column by column. Then, the image data is corrected by the correcting circuit 309, based on the correction data to remove sensitivity variation. After the sensitivity variation with respect to each of the pixels is corrected by the correcting circuit 309, the image data is serially outputted pixel by pixel.

Figure 3:
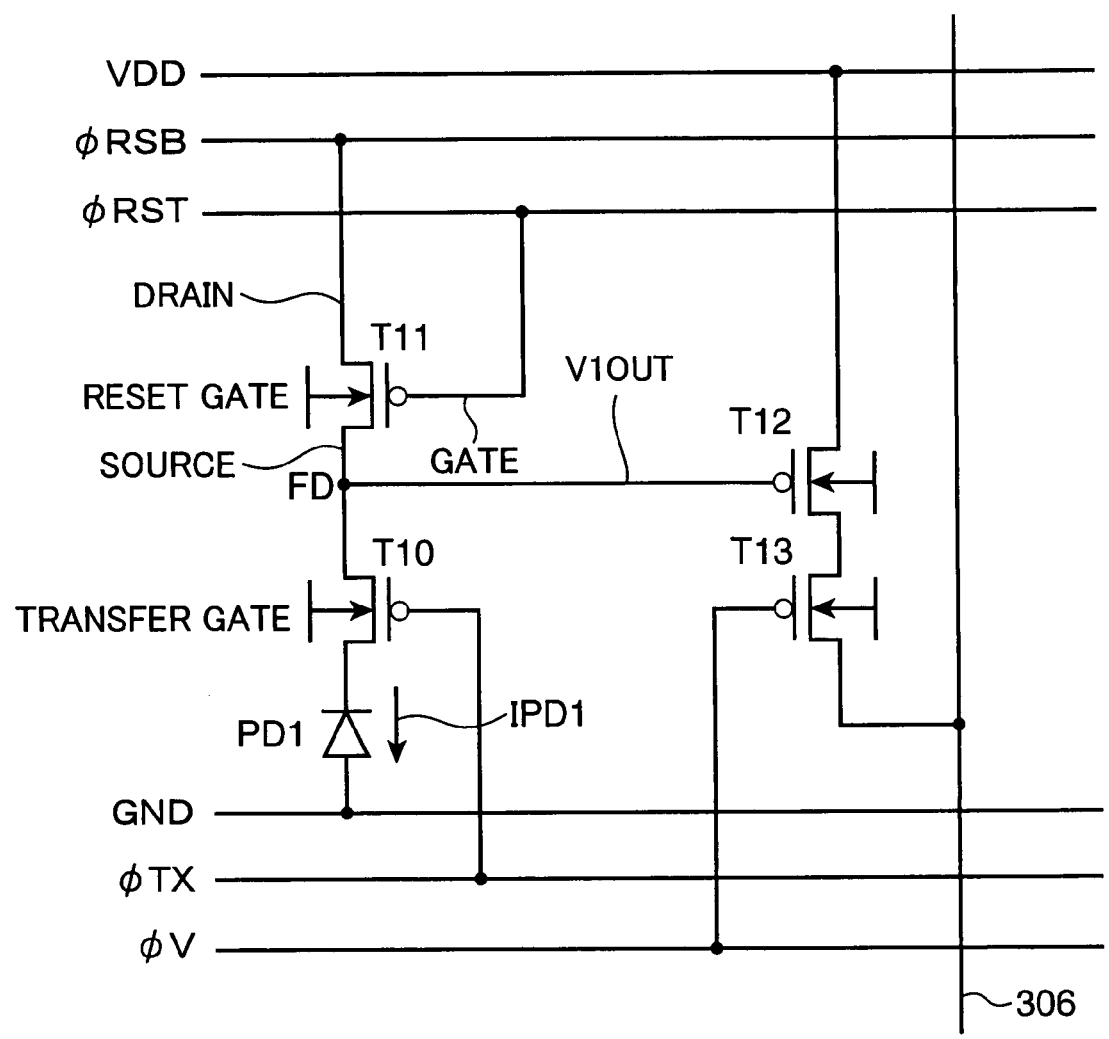
FIG. 3 is a circuit diagram showing an arrangement of each of pixels constituting the image sensor shown in FIG. 2.

FIG. 3 is a circuit diagram showing an arrangement of each of the pixels G11 through Gmn shown in FIG. 2. As shown in FIG. 3, each of the pixels of the image sensor 3 includes a photodiode PD1, transistors T10 through T13 as MOSFETs (Metal Oxide Semiconductor Field Effect Transistors), and an FD (Floating Diffusion). The transistors T10 through T13 each is an N-channel MOSFET in this embodiment. VDD, φRSB, φRST, φTX, and φV denote signals i.e. voltages to be applied to the transistors, and GND denotes the ground.

The photodiode PD1 is a light sensing element i.e. a photoelectric converter, and is adapted to generate an electric signal i.e. a photocurrent IPD1 commensurate with the amount of incident light from a subject. The transistor T12 and the constant current source 307 in pair constitute an amplifying circuit i.e. a source follower amplifier for amplifying a source follower. The transistor T12 amplifies a current with respect to a voltage V1OUT, which will be described later. The transistor T13 is a transistor i.e. a row selection transistor for a signal readout operation, and is operated as a switch to be turned on and off in accordance with the voltage i.e. the signal φV to be applied to the gate. The source of the transistor T13 is connected to the output signal line 306. When the transistor T13 is turned on, a current amplified by the transistor T12 is outputted to the output signal line 306 as an output current.

The transistor T10 is operated as a switch to be turned on and off in accordance with the voltage to be applied to the gate of the transistor T10. The transistor T10 functions as a transfer gate for switching over between transfer and non-transfer of the photocurrent IPD1 i.e. an electric charge generated in the photodiode PD1 to the FD in accordance with an on/off operation corresponding to high/low of the gate potential. The photocurrent IPD1 generated in the photodiode PD1 flows to a parasitic capacitance of the photodiode PD1 to accumulate the electric charge, and a voltage is generated in accordance with the amount of the accumulated charge. In this condition, if the transistor T10 is in an on-state, the charge i.e. a negative charge accumulated in the parasitic capacitance is moved to the FD. The FD is a charge retainer for temporarily retaining the charge i.e. the signal charge. The FD serves as a capacitor for converting the retained charge into a voltage, i.e. performing a charge/voltage conversion.

The transistor T11 i.e. a reset gate transistor is adapted to switch over between application and non-application of a reset bias to the FD in accordance with an on/off operation corresponding to high/low of the gate voltage of the transistor T11. For instance, if the transistor T11 is in an on-state, the transistor T10 is also in an on-state, and a reset bias is applied between φRSB and GND, with the transistor T11, FD, the transistor T10, and the photodiode PD1 being interposed therebetween. By setting the gate voltage to a Mid potential i.e. a potential at an intermediate level, a linear transformation and a logarithmic transformation are performed by charge/voltage conversion by the FD and the transistor T11, respectively, concerning the charge (i.e. the current flowing in the FD) moving from the photodiode PD1 to the FD.

In the above condition, a current i.e. a reset current depending on the Mid potential flows through the transistor T11, and the source of the transistor T11 is set to a potential depending on the reset current. If the potential by the charge moving from the photodiode PD1 is smaller than the source potential of the transistor T11 depending on the Mid potential, in other words, if the luminance of the subject whose image is to be captured is low, i.e. the subject is dark, and the amount of light incident onto the photodiode PD1 is small, a charge/voltage conversion as a linear transformation is performed by the FD. If, on the other hand, the potential by the charge moving from the photodiode PD1 exceeds the source potential of the transistor T11, in other words, if the luminance of the subject whose image is to be captured is high, i.e. the subject is bright, and the amount of light incident onto the photodiode PD1 is large, a charge/voltage conversion as a logarithmic transformation is performed by the transistor T11.

With this arrangement, a voltage as a linear output by an integration value of the photocurrent IPD1 in the FD, or a voltage as a logarithmic output by current/voltage conversion depending on the photocurrent IPD1 in the transistor T11 is obtained at a connection node i.e. as the output V1OUT between the FD and the transistor T12. Specifically, the output value in the linear characteristic area of the photoelectric conversion characteristic is the integration value of the photocurrent IPD1 in the FD. However, concerning the logarithmic characteristic area, a current substantially equal to the photocurrent IPD1 flows in the transistor T11 in an area where the potential by the charge accumulated in the FD exceeds the source current of the transistor T11 i.e. the reset gate, and the voltage value obtained by current/voltage conversion of the photocurrent IPD1 in the transistor T11 is obtained in the FD as an output value. In other words, the charge whose signal is logarithmically compressed is accumulated in the parasitic capacitance. The current/voltage conversion in the transistor T11 corresponds to the aforementioned logarithmic transformation. In this state, when the transistor T13 is turned on, an amplification current in the transistor T12 depending on the respective voltages is derived as an output current through the output signal line 306 via the transistor T13. Thus, an output signal subjected to linear transformation or logarithmic transformation in accordance with a subject luminance i.e. an incident luminance onto the image sensor 3 i.e. a wide dynamic range image is obtained by the image sensor 3.

In this embodiment, the N-channel MOSFET is provided in each of the pixels of the image sensor 3. Alternatively, a P-channel MOSFET may be provided in each of the pixels. Alternatively, the image sensor 3 may be a CMOS image sensor for performing a linear transformation and a logarithmic transformation by utilizing a sub-threshold characteristic of P-channel or N-channel MOSFET, in place of the CMOS image sensor for performing a linear transformation and a logarithmic transformation using the FD. The image sensor 3 maybe a VMIS image sensor, a CCD image sensor, or a like sensing device, in place of the CMOS image sensor.

As mentioned above, the image sensor 3 is capable of performing a wide dynamic range imaging such that an image with a wider dynamic range is obtained, i.e. capturing an image having subject luminance information in a broad luminance range from a low luminance to a high luminance. The image sensor has such a photoelectric conversion characteristic that an output value of the image sensor with respect to the subject luminance in the broad luminance range from the low luminance to the high luminance does not exceed a maximal output value of the image sensor. The image sensor 3 i.e. a linear-logarithmic sensor has a photoelectric conversion characteristic having a feature that the photoelectric conversion characteristic in the high luminance area is logarithmically changed in a gradually increasing manner so that the sensor output does not exceed the maximal output value in a wider luminance range i.e. a subject luminance in a wider luminance range can be captured within the output range of the image sensor. In other words, the image sensor 3 has a photoelectric conversion characteristic that an increase in sensor output level relative to an increase in luminance level is moderate, as the subject luminance approaches the high luminance area where the sensor output value is sharply increased. Alternatively, various image sensors other than the image sensor 3 provided with the aforementioned photoelectric conversion characteristic may be applied, as far as such an image sensor is capable of performing a wide dynamic range imaging.

The amplifier 4 is adapted to amplify the image signal outputted from the image sensor 3. The amplifier 4 includes e.g. an AGC (auto gain control) circuit to adjust a gain of the image signal outputted from the image sensor 3. The amplifier 4 may include a CDS (correlation double sampling) circuit for reducing sampling noise of the image signal as an analog value, in addition to the AGC circuit. The AGC circuit also has a function of compensating insufficiency of output level concerning an image to be photographed in photographing e.g. a subject with an exceedingly low luminance, in the case where a proper exposure is not obtained. The gain with respect to the AGC circuit is set by the main controller 8. The A/D converter 5 performs A/D conversion of converting an image signal of an analog value amplified by the amplifier 4 i.e. an analog signal into an image signal of a digital value i.e. a digital signal. The A/D converter 5 converts a pixel signal obtained by receiving light on the respective pixels of the image sensor 3 into pixel data of e.g. 12 bits.

The image processor 6 performs various image processing with respect to the image signal obtained by the A/D conversion, specifically, color processing such as color interpolation, color correction, and color space conversion, or white balance correction, noise removal processing, or dynamic range compression processing. A feature of this embodiment particularly resides in the noise removal processing among the various image processing. The noise removal processing will be described later in detail.

The image memory 7 is a memory including an ROM (Read Only Memory) and an RAM (Random Access Memory). The image memory 7 is adapted to store data including raw image data before being processed by the image processor 6, and image data during processing or after being processed by the image processor 6 or the main controller 8.

The main controller 8 includes an ROM for storing various control programs, an RAM for temporarily storing various data, and a central processing unit (CPU) for reading the control program and the like from the ROM for execution. The main controller 8 controls entire operations of the digital camera 1. The main controller 8 calculates control parameters necessary for operating the respective parts of the digital camera 1, e.g., an exposure amount control parameter to be used in setting an optimal exposure amount in photographing, or a dynamic range control parameter to be used in setting an optimal dynamic range, based on various signals from the parts of the digital camera 1 such as the image sensor 3 and the operation section 10; and controls the operations of the respective parts by transmitting the control parameters thereto. The exposure amount control is executed by e.g. adjustment of the opening amount of the diaphragm, or adjustment of the shutter speed of the mechanical shutter, or control of an integration time i.e. an exposure time for charge accumulation, which is controlled by a reset operation with respect to the image sensor 3. The dynamic range control is executed by e.g. controlling the switching point i.e. the inflection point between the linear characteristic area and the logarithmic characteristic area of the image sensor 3.

The main controller 8 controls the image sensor 3 and the lens section 2 including the diaphragm and the shutter to perform an imaging operation via e.g. a timing generator or a driving section (both of which are not shown), based on the aforementioned various control parameters. The main controller 8 also controls the monitor section 9 to display e.g. image data stored in the image memory 7, and also controls the image processor 6 to perform the below-mentioned image processing control concerning the noise removal processing, in addition to the aforementioned controls.

The monitor section 9 includes a liquid crystal display (LCD), e.g. a color liquid crystal display device, provided on a rear surface of the digital camera 1. The monitor section 9 is adapted to display an image captured by the image sensor 3, i.e., an image processed by the image processor 6, an image stored in the image memory 7, and the like. The operation section 10 is adapted to allow the user to designate i.e. input an operation with respect to the digital camera 1. The operation section 10 is provided with various operation switches i.e. operation buttons e.g. a power source switch, a release switch, a mode setting switch for setting various photographing modes, and a menu selection switch. For instance, when the release switch is pressed down i.e. turned on, a series of photographing operations comprising: sensing subject light by the image sensor 3; applying a predetermined image processing to image data acquired by the sensing operation; and recording the processed image data in the image memory 7 or a like device are executed.

Figure 5:
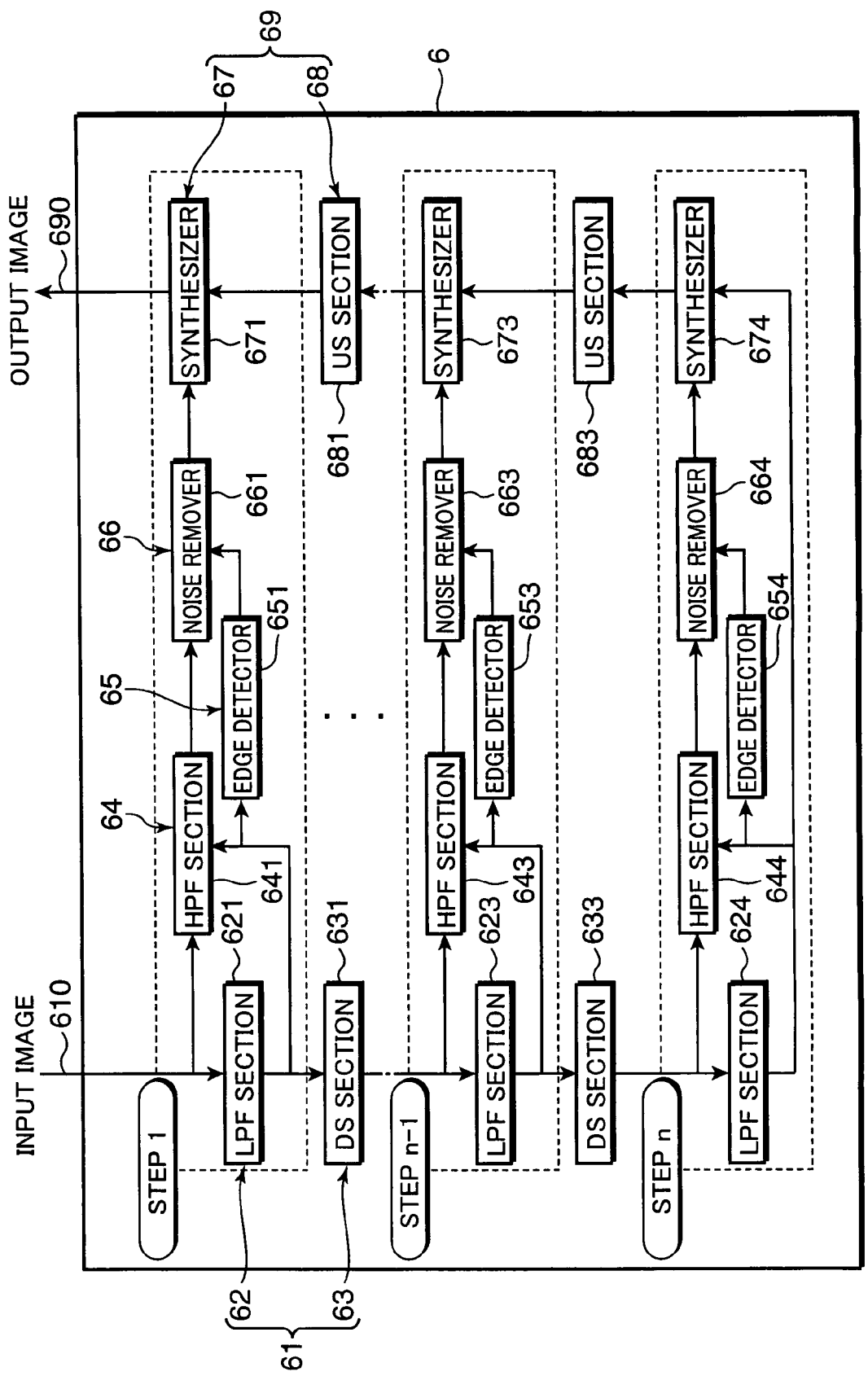
FIG. 5 is a functional block diagram showing a circuit configuration primarily relating to a noise removal processing to be executed by an image processor shown in FIG. 1.

As mentioned above, a wide dynamic range image obtained by the sensing operation of the image sensor 3 is inputted to the image processor 6. Hereinafter, the wide dynamic range image inputted to the image processor 6 is also called as an "input image", according to needs. In the following, the noise removal processing to be executed with respect to the inputted wide dynamic range image by the image processor 6 is described. FIG. 5 is a functional block diagram showing a circuit configuration primarily relating to the noise removal processing to be executed by the image processor 6. As shown in FIG. 5, the image processor 6 includes a frequency divider 61, a high frequency generator 64, an edge detecting unit 65, a noise removing unit 66, and a frequency synthesizing unit 69. Hereinafter, the high frequency generator 64 is also called as "HPF unit 64" according to needs.

First, the aforementioned functional parts are briefly described. The frequency divider 61 divides an input image 610 inputted to the image processor 6 i.e. a two-dimensional wide dynamic range image into plural kinds of frequency components i.e. frequency bands or frequency band components by performing an LPF processing and a downsampling processing with respect to the input image 610 in hierarchical processing steps. By the process of isolating the frequency components i.e. a frequency division processing or a band division processing, an image with a low-frequency component i.e. a low-frequency image is generated each time the processing step is implemented. The high frequency generator 64 generates a high-frequency image in each of the processing steps by subtracting the LPF-processed low-frequency image from the image before the LPF processing is performed in each of the processing steps in the frequency division processing to be executed by the frequency divider 61.

The edge detecting unit 65 performs a detection processing concerning an edge component i.e. an edge detection processing with respect to the LPF-processed low-frequency image in each of the processing steps. The noise removing unit 66 performs a noise removal processing of removing a noise component from an image including a high-frequency component i.e. a high-frequency image, which has been generated by the high frequency generator 64. The frequency synthesizing unit 69 generates a wide dynamic range image free of noise, as a final output image to be outputted from the image processor 6, by performing a synthesis processing i.e. an adding processing and an upsampling processing with respect to a high-frequency image obtained after the noise removal processing is performed in each of the processing steps, and the low-frequency image obtained in the final processing step of the processing steps, which has been generated by the frequency division processing by the frequency divider 61.

Figure 6:
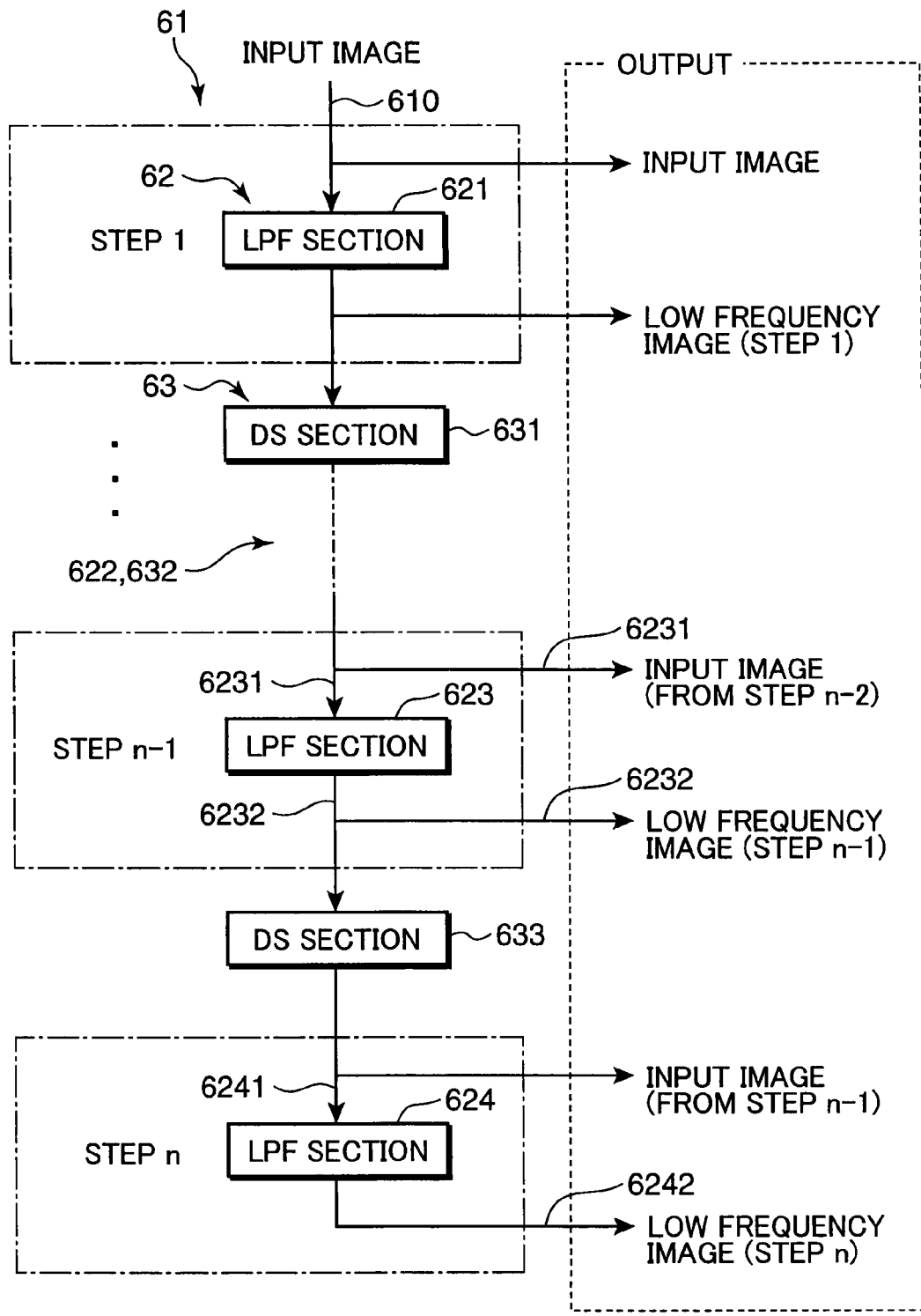
FIG. 6 is a diagram for describing a frequency division processing to be executed by a frequency divider shown in FIG. 5, specifically, a partially enlarged view showing the frequency divider shown in FIG. 5.

The constructions and operations of the aforementioned parts will be described in detail, referring to FIGS. 6 through 11. FIG. 6 is a diagram for describing the frequency division processing to be executed by the frequency divider 61, and specifically, is a partially enlarged view of the frequency divider 61 shown in FIG. 5. As shown in FIG. 6, the frequency divider 61 has an LPF unit 62 for performing the LPF processing, and a DS unit 63 for performing the downsampling (DS) processing. The LPF unit 62 includes LPF sections to be used in the respective processing steps i.e. an LPF section 621 to be used in a processing step 1, an LPF section 622 to be used in a processing step 2, . . . , an LPF section 623 to be used in a processing step (n−1); and an LPF section 624 to be used in a processing step n. The LPF sections 621 through 624 each performs an LPF processing using a low-pass filter with respect to the input image in each of the processing steps, and extracts a low-frequency image in each of the processing steps. For instance, in the processing step (n−1), the LPF section 623 performs an LPF processing with respect to an input image 6231, and extracts a low-frequency image 6232. The input image in this section means an image to be inputted in the corresponding processing step. The input image in the processing step 1 is image data representing an image which has been sent from the image sensor 3 and has not been subjected to an LPF processing. However, the input image in the processing step 2 and thereafter is an LPF-processed low-frequency image. The low-frequency image extracted by the LPF processing is an image to be used in edge detection i.e. an image to be used in calculating an edge preservation coefficient, which will be described later.

The DS unit 63 includes DS sections to be used in the respective processing steps i.e. a DS section 631 to be used in the processing step 1, a DS section 632 to be used in the processing step 2, . . . , and a DS section 633 to be used in the processing step (n−1). Since the processing step n is a final processing step, the DS unit 63 does not includes a DS section corresponding to the processing step n. The DS sections 631 through 633 each performs a DS processing i.e. one-half downsampling of reducing the image size i.e. the pixel number to one-half in row and column directions by e.g. pixel interpolation, with respect to the low-frequency image extracted by the LPF processing in each of the processing steps; and outputs the downsampled image to the LPF section in the succeeding processing step. For instance, in the processing step (n−1), the DS section 633 performs a DS processing with respect to the low-frequency image 6232 after the LPF processing is performed by the LPF section 623, and generates an input image 6241 to be processed in the processing step n. In this embodiment, one-half downsampling is performed. Alternatively, the DS processing may be executed with an arbitrary magnification ratio e.g. one-third, one-fourth, and the like.

Any value is applied to the processing step number i.e. the value "n" in the processing step n. In this embodiment, the number "n" is set to e.g. 4 (n=4). Hereinafter, description is made on the premise that the processing step n is the processing step 4 according to needs. Also, in this embodiment, in the case where the processing step n=4, the LPF processing to be executed by the respective LPF sections is a processing using an LPF of a filter size whose tap number is e.g. "7", in other words, a 7×7 LPF processing. The relation between the processing step number and the tap number may be set in such a manner that in performing 5×5 LPF processing by the LPF processing using the tap number smaller than "7" e.g. "5", the processing step number n may be set to a value larger than "4" e.g. "8". This is because, as the tap number is decreased, the degree of image smoothing to be obtained each time the LPF processing is performed is decreased, which requires increasing the number of times of performing the LPF processing i.e. the number of processing steps. Alternatively, it may be needless to set the processing step number and the tap number to satisfy the aforementioned relation. In other words, the number of the hierarchical processing steps and the tap number of the LPF may be set in such a manner that a low-frequency image to be obtained by the LPF processing by the LPF section is free of residual noise, in other words, a low-frequency component free of noise component can be extracted in the processing step n.

In this way, the frequency divider 61 performs the multiple LPF processing and the multiple downsampling processing in the multiple processing steps from the uppermost processing step 1 to the lowermost processing step 4 stepwise, whereby the input image 610 i.e. the wide dynamic range image is divided into plural frequency images. Repeatedly performing the LPF processing and the DS processing is equivalent to performing the LPF processing while increasing the tap number stepwise.

Figure 7:
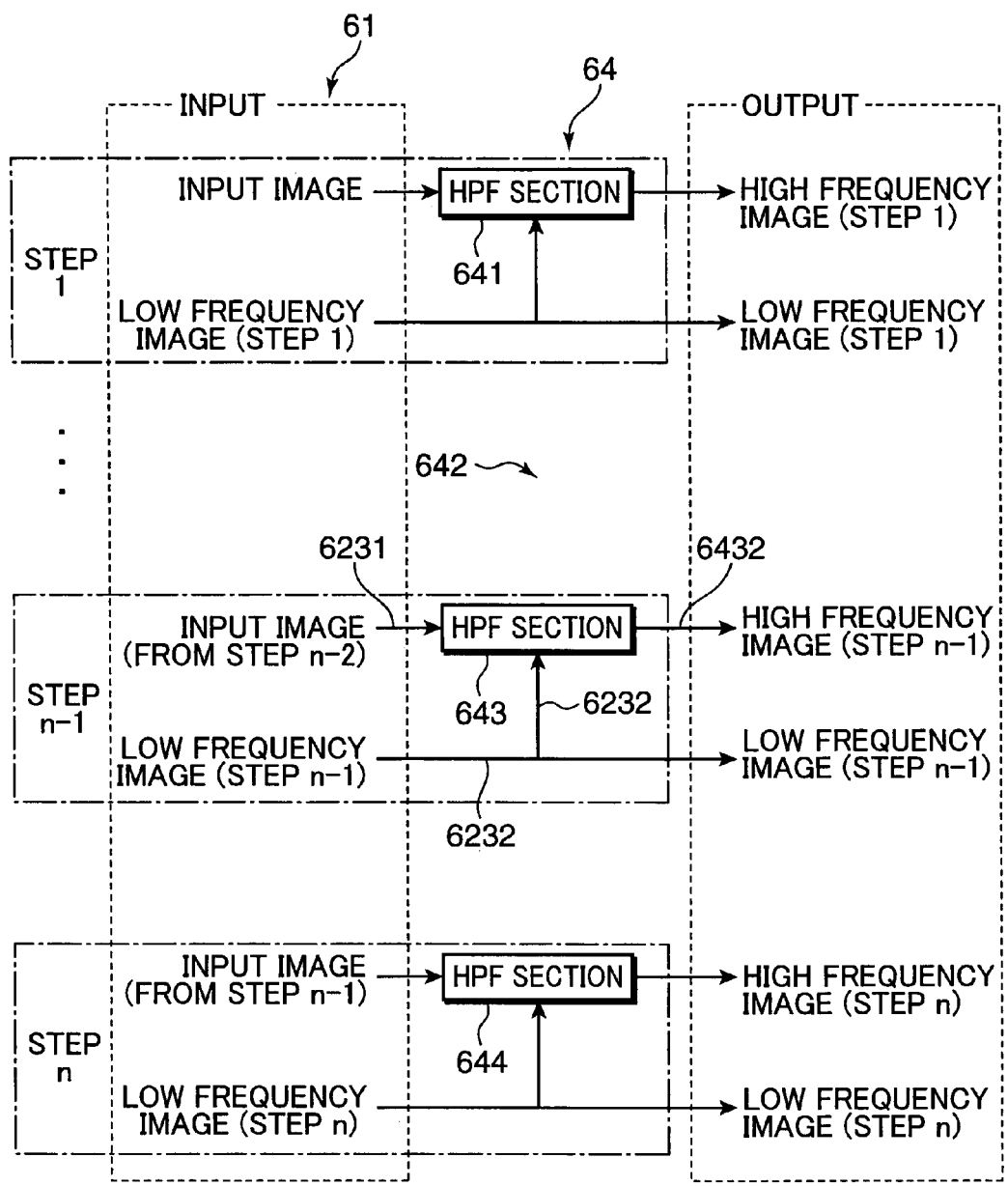
FIG. 7 is a diagram for describing a high frequency generation processing to be executed by a high frequency generator shown in FIG. 5, specifically, a partially enlarged view of the high frequency generator shown in FIG. 5.

FIG. 7 is a diagram for describing a high frequency generation processing to be executed by the high frequency generator 64, and is a partially enlarged view of the high frequency generator 64 shown in FIG. 5. As shown in FIG. 7, the high frequency generator 64 includes HPF sections 641, 642, 643, and 644 to be used in the processing steps 1 through n i.e. 1 through 4, respectively. The HPF sections 641 through 644 each generates i.e. extracts a high-pass-filter (HPF) processed high-frequency image by subtracting a low-frequency image from the input image sent from the frequency divider 61. In other words, the HPF unit 64 obtains a high-frequency image by subtracting an image i.e. a low-frequency image which has been inputted to the LPF unit 62 and is subjected to an LPF processing, from the image before being inputted to the LPF section 62 i.e. before being subjected to the LPF processing. The processing for generating the high-frequency image by the high frequency generator 64 is called a high frequency generation processing.

For instance, in the processing step (n−1) i.e. in the processing step 3, after the input image 6231, which has been outputted from the DS section 632 in the processing step (n−2) preceding the processing step (n−1) i.e. in the processing step 2, and the low-frequency image 6232, which has been outputted from the LPF section 623 are inputted to the HPF section 643, the HPF section 643 subtracts the low-frequency image 6232 from the input image 6231. As a result of the subtraction, the HPF section 643 extracts and outputs a high-frequency image 6432. High-frequency images generated by the respective HPF sections 641 through 644 are an image obtained by isolating a high-frequency component including a noise component i.e. a superimposed noise component from the input image in each of the processing steps. Accordingly, a noise removal processing is performed with respect to each of the high-frequency images in the succeeding processing step. It is possible to isolate the superimposed noise component that could not be isolated by a one-time HPF processing, by performing the multiple HPF processing in the multiple processing steps.

Figure 8:
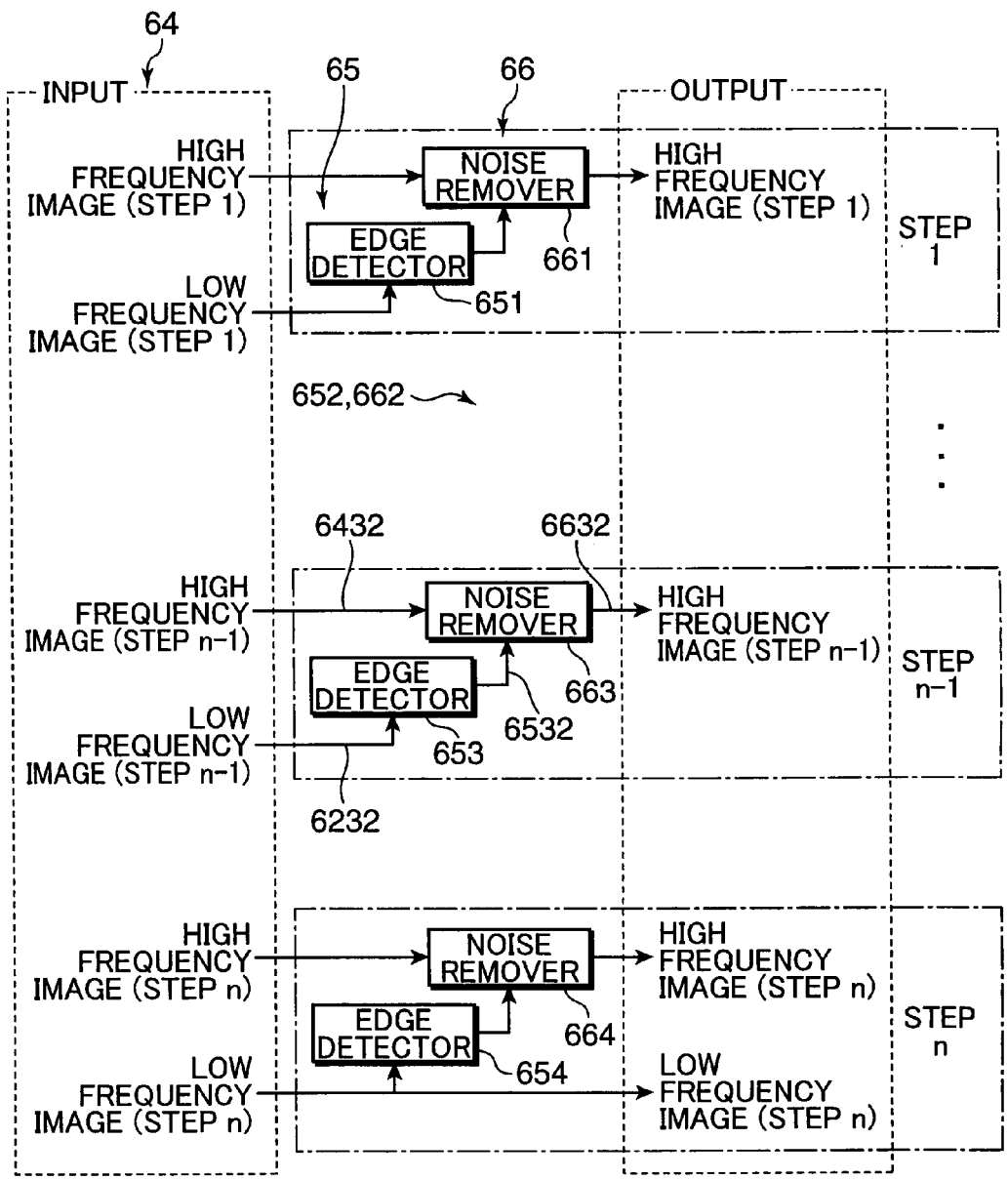
FIG. 8 is a diagram for describing an edge detection processing to be executed by an edge detecting unit shown in FIG. 5, and the noise removal processing to be executed by a noise removing unit shown in FIG. 5, specifically, a partially enlarged view showing the edge detecting unit and the noise removing unit shown in FIG. 5.

FIG. 8 is a diagram for describing the edge detection processing to be executed by the edge detecting unit 65, and the noise removal processing to be executed by the noise removing unit 66, and is a partially enlarged view of the edge detecting unit 65 and the noise removing unit 66 shown in FIG. 5. As shown in FIG. 8, the edge detecting unit 65 includes edge detectors 651, 652, 653, and 654 to be used in the processing steps 1 through 4, respectively, and the noise removing unit 66 includes noise removers 661, 662, 663, and 664 to be used in the processing steps 1 through 4, respectively. The edge detecting unit 65 and the noise removing unit 66 perform a noise removal processing while preserving an edge component in the high-frequency image, which is sent from the HPF unit 64 and includes the noise component. Examples of the edge detection processing to be executed by the edge detecting unit 65 and the noise removal processing to be executed by the noise removing unit 66 are described in the following.

<Edge Detection Processing>

As an edge detection processing, the edge detectors 651 through 654 each calculates an edge intensity of the low-frequency image by performing a filter processing with respect to the low-frequency image, using an edge intensity detection filter e.g. a Sobel filter i.e. an edge intensity detection filter processing in each of the processing steps; and calculates an edge preservation coefficient E based on the information relating to the calculated edge intensity. The information relating to the calculated edge preservation coefficient E is outputted to the noise removers 661 through 664. For instance, the edge detector 653 in the processing step 3 obtains an edge intensity by performing an edge intensity detection filter processing with respect to the low-frequency image 6232 sent from the HPF unit 64, calculates an edge preservation coefficient E based on the edge intensity, and outputs i.e. sends, to the noise remover 663, the information relating to the calculated edge preservation coefficient E, as edge preservation coefficient information 6532. The Sobel filter is adapted to detect a gradient between the pixels in the image, based on differentiation to detect an edge intensity in the image.

(Calculation of Edge Preservation Coefficient)

The edge intensity and the edge preservation coefficient E are calculated as follows. Specifically, the edge detectors 651 through 654 each calculates an edge intensity "e" by performing a filter processing with respect to each of the low-frequency images, using a 3×3 Sobel filter, i.e. by performing a 3×3 Sobel filter processing, wherein the tap number is "3"; and calculates the edge preservation coefficient E with respect to the edge intensity "e" by the following formula (1).

when $e < e1$, $E = 0$, when $e1 < e < e2$, $E = (e-e1)/(e2-e1)$, and when $e > e2$, $E = 1.0$ \hfill (1)

where e1, e2 is a predetermined threshold value to be used in calculating an edge preservation coefficient, i.e. an edge preservation threshold value, and $e1 < e2$.

Figure 9:
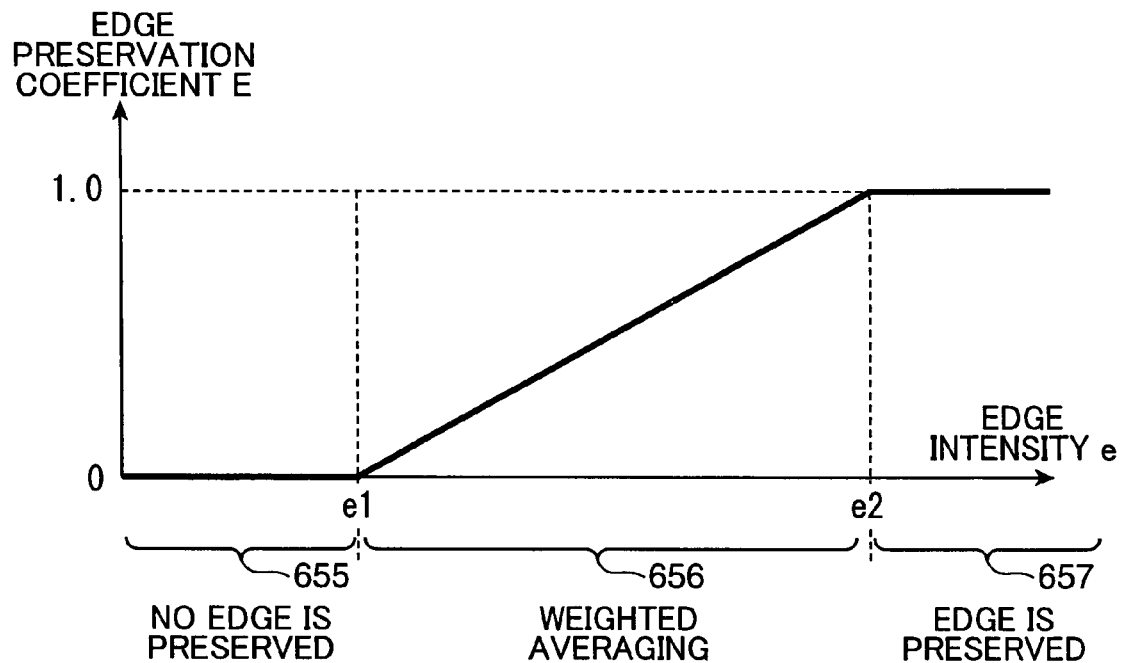
FIG. 9 is a graph showing an example of an edge preserving coefficient to be calculated by the edge detecting unit.

The relation of the formula (1) is expressed in FIG. 9. Referring to FIG. 9, wherein the axis of ordinate represents the edge preservation coefficient E and the axis of abscissas represents the edge intensity "e", the edge preservation coefficient E=0, which represents that the degree of edge preservation is minimal, in the area where the edge intensity "e" indicated by the reference numeral 655 is smaller than e1 i.e. $e < e1$; the edge preservation coefficient E=1.0, which is a maximal value indicating that the degree of edge preservation is maximal, in the area where the edge intensity "e" indicated by the reference numeral 657 is larger than e2 i.e. $e > e2$; and the edge preservation coefficient E is linearly changed from the value "0" to "1.0", with a gradient of $1/(e2-e1)$, in the area where the edge intensity "e" indicated by the reference numeral 656 is larger than e1 and smaller than e2 i.e. $e1 < e < e2$.

The edge preservation threshold value e1, e2 is a value relating to texture of the image to be used in determining to what degree the edge of the image is to be preserved, and is set in advance in each of the processing steps so that the edge of the image is optimally preserved. The edge preservation threshold value e1, e2 may be set in advance in each of the processing steps, or may be set to a common value throughout the processing steps. The latter modification means that the same value is set, although the value is set in each of the processing steps. The information relating to the edge preservation threshold value e1, e2 is stored in the edge detecting unit 65 i.e. the edge detectors 651 through 654. In this embodiment, a 3×3 Sobel filter is used as the edge intensity detection filter, as mentioned above. Alternatively, a Sobel filter whose tap number is other than "3" e.g. larger than "3" may be used, or a filter such as a Prewitt filter may be used.

<Noise Removal Processing>

The noise removers 661 through 664 each performs, as a noise removal processing, a coring processing with respect to the high-frequency image in each of the processing steps. In the coring processing, the noise removers 661 through 664 each performs an edge component preservation processing of preserving an edge component whose coring intensity in the coring processing is decreased, with respect to a pixel whose edge intensity "e" is large, by using the edge preservation coefficient information calculated in the edge detection processing. Concerning a pixel whose edge intensity "e" is small, the degree of edge preservation is decreased by increasing the coring intensity.

<Coring Processing>

Figure 10:
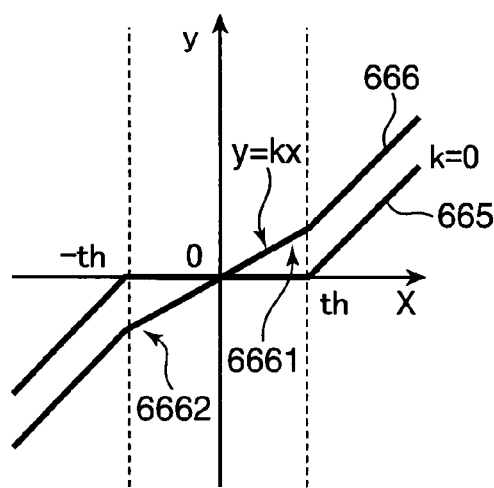
FIG. 10 is a graph showing a coring characteristic of a coring processing to be executed by the noise removing unit.

In the coring processing, the noise removers 661 through 664 each removes a noise component by performing a high-frequency image conversion processing i.e. an image conversion processing with respect to the high-frequency image inputted to each of the noise removers 661 through 664, according to e.g. a characteristic indicated by the reference numeral 665 shown in FIG. 10 i.e. the coring characteristic 665. In FIG. 10, the symbol "th" denotes a coring coefficient to be used in removing a noise component from an image signal. The coring processing according to the coring characteristic 665 is a conversion processing, wherein the output is 0 when the input is larger than "−th" and smaller than "th" in other words, the data in the area where the input is larger than "−th" and smaller than "th" is removed as the noise component; the output is a sum of the input and the value "th" when the input is equal to or smaller than "−th"; and the output is a difference between the input and the value "th" when the input is equal to or larger than "th".

The aforementioned high-frequency image includes a detail component as well as the noise component. Accordingly, if an image component in an area where the absolute value of a targeted pixel is smaller than the coring coefficient i.e. larger than "−th" and smaller than "th" is removed by the coring processing without an exception, the detail component may also be removed. In view of this, it may be preferable to introduce a coring characteristic 666 having a relation: y=kx showing that the gradient k of the graph satisfies: 0≦k≦1 in the area where the absolute value of the targeted pixel is larger than "−th" and smaller than "th", in place of using the coring characteristic 665; and adjust the "kx" value so that a processing result with no or less removal of a detail component is obtainable, with a negligibly small noise being allowed to remain in the image. In the case where the coring characteristic 666 is used, a detail component remains unremoved, as the value of the input X is approximated to the value of the coring coefficient "th" ("−th"), as shown by e.g. the reference numeral 6661, 6662 in the graphical expression: y=kx. The detail component is an image in the high-frequency image other than the noise component, and is an image i.e. a frequency component originated from the high-frequency image, which represents texture of the image, in contrast to a low-frequency image representing a blur image.

Fine and accurate noise removal can be performed by setting the coring coefficient "th" ("−th") to a value depending on the amount of noise in the high-frequency image in each of the processing steps. Actually, the image sensor 3 involves noise such as a dark current. In light of the facts that the noise amount in the high-frequency image is determined depending on the noise inherent to the sensor, and that the noise amount differs among the high-frequency images in the processing steps i.e. depending on the frequency bands, the value of the coring coefficient "th" ("−th") is set to an optimal value corresponding to an intended noise removal amount with respect to each of the image sensors 3 to be used in the digital cameras 1, or with respect to each of the processing steps. The coring coefficient "th" is stored in each of the noise removers, as a predetermined fixed value. Alternatively, the coring coefficient "th" may not be set as the fixed value. For instance, it is possible to provide a predetermined noise detector for detecting the amount of noise in the high-frequency image in each of the processing steps so that the coring coefficient "th" is calculated and set in accordance with the detected noise amount, each time the noise amount is detected.

(Edge Preservation Processing)

In the edge preservation processing, the noise removers 661 through 664 each generates a high-frequency image (called as an "edge preserved image"), wherein an edge is preserved with an edge preservation amount corresponding to the edge intensity "e", in other words, an edge component preservation processing of changing a coring degree i.e. a coring intensity or a coring level depending on the edge intensity "e" is performed, by performing the following operation. Specifically, the noise removers 661 through 664 each performs a weighting processing i.e. a weighted average processing with respect to a high-frequency image inputted to each of the noise removers 661 through 664, and an image (hereinafter, called as a "coring image") obtained as a result of the coring processing, by the following formula (2), using the edge preservation coefficient information (see FIG. 9) obtained by the (Calculation of Edge Preservation Coefficient) in the <Edge Detection Processing>. By performing the edge component preservation processing, as shown in FIG. 9, the value of a pixel having a larger edge preservation coefficient E i.e. closer to 1.0, is approximated to the value of the pixel of the high-frequency image before the coring processing is executed. Thereby, a larger amount of edge component is preserved. On the other hand, the value of a pixel having a smaller edge preservation coefficient E i.e. closer to 0, is approximated to the value of the pixel of the coring image.

$$\text{Img\_output}=(1.0-E)*\text{img\_core}+E*\text{Img\_input} \quad (2)$$

where Img_output represents an edge preserved image,

Img_core represents a coring image,

Img_input represents a high-frequency image to be inputted to the respective noise removers, and the symbol "*" denotes multiplication (the same definition is also applied to the following description).

Thus, the noise removers 661 through 664 e.g. the noise remover 663 performs the coring processing and the edge component preservation processing with respect to the high-frequency image 6432 outputted from the HPF section 643, based on the edge preservation coefficient information 6532 outputted from the edge detector 653, and outputs a high-frequency image 6632 with its edge component being preserved, and its noise component being removed.

Figure 11:
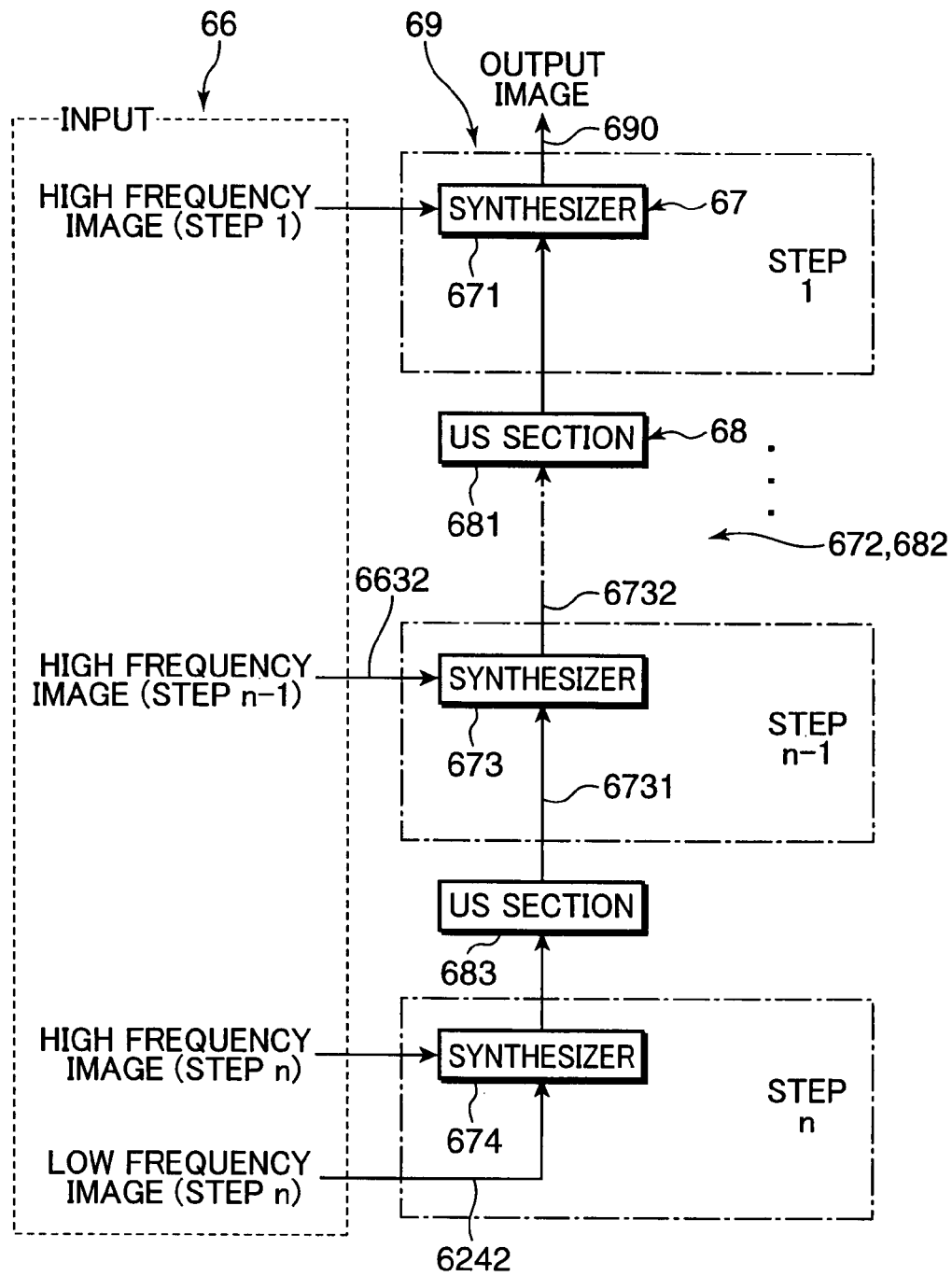
FIG. 11 is a diagram for describing a high-frequency image synthesis processing and an upsampling processing to be executed by a frequency synthesizing unit shown in FIG. 5, specifically, a partially enlarged view of the frequency synthesizing unit shown in FIG. 5.

FIG. 11 is a diagram for describing a synthesis processing and an upsampling processing with respect to a high-frequency image to be executed by the frequency synthesizing unit 69, and is a partially enlarged view of the frequency synthesizing unit 69 shown in FIG. 5. As shown in FIG. 11, the frequency synthesizing unit 69 includes a synthesizing unit 67 for performing the synthesis processing, and a US unit 68 for performing the upsampling (US) processing. The synthesizing unit 67 includes synthesizers i.e. adders to be used in the respective processing steps i.e. a synthesizer 671 to be used in the processing step 1, a synthesizer 672 to be used in the processing step 2, a synthesizer 673 to be used in the processing step 3 i.e. the processing step (n−1), and a synthesizer 674 to be used in the processing step 4 i.e. the processing step n.

The synthesizers 671 through 674 each generates a frequency-synthesized image in each of the processing steps by synthesizing i.e. summing an upsampled image i.e. a frequency-synthesized image to be described later, which is obtained in a preceding processing step i.e. in a lower-located processing step in FIG. 11, and the noise-removed high-frequency image outputted from the noise removers 661 through 664. For instance, in the processing step 3, the high-frequency image 6632 outputted from the noise remover 663, and a frequency-synthesized image 6731 outputted from a US section 683 are synthesized to generate a frequency-synthesized image 6732. Then, the frequency-synthesized image 6732 is inputted to the US section 682 in the upper-located processing step 2. In the processing step 4 i.e. in the lowermost processing step, not a frequency-synthesized image obtained by synthesizing with an image outputted from the lower-located processing step, but a low-frequency image 6242 (see FIG. 6) outputted from the LPF section 624 is used. In other words, the synthesizer 674 synthesizes the low-frequency image 6242 and the high-frequency image outputted from the noise remover 664.

The image synthesis processing to be executed by the synthesizers 671 through 674 in the respective processing steps is a processing of synthesizing a high-frequency image outputted from the noise removing unit 66 with a low-frequency image outputted from the lower-located processing step (in case of the processing step 4, the low-frequency image is outputted from the same processing step); and outputting the synthesized image to the upper-located processing step, as a low-frequency image. Observing the above processing from the synthesizers in the processing steps e.g. from the synthesizer 673, the frequency-synthesized image 6731 generated in the lower-located processing step is a low-frequency image with respect to the high-frequency image 6632.

The US unit 68 includes the US sections to be used in the respective processing steps i.e. a US section 681 to be used in the processing step 1, a US section 682 to be used in the processing step 2, and the US section 683 to be used in the processing step 3. The US sections 681 through 683 each performs 2US processing i.e. double upsampling of increasing the image size i.e. the pixel number in row and column directions by double by e.g. pixel interpolation such as linear interpolation, with respect to the frequency-synthesized image generated by the synthesizer in the preceding processing step; and outputs the upsampled image to the synthesizer in the succeeding processing step. In the embodiment, the magnification ratio to be used in the US processing is double in correspondence to one-half, which is the magnification ratio used in the DS processing by the DS unit to restore i.e. enlarge the image size which has been reduced to one-half, to the original size. Alternatively, the magnification ratio to be used in the US processing may be changed depending on the magnification ratio to be used in the DS processing. For instance, if the magnification ratio to be used in the DS processing is one-third, the magnification ratio to be used in the US processing is triple. Further alternatively, the magnification ratio to be used in the US processing may be arbitrarily set, independently of the magnification ratio to be used in the DS processing.

In the above arrangement, the frequency synthesizing unit 69 performs the multiple frequency synthesis processing and the multiple US processing in the multiple processing steps from the lowermost processing step 4 to the uppermost processing step 1 stepwise, and outputs an output image 690 i.e. a wide dynamic range image from the synthesizer 671, as an image corresponding to the input image 610 inputted to the image processor 6.

Figure 12:
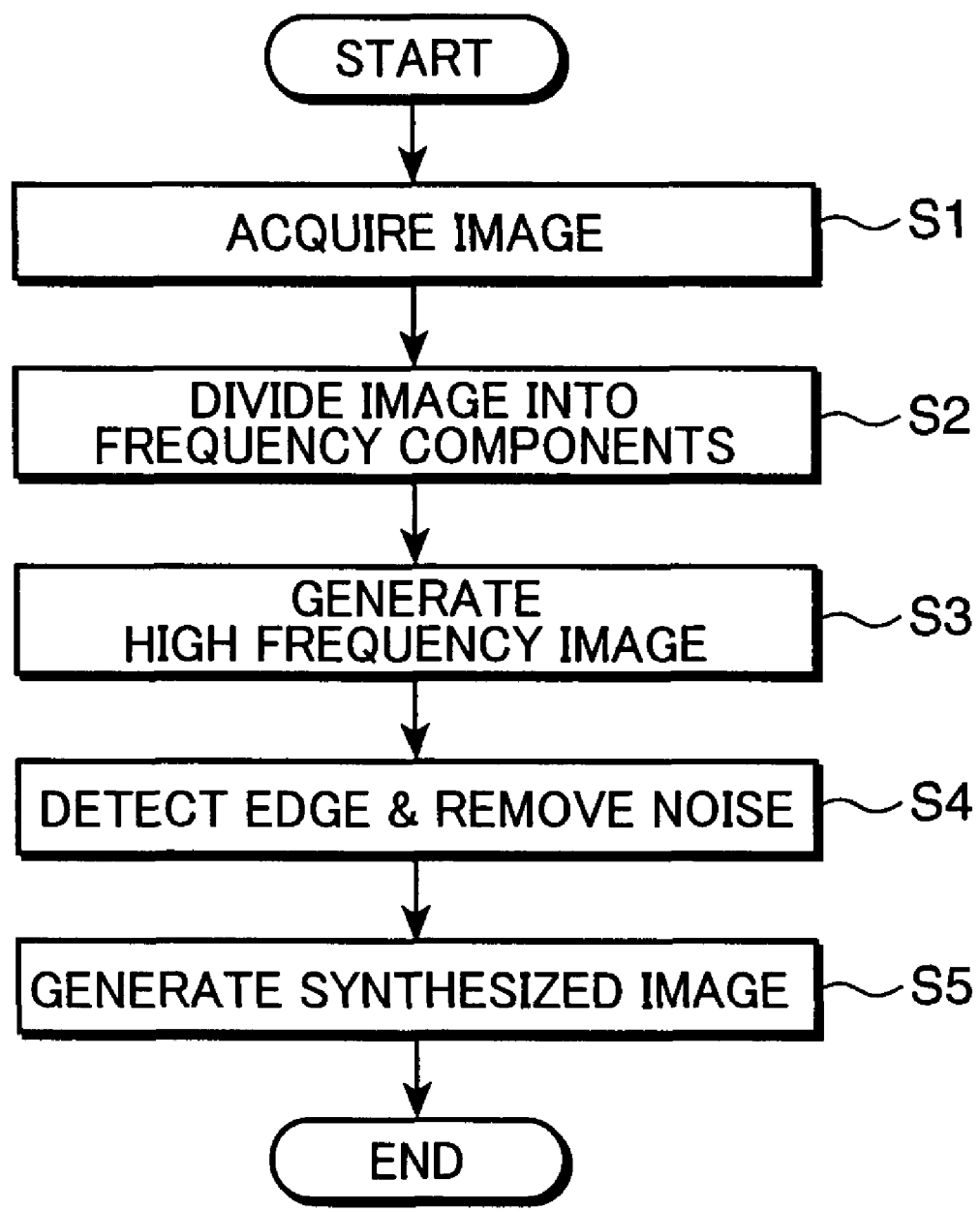
FIG. 12 is a flowchart showing an operation to be executed by the noise removal processing in the first embodiment.

FIG. 12 is a flowchart showing an operation of the noise removal processing to be executed in the first embodiment. First, a predetermined wide dynamic range image i.e. a linear-logarithmic image is obtained by a sensing operation or the like of the image sensor 3, and then, the wide dynamic range image i.e. the input image 610 is inputted to the frequency divider 61 of the image processor 6 (Step S1). Then, the frequency divider 61 i.e. the LPF unit 62 and the DS unit 63 perform the multiple LPF processing and the multiple DS processing, respectively, with respect to the input image 610 in the multiple processing steps from the uppermost processing step to the lowermost processing step stepwise to divide the input image 610 into plural frequency components i.e. to perform frequency isolation, whereby a low-frequency image is generated in each of the processing steps (Step S2). Then, the HPF unit 64 subtracts an LPF-processed low-frequency image from the input image with respect to each of the processing steps, as the low-frequency image is generated in each of the processing steps, whereby a high-frequency image is generated (Step S3).

Then, in each of the processing steps, the edge detecting unit 65 and the noise removing unit 66 perform the edge detection processing and the noise removal processing, respectively. Specifically, the edge detecting unit 65 performs an edge intensity detection filter processing with respect to the low-frequency image inputted to the edge detecting unit 65, using an edge intensity detection filter to calculate an edge intensity of the low-frequency image, and calculates an edge preservation coefficient E based on the calculated edge intensity information. Also, the edge removing unit 66 performs a coring processing with respect to the high-frequency image inputted to the noise removing unit 66 to generate a noise-component-removed high-frequency image i.e. a coring image, and generates an edge preserved image i.e. a high-frequency image whose noise component is removed and whose edge component is preserved depending on the edge intensity "e", by performing a weighting processing with respect to the coring image and the high-frequency image, using the edge preservation coefficient information obtained by the edge detecting unit 65 (Step S4). Then, the frequency synthesizing unit 69 repeatedly performs the frequency synthesis processing and the US processing, from the lowermost processing step to the uppermost processing step stepwise, by summing the low-frequency image obtained in the lowermost processing step, and the high-frequency images obtained in the respective processing steps. As a result of the summation, a synthesized image whose noise component is removed and whose edge component is preserved is obtained. The synthesized image is outputted from the image processor 6, as the output image 690 i.e. a wide dynamic range image (Step S5).

Second Embodiment

Figure 13:
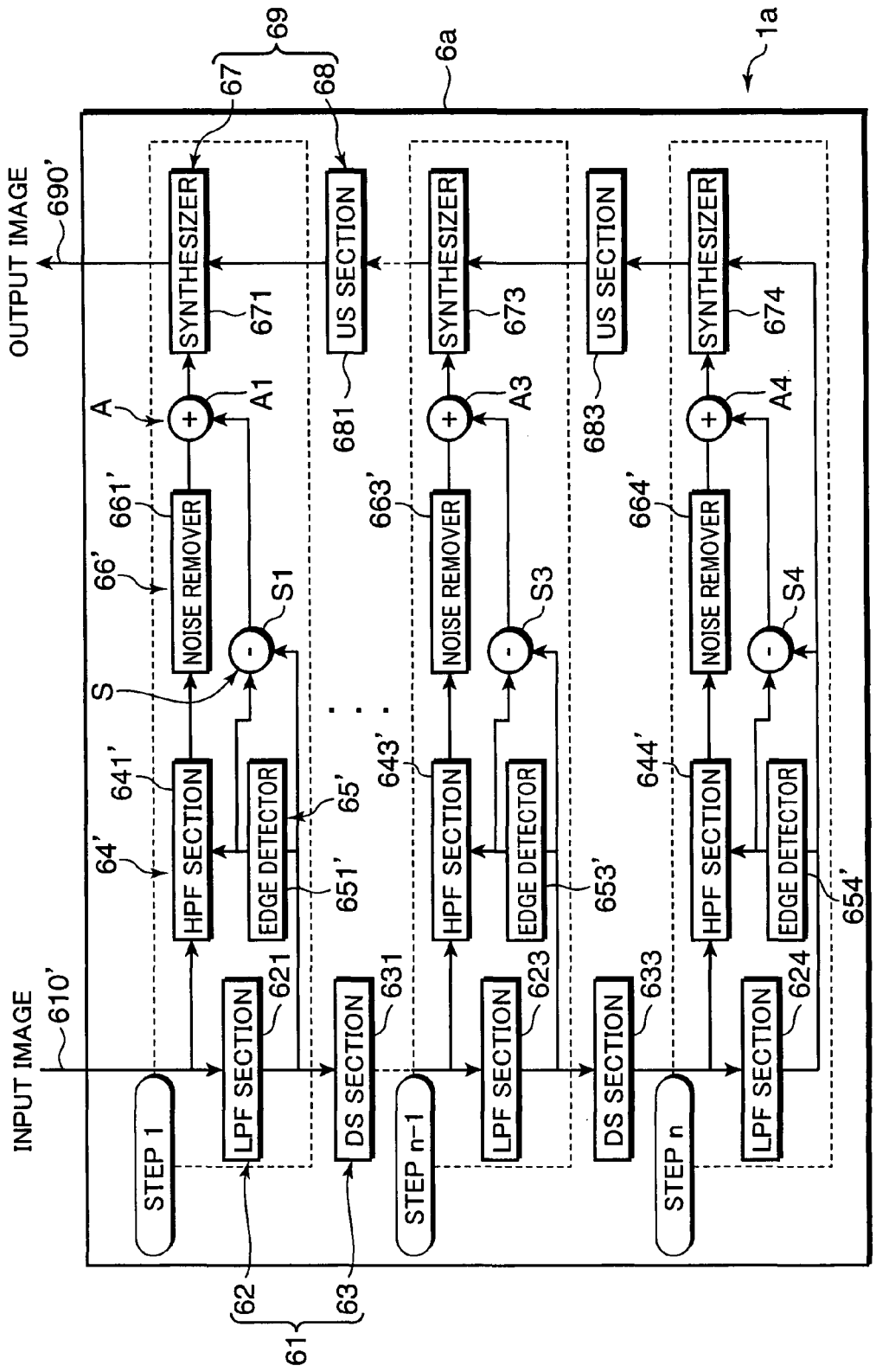
FIG. 13 is a functional block diagram showing a circuit arrangement primarily relating to a noise removal processing to be executed by an image processor of a digital camera in a second embodiment of the invention.

FIG. 13 is a functional block diagram showing a circuit arrangement primarily relating to a noise removal processing to be executed by an image processor 6a of a digital camera 1a in a second embodiment of the invention. The image processor 6a is substantially different from the image processor 6 in the first embodiment in the edge component preservation processing. Specifically, the image processor 6a is provided with a high frequency generator 64' i.e. an HPF unit 64', an edge detecting unit 65', and a noise removing unit 66', and is further provided with an adding section A and a subtracting section S. The arrangements and the operations of the aforementioned parts are described in detail referring to FIGS. 14 and 15. The elements of the image processor 6a which are substantially equivalent to those of the image processor 6 are denoted with the same reference numerals, and description thereof will be omitted herein.

Figure 14:
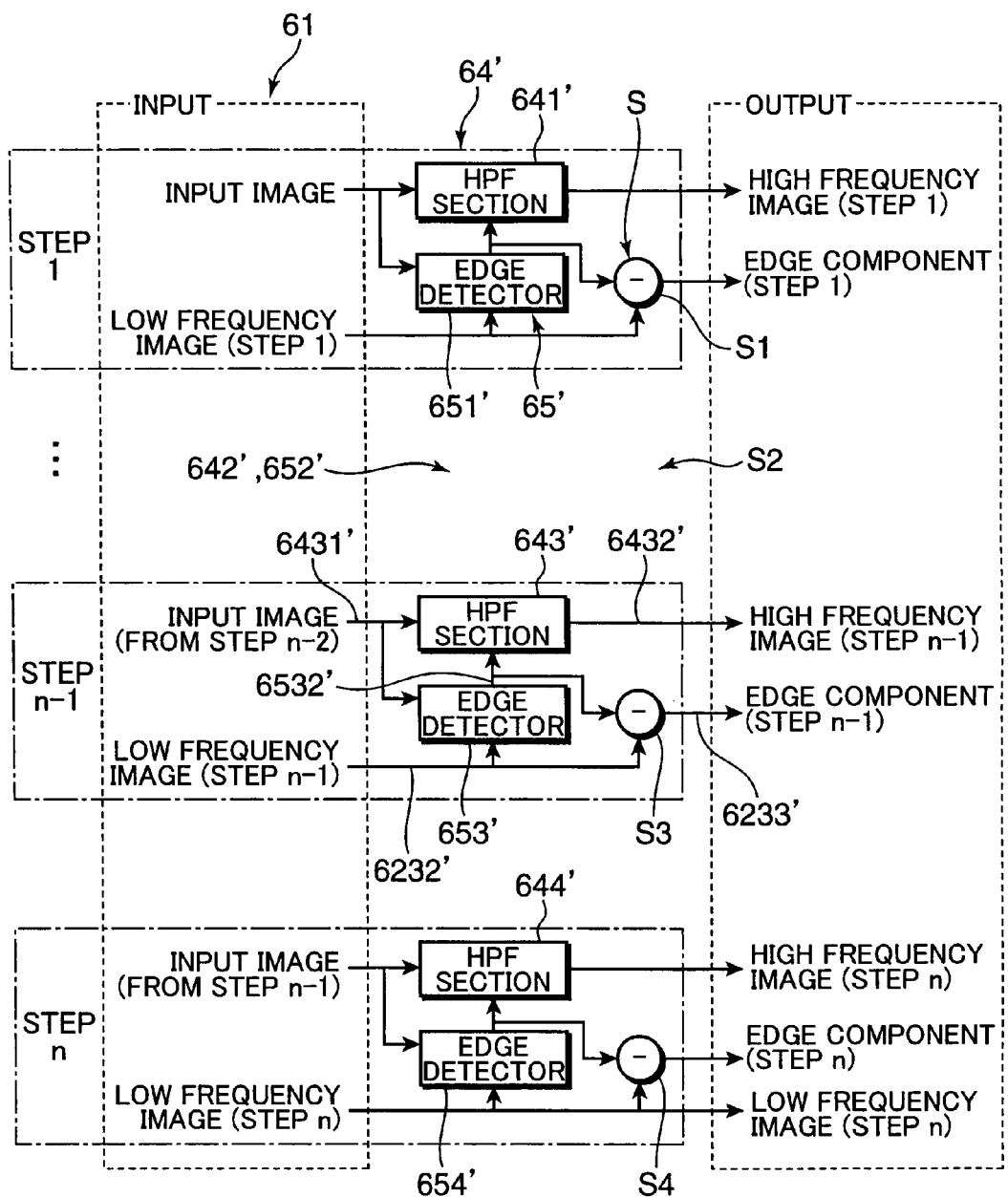
FIG. 14 is a partially enlarged view of an HPF unit, an edge detecting unit, and a subtracting unit shown in FIG. 13.

FIG. 14 is a partially enlarged view of the HPF unit 64', the edge detecting unit 65', and the subtracting section S shown in FIG. 13. The HPF unit 64' includes HPF sections 641', 642', 643', and 644' to be used in the respective processing steps 1 through n i.e. the processing steps 1 through 4. As an HPF processing, the HPF sections 641' through 644' each generates a high-frequency image by subtracting an image generated by the edge detecting unit 65' i.e. a below-described edge-preserved low-frequency image, from an input image sent from a frequency divider 61.

The edge detecting unit 65' includes edge detectors 651', 652', 653', and 654' to be used in the respective processing steps 1 through 4. The edge detectors 651' through 654' each performs a below-mentioned edge detection processing with respect to the input image sent from the frequency divider 61.

<Edge Detection Processing>

As an edge detection processing, the edge detectors 651' through 654' each calculates an edge intensity of a low-frequency image by performing an edge intensity detection filter processing with respect to the low-frequency image, using an edge intensity detection filter e.g. a Sobel filter in each of the processing steps; and calculates an edge preservation coefficient E based on the calculated edge intensity information. Then, the edge detectors 651' through 654' each generates a low-frequency image (hereinafter, called as an "edge-preserved low-frequency image") with its edge component preserved, based on the edge component preservation processing using the edge preservation coefficient information, and outputs the edge-preserved low-frequency image to each of the HPF sections 641' through 644'.

(Calculation of Edge Preservation Coefficient)

The edge intensity and the edge preservation coefficient E are calculated as follows. Specifically, the edge detectors 651' through 654' each calculates an edge intensity "e" by performing a filter processing with respect to each of the low-frequency images, using a 3×3 Sobel filter i.e. by performing a 3×3 Sobel filter processing, wherein the tap number is "3"; and calculates an edge preservation coefficient E with respect to the edge intensity "e" by the following formula (3).

when $e < e1$, $E=0$, when $e1 < e < e2$, $E=(e-e1)/(e2-e1)$, and when $e > e2$, $E=1.0$ \hfill (3)

where e1, e2 is a predetermined threshold value, and e1<e2.

Similarly to the first embodiment, the edge preservation threshold value e1, e2 may be set in advance in each of the processing steps, or may be set to a common value throughout the processing steps. The information relating to the edge preservation threshold value e1, e2 is stored in the edge detecting unit 65' i.e. the edge detectors 651' through 654'. Alternatively, a Sobel filter whose tap number is other than "3" may be used as the edge intensity detection filter, or a filter such as a Prewitt filter may be used.

(Edge Preservation Processing)

In the edge component preservation processing, the edge detectors 651' through 654' each generates a low-frequency image i.e. the aforementioned edge-preserved low-frequency image, whose edge is preserved with an edge preservation amount corresponding to the edge intensity "e" by performing a weighting processing i.e. a weighted average processing with respect to an input image sent from an LPF unit 62 to each of the edge detectors 651' through 654', and a low-frequency image, by the following formula (4), using the edge preservation coefficient information (see FIG. 9) obtained by the (Calculation of Edge Preservation Coefficient). By performing the edge component preservation processing, as shown in FIG. 9, the value of a pixel having a larger edge preservation coefficient E i.e. closer to 1.0, is approximated to the value of the pixel of the input image. Thereby, a larger amount of edge component is preserved. On the other hand, the value of a pixel having a smaller edge preservation coefficient E i.e. closer to 0, is approximated to the value of the pixel of the low-frequency image.

$$\text{Img\_edge} = (1.0-E)*\text{Img\_low} + E*\text{Img\_input} \quad (4)$$

where Img_edge represents an edge preserved image,
Img_low represents a low-frequency image to be inputted to the respective edge detectors 651' through 654', and
Img_input represents an input image to be inputted to the respective edge detectors 651' through 654'.

Thus, the edge-preserved low-frequency images obtained by the edge detectors 651' through 654' are outputted to the HPF sections 641' through 644', respectively. The HPF sections 641' through 644' e.g. the HPF section 643' generates a high-frequency image 6432' by subtracting an edge-preserved low-frequency image 6532' outputted from the edge detector 653', from an input image 6431'. Thus, the edge-component-removed high-frequency image 6432' can be obtained by subtracting the edge-preserved low-frequency image 6532' from the input image 6431'. The edge-component-removed high-frequency image 6432' is subjected to a noise removal processing in the following step. However, since the edge component has already been removed from the high-frequency image, there is no likelihood that the edge component may be removed together with the noise component when the noise removal processing is executed. In other words, the noise removal processing can be performed without removal of the edge component.

In the second embodiment, the subtracting unit S is provided downstream in the data flow with respect to the edge detecting unit 65'. The subtracting unit S includes subtractors S1, S2, S3, and S4 to be used in the respective processing steps 1 through 4. The subtractors S1 through S4 subtract the low-frequency images outputted from the LPF sections 621 through 624, from the edge-preserved low-frequency images generated by the edge detectors 651' through 654', respectively, thereby extracting edge components. In this sense, the subtracting unit S serves as an edge component extractor for extracting an edge component from an edge-preserved low-frequency image. Since the extracted edge component is not subjected to a noise removal processing in the following step, the edge component is preserved without removal in a below-mentioned output image 690'. For instance, the subtractor S3 in the processing step 3 obtains an edge component 6233' by subtracting a low-frequency image 6232' outputted from the LPF section 623, from the edge-preserved low-frequency image 6532' outputted from the edge detector 653'.

The high frequency generator 64' uses an input image to generate a high-frequency image. Alternatively, it is possible to generate a high-frequency image, with influence of noise component residuals in an input image 610' being suppressed, by using an image whose degree of smoothing is smaller than that of an LPF to be used in the respective LPF sections of the frequency divider 61 e.g. by using an LPF-processed image which has been subjected to a 3×3 LPF processing, as the input image 610' to be inputted to the image processor 6a in FIG. 13. The modification is advantageous in prioritizing a noise removal processing, although a sharp edge in the input image 610' may be slightly smoothed i.e. the magnitude of the edge component may be slightly decreased by the influence of the 3×3 LPF processing, with the result that the sharp edge component may not be preserved as it is.

Figure 15:
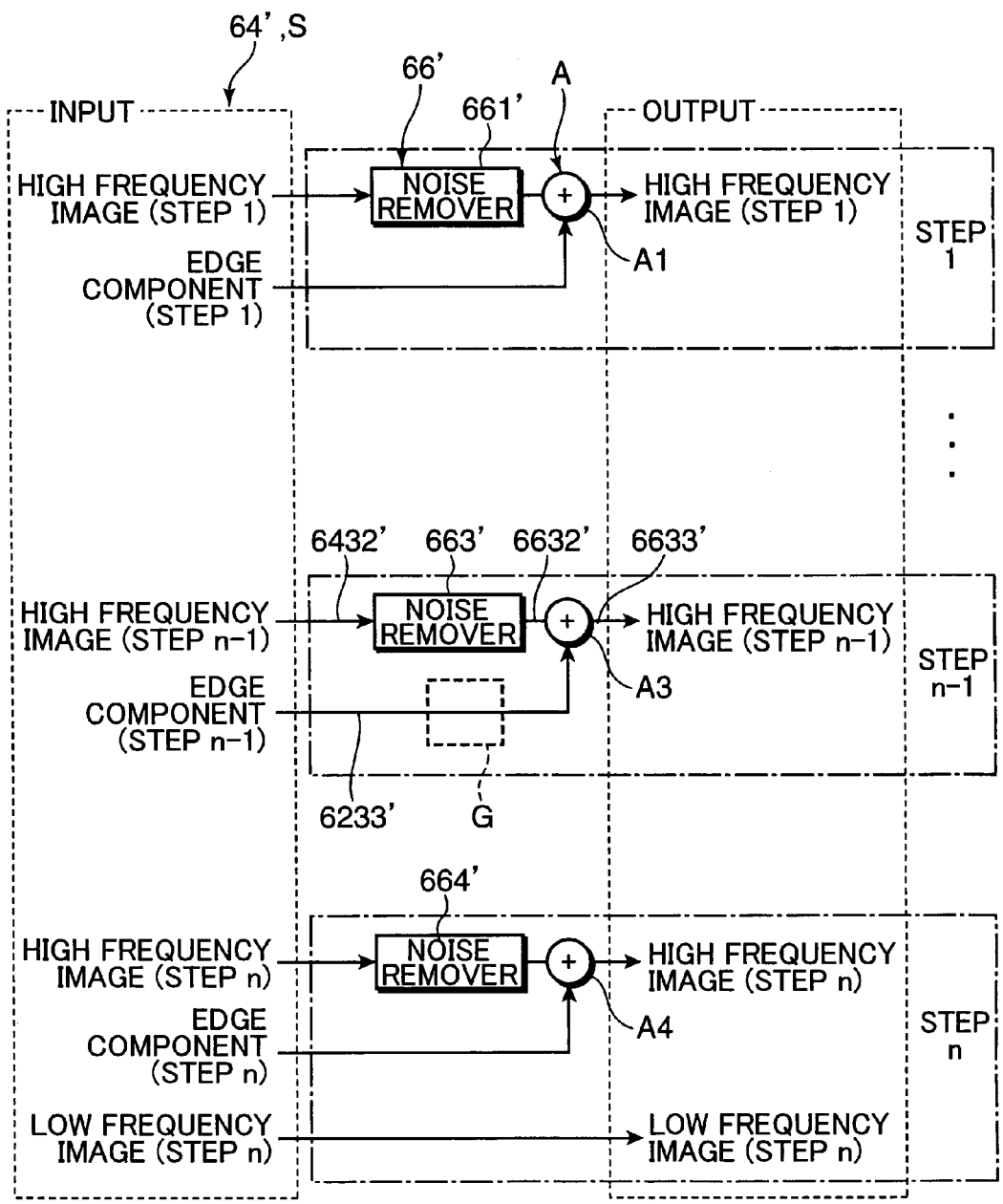
FIG. 15 is a partially enlarged view of a noise removing unit and an adding unit shown in FIG. 13.

FIG. 15 is a partially enlarged view of the noise removing unit 66' and the subtracting unit A shown in FIG. 13. The noise removing unit 66' includes noise removers 661' through 664' to be used in the respective processing steps 1 through 4. The noise removers 661' through 664' each performs a noise removal processing substantially equivalent to the <Noise Removal Processing> described in the first embodiment, with respect to a high-frequency image generated by the HPF unit 64'. Specifically, the noise removers 661' through 664' each removes a noise component from the high-frequency image by performing a coring processing based on the coring characteristic 665 or the coring characteristic 666 shown in FIG. 10. For instance, the noise remover 663' in the processing step 3 obtains a noise-removed high-frequency image 6632' by removing a noise component from the high-frequency image 6432' outputted from the HPF section 643'.

The adding unit A includes adders A1, A2, A3, and A4 to be used in the respective processing steps 1 through 4. The adders A1 through A4 add edge component images extracted from the subtractors S1 through S4 to the noise-removed high-frequency images obtained by the noise removers 661' through 664', respectively. As a result of the addition, high-frequency images (hereinafter, called as "edge-preserved high-frequency images") whose noise component is removed and whose edge component is preserved are obtained. In this sense, the adding unit A serves as an edge component adder for adding an edge component to a high-frequency image. For instance, the adder A3 in the processing step 3 obtains an edge-preserved high-frequency image 6633' by adding the edge component 6233' outputted from the subtractor S3 to the high-frequency image 6632' outputted from the noise remover 663'.

In each of the processing steps 1 through 4, in the case where an edge component is attenuated, particularly in the case where an LPF-processed input image whose degree of smoothing is small is used as the input image 610' to be inputted to the image processor 6a, as mentioned above, it may be preferable to apply a predetermined gain to the edge component. In light of the fact that the degree of attenuation of the edge component changes depending on the intensity of the LPF, the edge component is corrected by applying a gain depending on the intensity of the LPF corresponding to a variation in attenuation, in other words, the edge component which gets dull resulting from smoothing by the LPF processing is corrected. In the modification, it is possible to provide a gain setter or an edge component adjuster, as indicated by e.g. the symbol G, between the subtracting unit S and the adding unit A in each of the processing steps, for instance, to provide the gain setter G between the subtractor S3 and the adder A3 in the processing step 3; and to cause the gain setter G to perform a processing of multiplying the edge component 6233' with a predetermined gain. The gain setter G may be provided in each of the processing steps in the similar manner as mentioned above.

In this way, as shown in FIG. 15, in the processing steps, the high-frequency images i.e. the edge-preserved high-frequency images outputted from the adders A1 through A4, and a low-frequency image outputted from the LPF section 624 are obtained. Similarly to the description in the first embodiment referring to FIG. 11, a synthesizing unit 67 and a US unit 68 of a frequency synthesizing unit 69 perform multiple frequency synthesis processing and multiple US processing, respectively, with respect to the high-frequency images and the low-frequency image in the multiple processing steps from the lowermost processing step 4 to the uppermost processing step 1 stepwise; and output the output image 690' from a synthesizer 671, as an image corresponding to the input image 610' inputted to the image processor 6a.

Figure 16:
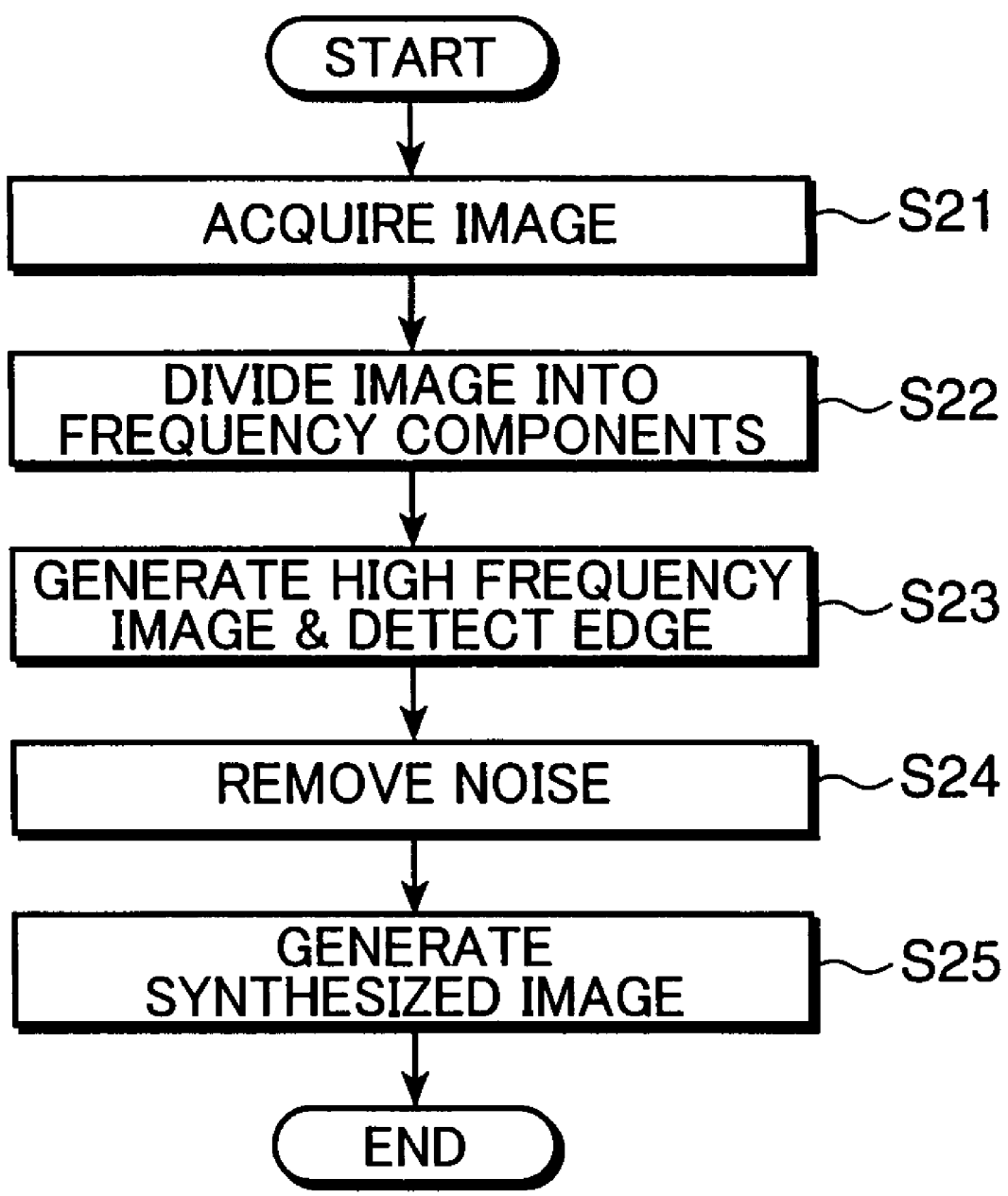
FIG. 16 is a flowchart showing an operation of the noise removal processing to be executed in the second embodiment.

FIG. 16 is a flowchart showing an operation of the noise removal processing to be executed in the second embodiment. First, a predetermined wide dynamic range image i.e. a linear-logarithmic image is obtained by a sensing operation or the like of an image sensor 3, and the wide dynamic range image i.e. the input image 610' is inputted to the frequency divider 61 of the image processor 6a (Step S21). Then, the frequency divider 61 i.e. the LPF unit 62 and the DS unit 63 perform the multiple LPF processing and the multiple DS processing, respectively, with respect to the input image 610' in the multiple processing steps from the uppermost processing step to the lowermost processing step stepwise to divide the input image 610' into plural frequency components, whereby a low-frequency image is generated in each of the processing steps (Step S22).

The HPF unit 64' generates i.e. extracts a high-frequency image, based on the input image with respect to each of the processing steps, as the low-frequency image is generated in each of the processing steps. In generation of the high-frequency image the edge detecting unit 65' performs, as the edge detection processing, an edge intensity detection filter processing with respect to the low-frequency image inputted to the edge detecting unit 65', using an edge intensity detection filter to calculate an edge intensity of the low-frequency image, and calculates an edge preservation coefficient E based on the calculated edge intensity information. Then, an edge-preserved low-frequency image whose edge component is preserved depending on the edge intensity "e" by the edge component preservation processing is generated, by performing a weighting processing with respect to the input image inputted to the edge detecting unit 65', and the low-frequency image, using the edge preservation coefficient E. Then, an edge-component-removed high-frequency image is generated by subtracting the edge-preserved low-frequency image from the input image (Step S23).

Then, the noise removing unit 66' generates a noise-component-removed high-frequency image i.e. a coring image, by performing a noise removal processing, specifically, a coring processing with respect to the edge-component-removed high-frequency image, which has been inputted to the noise removing unit 66'. Then, a high-frequency image whose noise component is removed and whose edge component is preserved depending on the edge intensity "e" is generated, by adding the edge component obtained by subtracting the low-frequency image from the edge-preserved low-frequency image by the subtracting unit S, to the noise-component-removed high-frequency image, using the adding unit A (Step S24). Then, the frequency synthesizing unit 69 repeatedly performs the frequency synthesis processing and the US processing, from the lowermost processing step to the uppermost processing step stepwise, by summing the low-frequency image obtained in the lowermost processing step, and the high-frequency images obtained in the respective processing steps. As a result of the summation, a synthesized image whose noise component is removed and whose edge component is preserved is obtained. The synthesized image is outputted from the image processor 6a, as the output image 690' i.e. a wide dynamic range image (Step S25).

As mentioned above, in the second embodiment, the edge component is preserved by the HPF processing by the HPF unit 64', using the information obtained by the edge detecting unit 65', whereas, in the first embodiment, the edge component is preserved by the noise removal processing by the noise removing unit 66, using the information obtained by the edge detecting unit 65. Similarly to the first embodiment, in the second embodiment, the high-frequency image whose noise component is removed and whose edge component is preserved is inputted to the frequency synthesizing unit 69 i.e. the synthesizing unit 67. Also, both in the first and the second embodiments, the information relating to the edge intensity and the edge preservation coefficient E concerning preservation of the edge component is calculated by utilizing i.e. referring to the low-frequency image obtained by the LPF processing.

Figure 17:
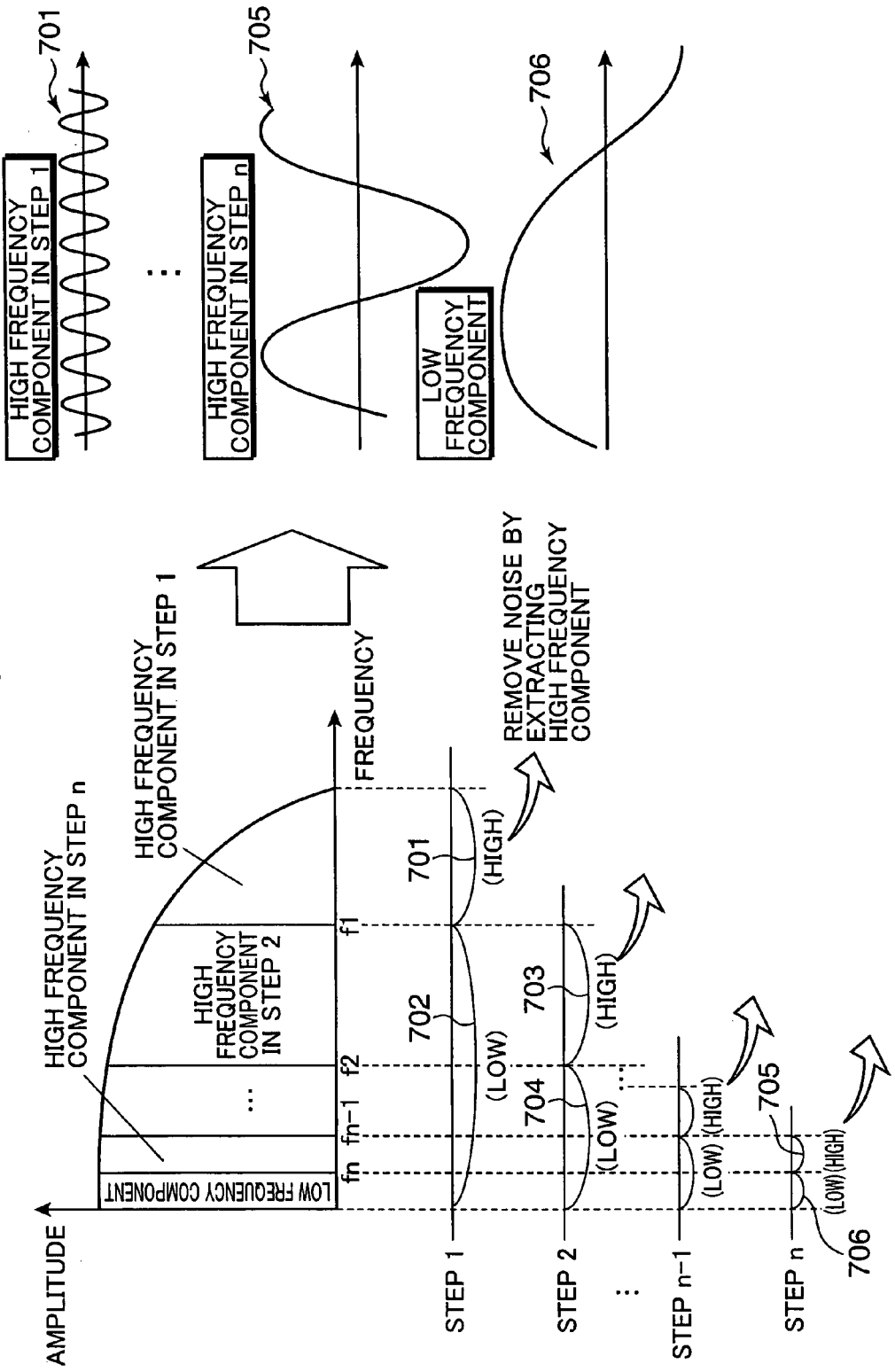
FIGS. 17 and 18 are diagrams for conceptually describing a frequency division processing to be executed in the first and the second embodiments.

As mentioned above, in the first and the second embodiments, it is possible to isolate a frequency component as a noise component from a frequency component as a real image component, which was impossible in the conventional arrangement (see FIGS. 25 and 26). FIG. 17 is a diagram for conceptually describing the frequency division processing to be executed in the first and the second embodiments. As described above, by performing a hierarchical frequency isolation from the uppermost processing step 1 to the lowermost processing step n i.e. the processing step 4, for instance, in the processing step 1, a certain image including noise i. e. a wide dynamic range image is divided into a high-frequency component indicated by the reference numeral 701, and a low-frequency component indicated by the reference numeral 702. Then, a noise component is removed from the isolated high-frequency component 701.

Then, in the processing step 2, the low-frequency component 702 isolated in the processing step 1 is divided into a high-frequency component indicated by the reference numeral 703, and a low-frequency component indicated by the reference numeral 704. Thus, a processing of dividing the low-frequency component isolated from the high-frequency component to be removed as the noise component, into a high-frequency component and a low-frequency component is repeated in the processing steps thereafter stepwise. In the lowermost processing step n, the low-frequency component isolated in the preceding step (n−1) is divided into a high-frequency component indicated by the reference numeral 705, and a low-frequency component indicated by the reference numeral 706. Thereby, as shown in the right portion of FIG. 17, the image is divided into the high-frequency components obtained in the respective processing steps 1 through n, and the low-frequency component obtained in the processing step n. The low-frequency component obtained in the lowermost processing step n corresponds to a low-frequency image to be outputted from the LPF section 624 in the processing step 4 shown in FIGS. 5 and 13.

Figure 18:
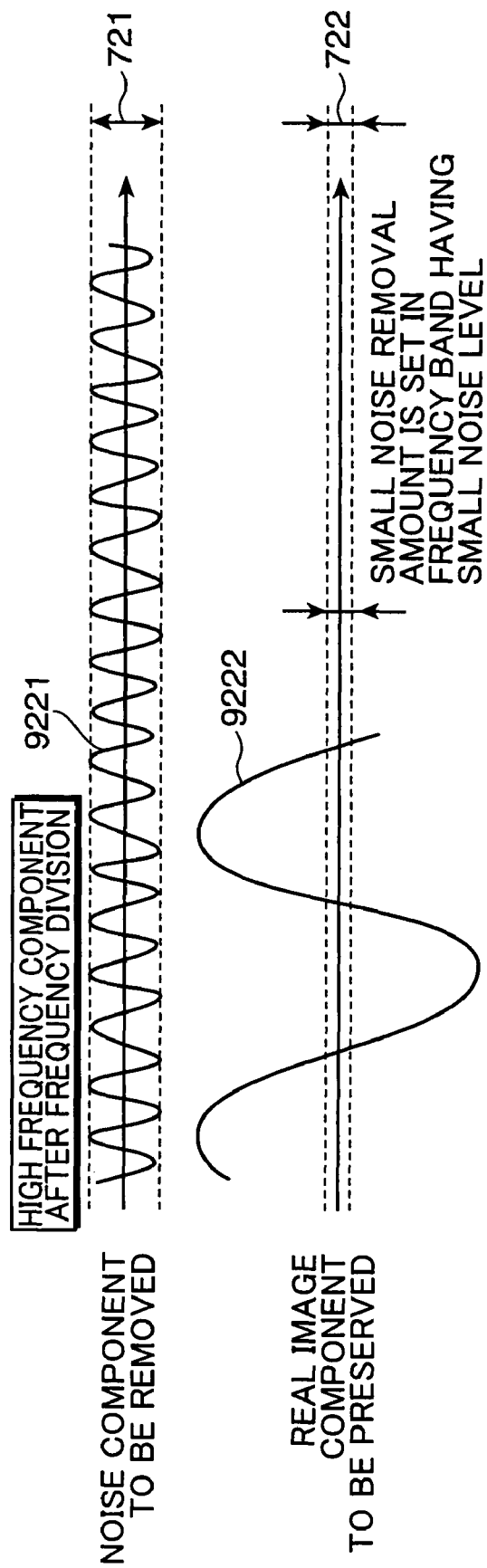

By performing the frequency division processing, as shown in FIG. 26, the high-frequency component 9222 showing that the high-frequency component 9221 as a noise component is superimposed on a real image component, is divided into the high-frequency component 9221 and the high-frequency component 9222, as shown in FIG. 18. Thereby, the entirety of the high-frequency component 9221 of a frequency band corresponding to the noise component is removed by setting a noise removal amount 721 with such a magnitude as to cover the entirety of the high-frequency component 9221. On the other hand, a noise removal processing is performed with respect to the high-frequency component 9222 of a frequency band whose noise component is small i.e. noise level is small, by setting a noise removal amount 722 smaller than the noise removal amount 721 so that the removal amount of the real image component i.e. the edge component is minimized.

In the arrangement of isolating a low-frequency component in a succeeding processing step by using the low-frequency component obtained by isolating the high-frequency component to be removed as the noise component, the edge preservation coefficient is calculated based on the low-frequency component i.e. the low-frequency image in each of the processing steps. This allows for performing an edge component preservation processing by referring to the edge preservation coefficient calculated based on the frequency component with less likelihood of noise component residuals, without using the high-frequency component which has been generated in extracting the noise component in each of the frequency bands i.e. in each of the processing steps. This enables to suppress likelihood that the edge component may be erroneously detected as the noise component in calculating the edge preservation coefficient, thereby enabling to finely preserve the edge component, as compared with the conventional image processing.

In the first and the second embodiments, the low-frequency image is extracted from the original image by the LPF processing, the high-frequency image is extracted by subtracting the low-frequency image from the original image, and the noise is removed by performing a coring processing with respect to the high-frequency image. In the first and the second embodiments, if the original image includes an edge where the luminance sharply changes, and the edge of the low-frequency image is processed by the LPF processing using a generally available linear LPF, the edge may get dull i.e. may be smoothed. On the other hand, the high-frequency image obtained by subtracting the low-frequency image having the edge from the original image includes a frequency component that may serve as an edge portion corresponding to the edge of the low-frequency image. Removing the noise component from the high-frequency image may result in removing the edge component. In view of this, there are proposed the following methods (A) and (B), as a method for preventing likelihood that an edge component may be removed with a noise component.

(A) An LPF processing of maintaining an edge i.e. maintaining a portion where the luminance sharply changes is performed to prevent smoothing by LPF processing. Conventionally, as shown in FIG. 24, for instance, in the case where the absolute value of a difference in pixel value before and after a sharp edge appears exceeds a predetermined threshold value $\epsilon$ in use of an $\epsilon$ filter as an edge preservation filter, the vicinity of the pixel value Xn is smoothed by performing a processing of substituting the pixel value Xn at the center pixel An for the pixel value Xm at the pixel Am in performing an LPF processing with respect to the center pixel An and its vicinity. Also, the vicinity of the pixel value Xm is smoothed in performing the LPF processing with respect to the center pixel Am and its vicinity. Further, if the area subjected to the LPF processing includes the pixel A representing an edge portion where the pixel A does not have a pixel value close to the pixel value X, the pixel value X at the pixel A representing the edge portion is outputted as it is. By performing the LPF processing with use of the $\epsilon$ filter as mentioned above, the sharp change in the edge as shown by the graphical line indicated by the reference numeral 901 is preserved. In the embodiments, however, the edge intensity is calculated based on the original image, and the edge preservation coefficient is calculated based on the detected edge intensity, in place of using the $\epsilon$ filter so that the sharp edge portion is preserved with the edge preservation amount corresponding to the edge intensity "e" by performing the weighting processing using the edge preservation coefficient.

(B) In this method, a coring amount i.e. a noise removal amount to be used in performing the noise removal processing is decreased at a portion where an edge exists in the original image, i.e. at a portion where the value of the frequency component exceeds a predetermined value.

The first and the second embodiments are made based on an idea of removing noise by performing both of the processing described in the methods (A) and (B).

Third Embodiment

Figure 19:
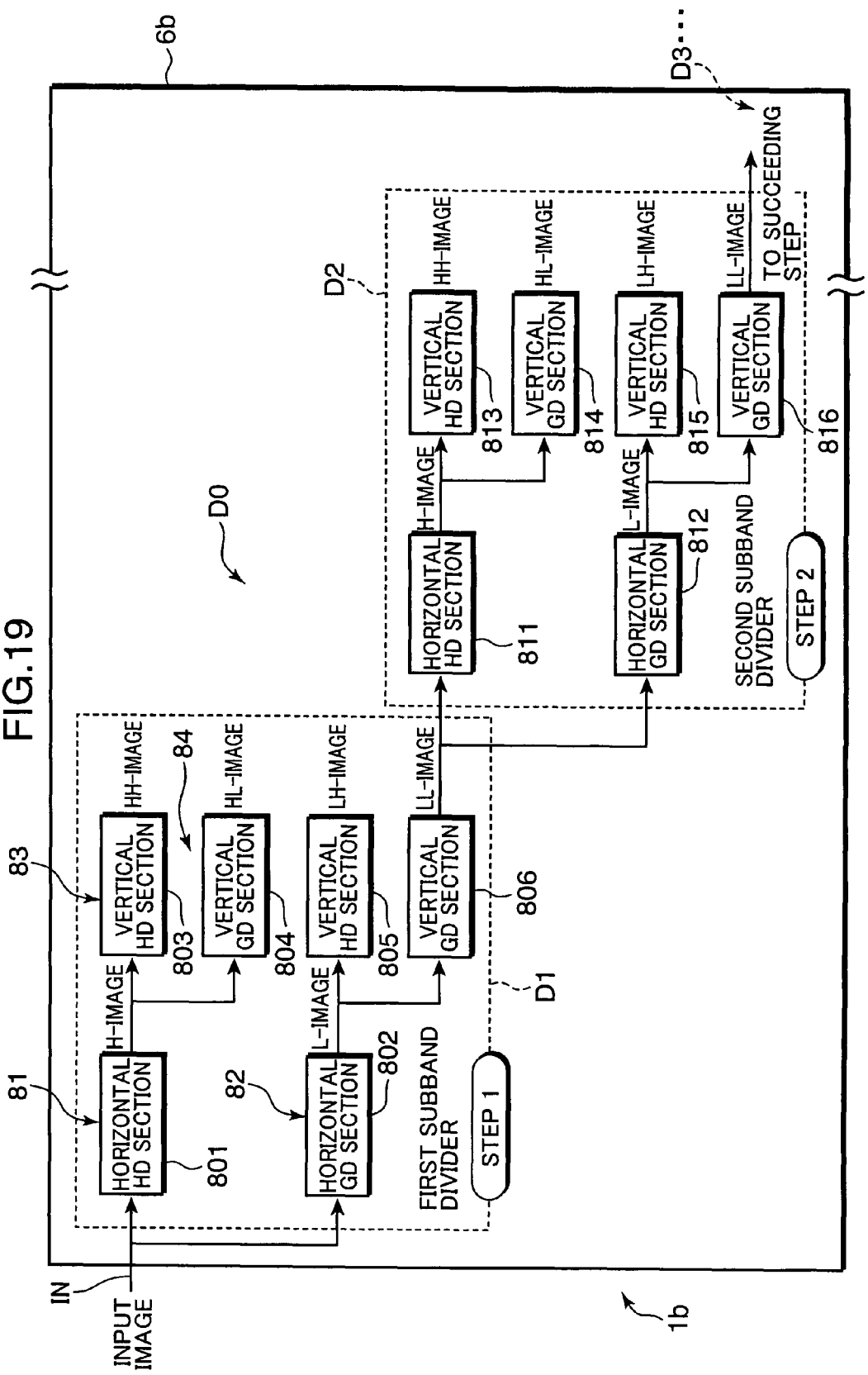
FIG. 19 is a functional block diagram showing a circuit configuration primarily relating to a noise removal processing to be executed by an image processor of a digital camera in a third embodiment of the invention, specifically, a partially enlarged view of a subband division functioning part in the image processor.
Figure 20:
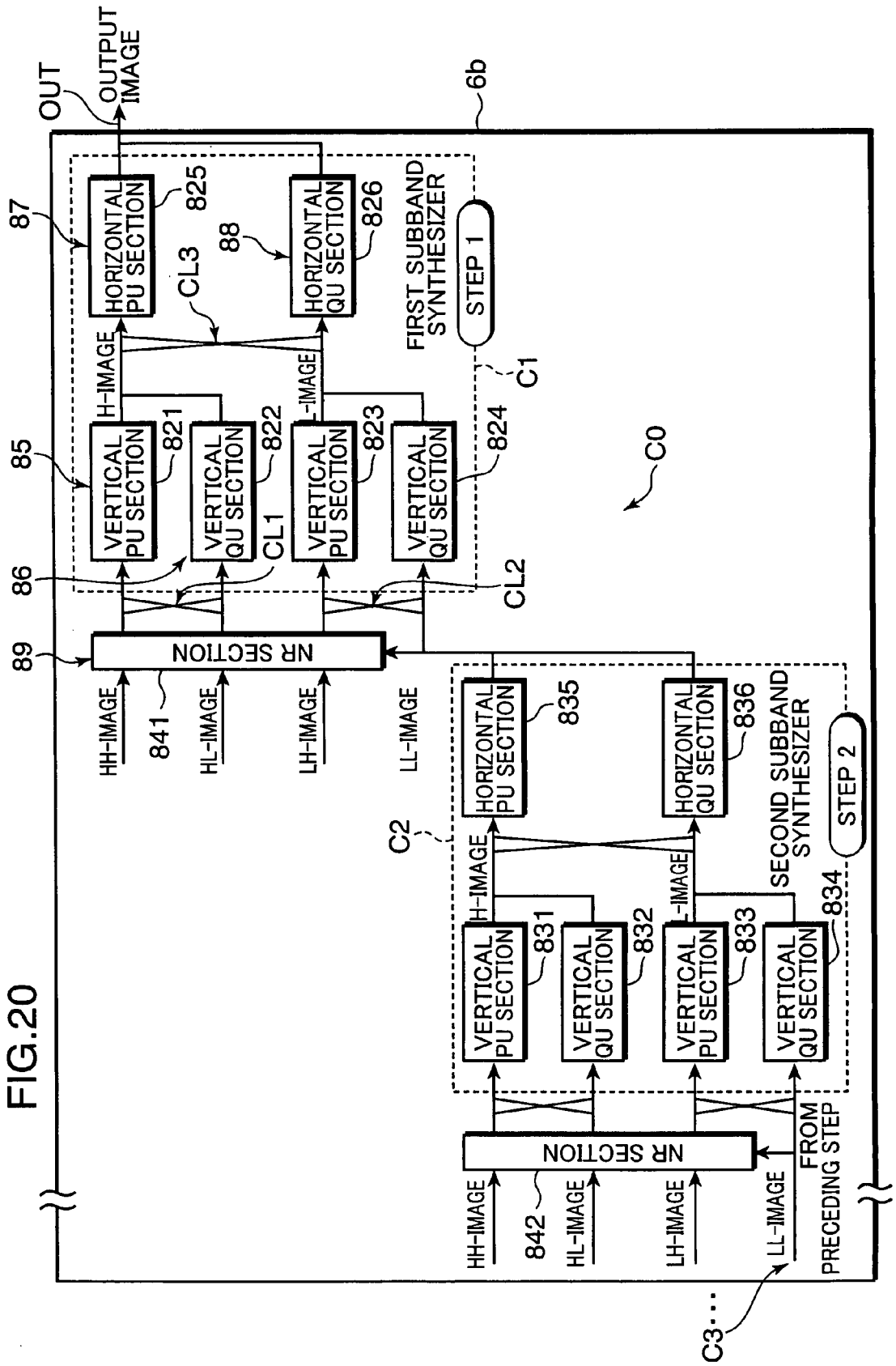
FIG. 20 is a functional block diagram showing a circuit configuration primarily relating to the noise removal processing to be executed by the image processor of the digital camera in the third embodiment, specifically, a partially enlarged view of a subband synthesis functioning part in the image processor.

FIGS. 19 and 20 are functional block diagrams showing a circuit arrangement primarily relating to a noise removal processing to be executed by an image processor 6b of a digital camera 1b in a third embodiment of the invention. The image processors 6b shown in FIGS. 19 and 20 are the image processor 6b as a subband division functioning part, and the image processor 6b as a subband synthesis functioning part, respectively. In this embodiment, an input image to be inputted to the image processor 6b is divided into plural frequency components i.e. subbands or frequency bands by a Wavelet transformation, the frequency components are subjected to a noise removal processing and an edge component preservation processing, and the processed frequency components are synthesized into an output image. These operations will be described in detail in the following.

As shown in FIGS. 19 and 20, the image processor 6b includes: a subband dividing unit D0 comprised of a first subband divider D1, a second subband divider D2, . . . ; a subband synthesizing unit C0 comprised of a first subband synthesizer C1, a second subband synthesizer C2, . . . and a noise reduction (NR) unit 89 comprised of NR sections 841, 842, . . . which are provided in correspondence to the subband synthesizers. The processing to be executed by the first subband divider D1 and the first subband synthesizer C1, the processing to be executed by the second subband divider D2 and the second subband synthesizer C2, . . . correspond to the processing step 1, the processing step 2, . . . , respectively, in the first and the second embodiments.

The subband dividing unit D0 i.e. the first subband divider D1, the second subband divider D2, . . . each divides an input image IN inputted to the image processor 6b into plural frequency components i.e. a high-frequency image and a low-frequency image, using a Wavelet transformation. In other words, the subband dividing unit D0 performs a subband division processing. The subband division processing is performed by using e.g. an SSK dividing filter for Wavelet transformation. The subband dividing unit D0 includes: a horizontal HD unit 81 comprised of horizontal HD sections 801, 811, . . . which are provided in correspondence to the first subband divider D1, the second subband divider D2 . . . ; a horizontal GD unit 82 comprised of horizontal GD sections 802, 812 . . . which are provided in correspondence to the first subband divider D1, the second subband divider D2 . . . ; a vertical HD unit 83 comprised of vertical HD sections 803, 813 . . . and vertical HD sections 805, 815 . . . which are provided in correspondence to the first subband divider D1, the second subband divider D2 . . . ; and a vertical GD unit 84 comprised of vertical GD sections 804, 814, . . . and vertical GD sections 806, 816, . . . which are provided in correspondence to the first subband divider D1, the second subband divider D2 . . . .

Figure 22:
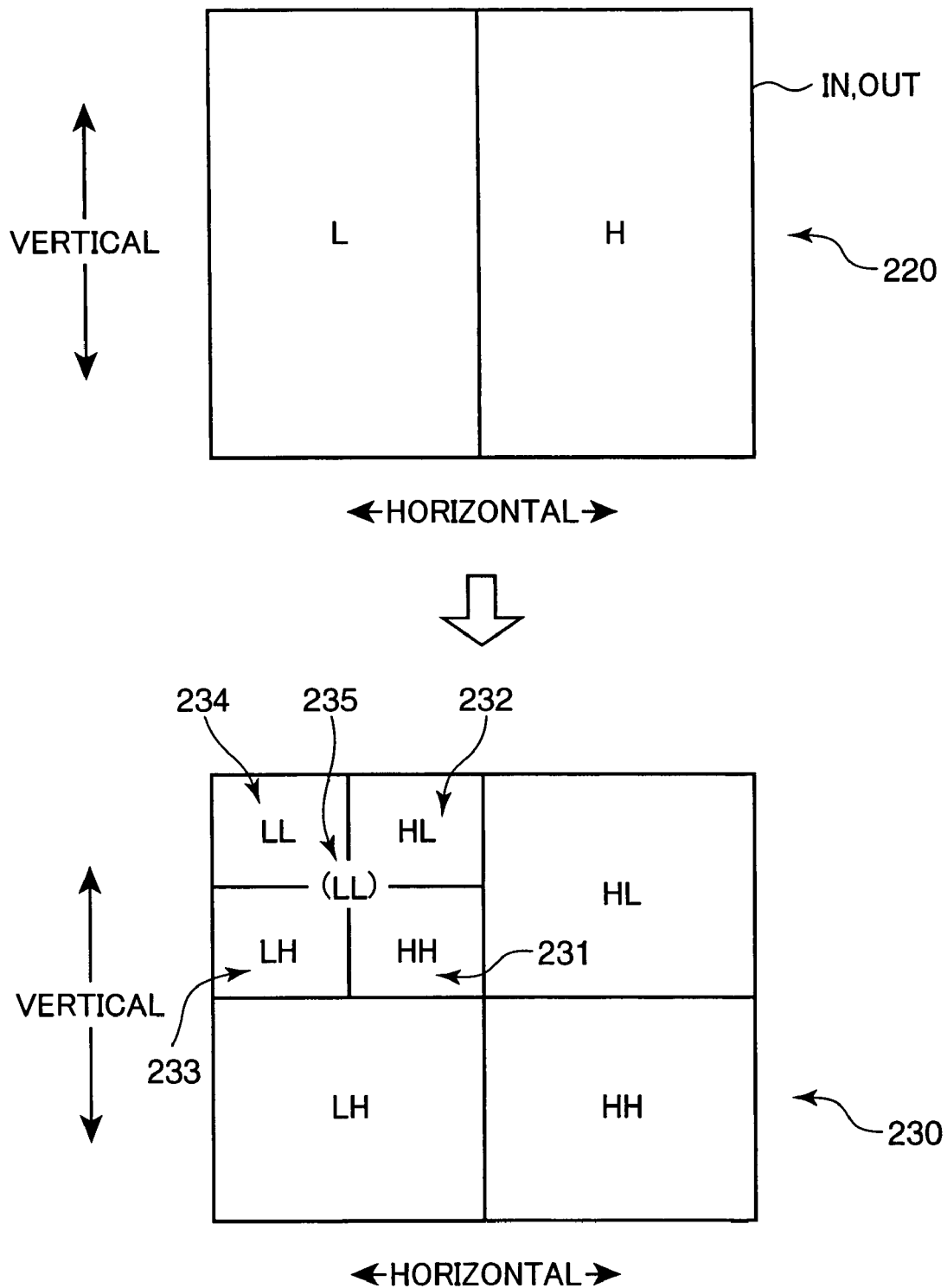
FIG. 22 is a schematic diagram for describing as to how an input image is divided into a high-frequency image and a low-frequency image by a Wavelet transformation i.e. a frequency division processing in the third embodiment.

The horizontal HD unit 81 performs a dividing filter processing in a horizontal direction with respect to the input image IN or a below-mentioned LL image to be generated by the vertical GD unit 84, and generates a high-frequency image i.e. an H-image. Specifically, as shown in FIG. 22, the horizontal HD unit 81 divides the input image IN into two images in the horizontal direction, and generates an H-image on the right side in the upper drawing of FIG. 22, indicated by the reference numeral 220.

The horizontal GD unit 82 performs a dividing filter processing in the horizontal direction with respect to the input image IN or the below-mentioned LL image to be generated by the vertical GD unit 84, and generates a low-frequency image i.e. an L-image. Specifically, as shown in FIG. 22, the horizontal HD unit 82 divides the input image IN into the two images in the horizontal direction, and generates an L-image on the left side in the upper drawing 220 of FIG. 22.

The vertical HD unit 83 performs a dividing filter processing in a vertical direction with respect to the H-image and the L-image generated by the horizontal HD unit 81 and the horizontal GD unit 82, and generates a high-frequency image in an oblique direction i.e. an HH-image, and a high-frequency image in a vertical direction i.e. an LH-image. Specifically, as shown in FIG. 22, the H-image and the L-image are each divided into two images in the vertical direction, and the HH-image and the LH-image, which correspond to lower half portions of the H-image and the L-image in the lower drawing in FIG. 22, indicated by the reference numeral 230.

The term "HD" represents a computation i.e. HD computation or HPF&½DS computation, which is a subband division processing using a Wavelet transformation, and is operative to simultaneously perform HPF processing and one-half downsampling. The one-half downsampling is equivalent to the one-half downsampling described in the first and the second embodiments, but is not limited thereto. The HD computation is realized by e.g. the following formula (5).

$$H(n)=(P(2n)-2P(2n+1)+P(2n+2))/2 \quad (5)$$

The term "GD" represents a computation i.e. GD computation or LPF&½DS computation, which is a subband division processing using a Wavelet transformation, and is operative to simultaneously perform LPF processing and one-half downsampling. The one-half downsampling is equivalent to the one-half downsampling described in the first and the second embodiments, but is not limited thereto. The GD computation is realized by e.g. the following formula (6).

$$L(n)=(-P(2n-2)+2P(2n-1)+6P(2n)+2P(2n+1)-P(2n+2))/8 \quad (6)$$

It should be noted that in the formulae (5) and (6), the symbol "P" represents a pixel value, and the symbols "H(n)" and "L(n)" represent pixel data of the pixel number n in a high-frequency image and a low-frequency image, respectively. The symbol "(2n)" represents a pixel whose pixel number is even, and the symbols "(2n−1)" and "(2n+1)" represent a pixel whose pixel number is odd and is different from the pixel number of the pixel (2n) by one, e.g., a pixel immediately before or after the pixel of the pixel number 2n.

The input image IN is divided into four images i.e. HH-image, LH-image, HL-image, and LL-image by the first subband divider D1, as shown in the lower drawing 230 in FIG. 22. Then, the LL-image among the four images is inputted to the second subband divider D2, and is further divided into four images i.e. HH-image, LH-image, HL-image, and LL-image by the second subband divider D2. Then, the LL-image among the four images divided by the second subband divider D2 is further divided into four images i.e. HH-image, LH-image, HL-image, and LL-image by the third subband divider D3. Thus, the subband division processing is hierarchically or stepwisely performed multiple times i.e. in the multiple processing steps in such a manner that the LL-image obtained by the preceding processing step is divided into four images in the succeeding processing step. In other words, octave division is performed, wherein an image signal is divided into a low-frequency component and a high-frequency component, and the division of the low-frequency component is stepwisely repeated.

Figure 21:
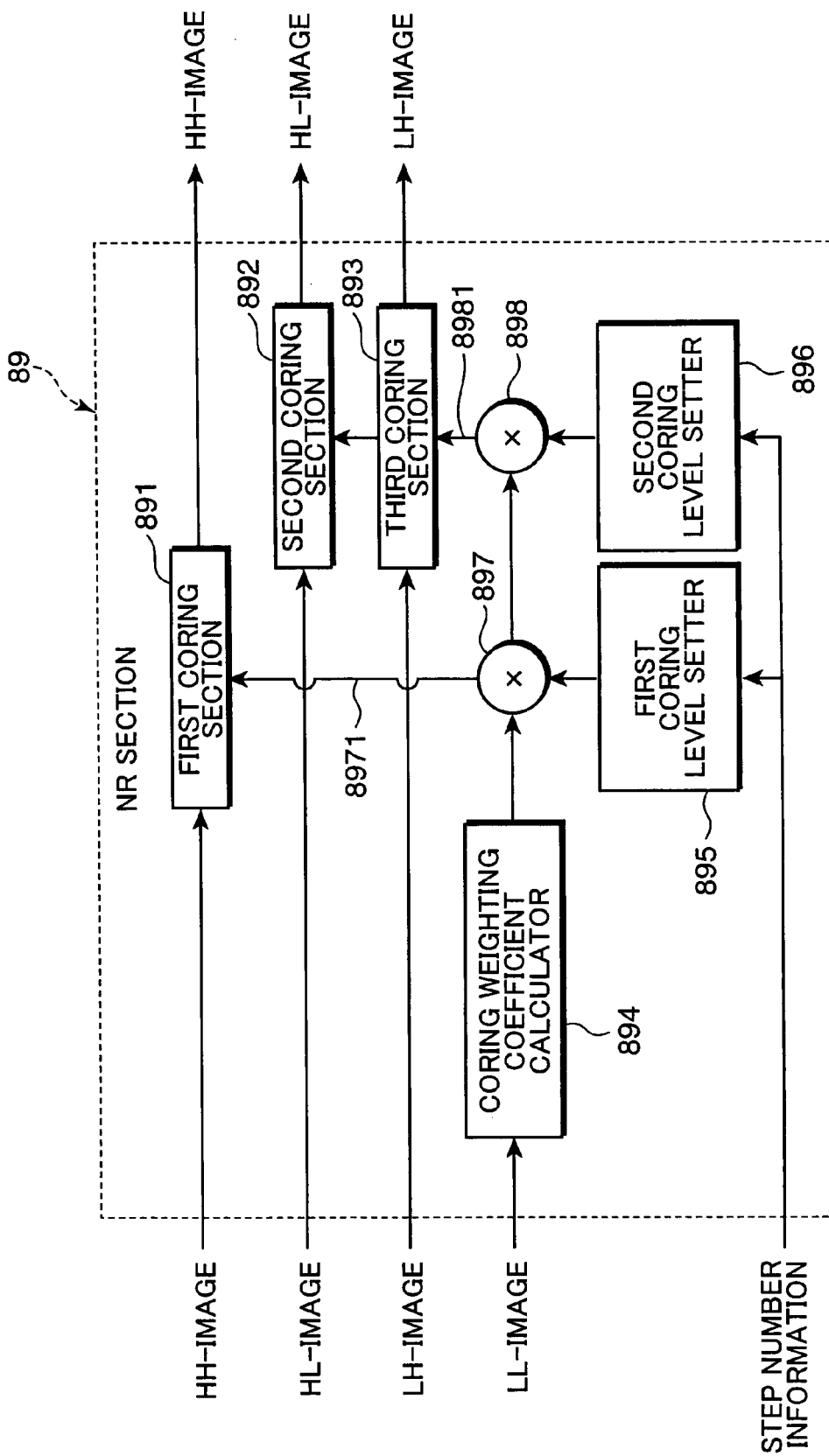
FIG. 21 is a functional block diagram showing a circuit configuration of an NR section shown in FIG. 20.

In the third embodiment, similarly to the first and the second embodiments, the processing steps include the lowermost processing step 4 i.e. the fourth subband divider D4. As far as the noise component removal processing and the edge component preservation processing are desirably carried out, it is possible to provide subband dividers of a larger number or a smaller number. In an actual arrangement, the input image IN to be inputted to the first subband divider D1 may be 4 channel images corresponding to colors of R, Gb, Gr, and B obtained by format conversion in the case where an image i.e. a wide dynamic range image acquired by the image sensor 3 is e.g. an image having a Bayer arrangement. In the modification, the acquired image is divided into four channel images, and the processing shown in FIGS. 19 through 21 is performed with respect to each of pixel data corresponding to the four channels. The image to be processed is not necessarily a color image. For instance, the aforementioned arrangement is applicable to a gray image i.e. a monochromatic image. The same idea is also applied to the first and the second embodiments.

The subband synthesizing unit C0 i.e. the first subband synthesizer C1, the second subband synthesizer C2, . . . each synthesizes HH-image, LH-image, HL-image, and LL-image generated in each of the processing steps by the subband division processing, using a Wavelet transformation. In other words, the subband synthesizing unit C0 performs a subband synthesis processing. The subband synthesis processing is performed by using e.g. an SSK synthesizing filter for Wavelet transformation. The subband synthesizing unit C0 includes: a vertical PU unit 85 comprised of vertical PU sections 821 and 831, . . . , vertical PU sections 823 and 833, . . . which are provided in correspondence to the first subband synthesizer C1, the second subband synthesizer C2, . . . ; a vertical QU unit 86 comprised of vertical QU sections 822 and 832, . . . , vertical QU sections 824 and 834, . . . which are provided in correspondence to the first subband synthesizer C1, the second subband synthesizer C2, . . . ; a horizontal PU unit 87 comprised of horizontal PU sections 825 and 835 . . . which are provided in correspondence to the first subband synthesizer C1, the second subband synthesizer C2, . . . ; and a horizontal QU unit 88 comprised of horizontal QU sections 826 and 836, . . . which are provided in correspondence to the first subband synthesizer C1, the second subband synthesizer C2.

The vertical PU unit 85 and the vertical QU unit 86 perform a synthesis filter processing in a vertical direction with respect to the HH-image, the LH-image, the HL-image, and the LL-image generated by the vertical HD unit 83 and the vertical GD unit 84 in each of the subband dividers, and generate a high-frequency image i.e. an H-image, and a low-frequency image i.e. an L-image. Specifically, for instance, in the first subband synthesizer C1, the vertical PU section 821 and the vertical QU section 822 generate an H-image by a vertical synthesis processing with respect to the HH-image and the HL-image; and the vertical PU section 823 and the vertical QU section 824 generate an L-image by a vertical synthesis processing with respect to the LH-image and the LL-image. Referring to FIG. 22, the right-side H-image in the upper drawing 220 is generated by synthesizing the HH-image and the HL-image in the lower drawing 230, and the left-side L-image in the upper drawing 220 is generated by synthesizing the LH-image and the LL-image in the lower drawing 230. In the second subband synthesizer C2, an H-image is generated by synthesizing an HH-image 231 and an HL-image 232 in the lower drawing 230, and an L-image is generated by synthesizing an LH-image 233 and an LL-image 234.

The horizontal PU unit 87 and the horizontal QU unit 88 perform a synthesis filter processing in a horizontal direction with respect to the H-image and the L-image generated by the vertical PU unit 85 and the vertical QU unit 86, and generate an image by synthesizing the H-image and the L-image. Specifically, for instance, in the first subband synthesizer C1, an output image OUT is generated by a horizontal synthesis processing with respect to the H-image and the L-image by the horizontal PU section 825 and the horizontal QU section 826. Referring to FIG. 22, an output image OUT is generated by synthesizing the H-image and the L-image in the upper drawing 220. Likewise, in the second subband synthesizer C2, an LL-image is generated by synthesizing the H-image and the L-image by the horizontal PU section 835 and the horizontal QU section 836. Thus, as shown in the lower drawing 230 in FIG. 22, an LL-image 235 is generated by synthesizing an image obtained by synthesizing the HH-image 231 and the HL-image 232, and an image obtained by synthesizing the LH-image 233 and the LL-image 234.

The term "PU" represents a computation i.e. PU computation or 2n-pixel filter processing & 2US computation, which is a subband synthesis processing using a Wavelet transformation, and is operative to simultaneously perform filter processing with respect to pixels whose pixel number is 2n (even number), and double upsampling. The double upsampling is equivalent to the double upsampling described in the first and the second embodiments, but is not limited thereto. The PU computation is realized by e.g. the following formula (7).

$$P(2n)=L(n)+(H(n-1)+H(n))/4 \quad (7)$$

where the symbol "P" represents a pixel value, the symbols "(n)" and "(n−1)" represent that the pixel number is n and (n−1), respectively, and the symbols "L( )" and "H( )" represent a high-frequency image and a low-frequency image, respectively. The same definition is also applied to the below-mentioned formula (8).

The term "QU" represents a computation i.e. QU computation or (2n+1)-pixel filter processing & 2US computation, which is a subband synthesis processing using a Wavelet transformation, and is operative to simultaneously perform filter processing with respect to pixels whose pixel number is (2n+1) (odd number), and double upsampling. The QU computation is realized by e.g. the following formula (8).

$$P(2n+1)=(L(n)+L(n+1))/2+(H(n-1)-6H(n)+H(n-1))/8 \quad (8)$$

The PU computation and the QU computation are computations with respect to the pixels whose pixel numbers are an even number and an odd number, respectively, and the computations commonly using the terms L(n), H(n−1), and H(n), as shown in the right-hand members in the formulae (7) and (8). This is because since the upsampling (US) processing is a processing of generating an image with its size twice as large as that of the original images before synthesis by synthesizing the images, images are generated from the pixels of the even number and the odd number, while referring to the pixel data in both of the low-frequency image and the high-frequency image. In the PU computation and the QU computation, an operation of referring to the pixel data in both of the low-frequency image and the high-frequency image is expressed by cross lines indicated by the symbols CL1, CL2, and CL3 in FIG. 20, which extend between the signal lines for the high-frequency image and the low-frequency image.

The NR unit 89 performs a noise removal processing i.e. a noise reduction processing or an NR processing with respect to a high-frequency image to be inputted to the NR unit 89 i.e. an HH-image, an HL-image and an LH image, and a low-frequency image i.e. an LL-image in each of the processing steps. The NR unit 89 includes the NR sections 841, 842, provided in correspondence to the first subband synthesizer C1, the second subband synthesizer C2, . . . . As shown in FIG. 21, the NR sections 841, 842, . . . each includes a first coring section 891, a second coring section 892, a third coring section 893, a coring weighting coefficient calculator 894, a first coring level setter 895, a second coring level setter 896, a first multiplier 897, and a second multiplier 898.

The first coring section 891, the second coring section 892, and the third coring section 893 perform a coring processing with respect to an HH-image, an HL-image, and an LH-image, respectively. The coring processing in the third embodiment is similar to the coring processing to be executed by the noise removing unit 66 in the first embodiment, wherein a noise component is removed from each of the images, using the coring characteristic 665 or the coring characteristic 666 as shown in FIG. 10. However, the coring processing in the third embodiment is performed depending on a coring level i.e. a coring intensity or a coring amount, which is weighed with the coring weighting coefficient to be described later.

The coring weighting coefficient calculator 894 calculates a coring weighting coefficient. The coring weighting coefficient corresponds to the edge preservation coefficient to be used in performing an edge component preservation depending on the edge intensity, and is a weighting coefficient to be applied to the coring level so as to determine the coring intensity or the coring degree in performing the coring processing. Similarly to the (Calculation of Edge Preservation Coefficient) described in the first embodiment, the coring weighting coefficient is derived by calculating an edge intensity "e" by performing e.g. a 3×3 Sobel filter processing with respect to a low-frequency image i.e. an LL-image, and by calculating the coring weighting coefficient with respect to the calculated edge intensity "e" by the aforementioned formula (1). The thus-obtained coring weighting coefficient is similar to the coefficient shown in FIG. 9. In other words, the edge preservation coefficient E corresponding to the axis of ordinate in FIG. 9 is substituted by the coring weighting coefficient.

The first coring level setter 895 and the second coring level setter 896 set a coring level or a coring degree i.e. the aforementioned coring coefficient "th" ("–th") with respect to the high-frequency images in each of the processing steps. The first coring level setter 895 sets a coring level with respect to an HH-image i.e. a high-frequency image, and the second coring level setter 896 sets a coring level i.e. a coring coefficient with respect to an LH-image and an HL-image, both of which are high-frequency images. Since the noise amount included in the high-frequency image differs in the processing steps, the coring level of a different value is set in each of the processing steps. Alternatively, the first and the second coring level setters 895 and 896 may be provided with a lookup table (LUT) describing the coring level information with respect to each of the processing steps. Then, the coring level corresponding to the step number information to be inputted to the first and the second coring level setters 895 and 896 i.e. information showing a correlation between the NR section provided with the coring level setters, and the ordinal number of the processing step, in other words, the coring level suitable for the respective processing steps, may be set based on a data conversion processing, using the LUT.

In the third embodiment, two coring level setters i.e. the first coring level setter 895 with respect to an HH-image, and the second coring level setter 896 with respect to an HL-image and an LH-image are provided as the coring level setting unit. Alternatively, a single coring level setter may be provided. Further alternatively, coring level setters may be provided individually with respect to an HL-image and an LH-image. In other words, three coring level setters may be provided.

The first multiplier 897 multiplies the coring level set by the first coring level setter 895 with the coring weighting coefficient calculated by the coring weighting coefficient calculator 894, and outputs the information relating to the weighted coring level i.e. weighted coring level information 8971 to the first coring section 891. The second multiplier 898 multiplies the coring level set by the second coring level setter 896 with the coring weighting coefficient calculated by the coring weighting coefficient calculator 894, and outputs the information relating to the weighted coring level i.e. weighted coring level information 8981 to the second coring section 892 and the third coring section 893.

Upon receiving the weighted coring level information 8971, the first coring section 891 adjusts the coring intensity i.e. the coring amount by changing the coring coefficient "th" ("–th") shown in FIG. 10 based on the weighted coring level information 8971 in performing a coring processing with respect to the HH-image. Similarly, the second and the third coring sections 892 and 893 adjust the coring intensity by changing the coring coefficient "th" ("–th") based on the weighted coring level information 8971 in performing a coring processing with respect to the HL-image and the LH-image. By performing the coring processing, the HH-image, the HL-image, and the LH-image whose noise component is removed and whose edge component is preserved depending on the edge intensity are obtained.

The HH-image, the HL-image, and the LH-image to be inputted to each of the NR sections 841, 842, . . . of the NR unit 89 are the HH-image, the HL-image, and the LH-image obtained by the first subband divider D1, the second subband divider D2, . . . which correspond to the processing steps 1, 2, . . . . For instance, the HH-image, the HL-image, and the LH-image to be inputted to the NR section 841 are the HH-image, the HL-image, and the LH-image to be obtained by the vertical HD section 803, the vertical GD section 804, and the vertical HD section 805, respectively.

In the above arrangement, a synthesized image corresponding to the input image IN is restored by repeating the noise removal processing and the edge component preservation processing by the NR unit, and the subband synthesis processing by the subband synthesizing unit with respect to the HH-image, the LH-image, the HL-image, and the LL-image obtained by the subband division processing in each of the processing steps, from the lowermost processing step to the uppermost processing step stepwise. The synthesized image is outputted, as the output image OUT, from the first subband synthesizer C1 in the uppermost processing step 1 i.e. from the horizontal PU section 825.

The NR sections and the subband synthesizers are provided in correspondence to the respective subband dividers. In the third embodiment, the four NR sections and the four subband synthesizers are provided in correspondence to the first through the fourth subband dividers D1 through D4. Also, similarly to the first and the second embodiments, in the third embodiment, the subband synthesis processing in each of the processing steps i.e. by each of the subband synthesizers is a processing of synthesizing a high-frequency image i.e. an HH-image, an HL-image, and an LH-image outputted from the NR unit 89, and a low-frequency image i.e. an LL-image outputted from the lower-located processing step i.e. the lower-located subband synthesizer; and outputting the synthesized image to the upper-located processing step, as a low-frequency image i.e. an LL-image, specifically, outputting the synthesized image as the output image OUT in the processing step 1. In the third embodiment, a Wavelet transformation is used concerning the frequency division processing and the frequency synthesis processing of an image. Whereas in the first and the second embodiments, pixel interpolation is performed in the US processing, in the third embodiment, the upsampling (US) processing using a Wavelet transformation is performed, specifically, the HD processing and the GD processing are performed in the subband division processing, and data of respective images generated by these processing is synthesized by the PU processing and the QU processing. The arrangement in the third embodiment is theoretically free of image degradation in performing the US processing.

Figure 23:
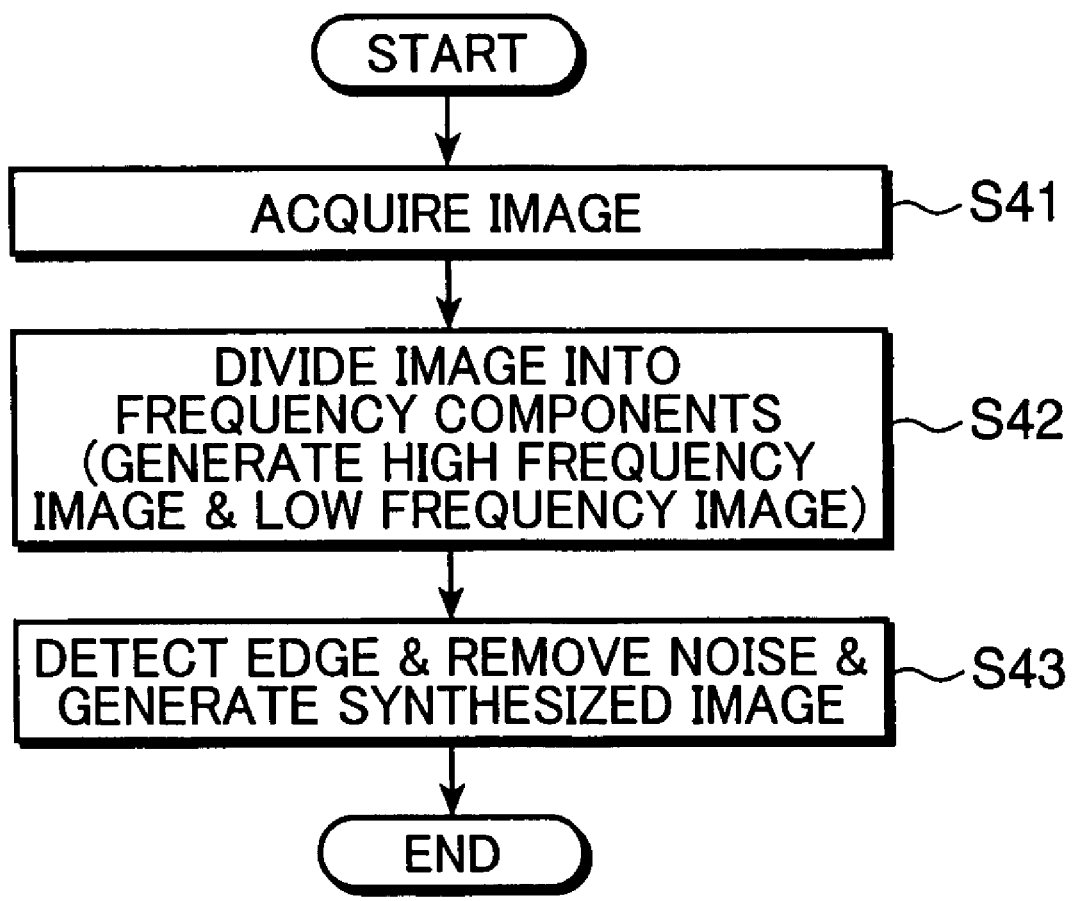
FIG. 23 is a flowchart showing an operation of the noise removal processing to be executed in the third embodiment.

FIG. 23 is a flowchart showing an operation of the noise removal processing to be executed in the third embodiment. First, a predetermined wide dynamic range image i.e. a linear-logarithmic image is obtained by a sensing operation or the like of an image sensor 3, and the wide dynamic range image i.e. the input image IN is inputted to the subband dividing unit D0 of the image processor 6b i.e. the first subband divider D1 or the horizontal HD section 801 (Step S41). Then, the subband dividing unit D0 performs the subband division processing, i.e. the HD processing and the GD processing by Wavelet transformation with respect to the input image IN multiple times in the multiple processing steps from the uppermost processing step to the lowermost processing step stepwise to divide the input image IN into plural frequency components, whereby high-frequency images i.e. an HH-image, an HL-image, and an LH-image, and a low-frequency image i.e. an LL-image are generated in each of the processing steps (Step S42).

Then, the NR unit 89 performs a noise component removal processing and an edge component preservation processing i.e. a coring processing by the noise component removal processing and the edge component preservation processing with respect to the high-frequency images i.e. the HH-image, the HL-image, and the LH-image obtained by the subband division processing by the subband dividing unit D0 in each of the processing steps; and the subband synthesizing unit C0 repeatedly performs the subband synthesis processing i.e. the PU processing and the QU processing by Wavelet transformation with respect to the coring-processed high-frequency images and the low-frequency image i.e. the LL-image, from the lowermost processing step to the uppermost processing step stepwise. As a result, a synthesized image whose noise component is removed and whose edge component is preserved is obtained. The synthesized image is outputted from the image processor 6b, as the output image OUT i.e. a wide dynamic range image (Step S43).

The following is a summary of the embodiments.

As described above, in the image processing device according to the first through the third embodiments i.e. in the image processing device 6, 6a, 6b, the frequency divider 61 i.e. the subband dividing section D0, as the frequency divider of the claimed invention, divides the input image 610, 610' or the input image IN into plural frequency components in plural frequency bands i.e. plural processing steps; and the noise removing unit 66, 66' or the first through the third coring sections 891 through 893, as the noise remover of the claimed invention, removes a noise component from a high frequency component i.e. a high-frequency image in the frequency components in the respective frequency bands obtained by the frequency division processing by the frequency divider. Then, the edge detecting unit 65, 65' or the coring weighting coefficient calculator 894, as the edge preservation information calculator of the claimed invention, detects the edge intensity "e" based on the low frequency component i.e. the low-frequency image in the frequency components in the respective frequency bands obtained by the frequency division processing by the frequency divider; and calculates the edge preservation information i.e. the edge preservation coefficient E relating to the degree of preserving the edge component, based on the detected edge intensity. Then, the image processor 6, 6a, 6b, as the edge preserving section of the claimed invention, preserves the edge component in the high frequency component, based on the edge preservation information calculated by the edge preservation information calculator. The edge preserving section of the claimed invention corresponds to the image processor 6, 6a, 6b for the following reason. The image processor is functioned to control the operations of the functioning parts provided in the image processor e.g. the edge detecting unit 65 or the noise removing unit 66. In view of this, the image processor serves as the edge preserving section to control the functioning parts of the image processor to perform the edge component preservation processing.

Then, the frequency synthesizing unit 69 or the subband synthesizing unit C0, as the frequency synthesizer of the claimed invention, synthesizes the high frequency component whose noise component is removed by the noise remover and whose edge component is preserved by the edge preserving section, and the low frequency component, in each of the frequency bands. For instance, the high-frequency image 6632 and the frequency synthesized image 6731 are synthesized, as shown in FIG. 11, or the HH-image, the HL-image, and the LH-image as the high-frequency image, and the LL-image as the low-frequency image are synthesized, as shown in FIG. 20. In other words, the synthesized image composed of the high frequency component and the low frequency component is generated in each of the frequency bands, and the synthesized images generated in the respective frequency bands are synthesized into the output image 690, 690' or the output image OUT.

As mentioned above, the input image is divided into the frequency components each having a frequency band, and the noise component is removed from the high frequency component in the frequency components each having the corresponding frequency band obtained by the frequency division processing. In other words, since the noise component is removed with respect to each of the frequency bands, e.g. depending on the noise removal amount set in each of the frequency bands, the noise component can be removed finely. Also, the edge intensity is detected based on the low frequency component in the frequency components each having the corresponding frequency band, and the edge preservation information relating to the degree of preserving the edge component is calculated based on the detected edge intensity. In other words, the edge intensity is detected in each of the frequency bands, and the edge preservation information is determined based on the detected edge intensity. Thus, the edge preservation information is determined by detecting the edge intensity based on the low frequency with less likelihood of noise component residuals, in place of using the high frequency component. This enables to preserve the edge component finely, without likelihood that the edge component may be erroneously detected and preserved as the noise component. Thereby, even if the input image is a wide dynamic range image, image processing with improved noise removal performance and improved edge preservation performance can be executed, thereby enabling to obtain a high-quality image.

Preferably, the frequency divider includes the LPF unit 62, as the low frequency generator of the claimed invention, for generating the low frequency component by performing an LPF processing, and the DS unit 63, as the downsampler of the claimed invention, for performing the DS processing with respect to the low frequency component generated by the low frequency generator. The input image is divided into the frequency components each having the corresponding frequency band by causing the low frequency generator to perform the LPF processing, and causing the downsampler to perform the DS processing with respect to the input image a predetermined multiple number of times.

Preferably, the low frequency generator exclusively performs the LPF processing with respect to the input image in the last one of the multiple times.

In the above arrangement, the input image is divided into the frequency components each having the corresponding frequency band by repeating the LPF processing and the DS processing with respect to the input image the predetermined multiple number of times. This enables to divide the input image into the frequency components each having the corresponding frequency band in a simplified construction.

Preferably, the edge preserving section i.e. the image processor 6 preserves the edge component in the high frequency component in the noise component removal processing i.e. the noise removal processing by the noise remover i.e. the noise removing unit 66. Then, the edge preserving section preserves the edge component in the high frequency component by changing the degree of preserving the noise component in the noise component removal processing by the noise remover, based on the edge preservation information e.g. the edge preservation coefficient information 6532 calculated by the edge preservation information calculator i.e. the edge detecting unit 65.

In the above arrangement, the edge component in the high frequency component is preserved by changing the degree of removing the noise component in the noise component removal processing, based on the edge preservation information. This enables to efficiently preserve the edge component in the high frequency component by utilizing the noise component removal processing, and enables to simplify the arrangement of the image processing device.

Preferably, the image processor 6 further includes a high frequency generator i.e. the HPF unit 64 for generating the high frequency component from the frequency components each having the frequency band obtained by the frequency division processing by the frequency divider. The noise remover i.e. the noise removing unit 66 performs a coring processing with respect to the high frequency component e.g. the high-frequency image 6432 generated by the high frequency generator. Then, the degree of removing the noise component in the noise component removal processing is changed by weight-averaging the high frequency component e.g. the high-frequency image 6632 after the coring processing is performed, and the high frequency component e.g. the high-frequency image 6432 before the coring processing is performed, using the edge preservation information.

In the above arrangement, the degree of removing the noise component in the noise component removal processing is changed by weigh-averaging the high frequency component after the coring processing is performed, and the high frequency component before the coring processing is performed, using the edge preservation information. This enables to realize the arrangement of changing the degree of removing the noise component in a simplified construction.

Preferably, the image processor 6a i.e. the edge preserving section isolates the edge component from the high frequency component, based on the edge preservation information calculated by the edge preservation information calculator i.e. the edge detecting unit 65', and causes the adding unit A to add the edge component isolated from the high frequency component, to the high frequency component whose noise component is removed by the noise remover i.e. the noise removing unit 66', after the edge component is isolated from the high frequency component. Thereby, the edge component in the high frequency component is preserved.

In the above arrangement, after the edge component is isolated from the high frequency component, the noise component is removed from the high frequency component. This enables to remove the noise component more finely, without likelihood that the edge component may be erroneously detected as the noise component in the noise component removal processing, and enables to preserve the edge component in the high frequency component by synthesizing the high frequency component after the noise component removal, and the isolated edge component. This enables to more finely preserve the edge component without likelihood that the noise component may be erroneously detected as the edge component in the edge component preservation processing.

Preferably, the image processor 6a further includes a high frequency generator i.e. the HPF unit 64 for generating the high frequency component from the frequency components each having the frequency band obtained by the frequency division processing by the frequency divider i.e. the frequency divider 61. The edge preserving section i.e. the image processor 6a isolates the edge component from the high frequency component in the high frequency generation processing by the high frequency generator by: generating an edge-preserved low-frequency component e.g. the edge-preserved low-frequency image 6532' whose edge component is preserved by weight-averaging the low frequency component e.g. the low-frequency image 6232' generated by the LPF processing by the low frequency generator i.e. the LPF unit 62, and the frequency component before the LPF processing is performed e.g. the input image 6431', using the edge preservation information; and generating the high frequency component e.g. the high-frequency image 6432' by subtracting the edge-preserved low-frequency component e.g. the edge-preserved low-frequency component 6532' from the frequency component before the LPF processing is performed e.g. the input image 6431' in the high frequency generation processing.

In the above arrangement, the edge component is isolated from the high frequency component by generating the high frequency component by subtracting the edge-preserved low-frequency component obtained by weight-averaging the low frequency component generated by the LPF processing, and the frequency component before the LPF processing is performed, using the edge preservation information, from the frequency component before the LPF processing is performed in the high frequency generation processing. This enables to realize the arrangement of isolating the edge component from the high frequency component in a simplified construction, thereby allowing for easy preservation of the edge component in the high frequency component.

Preferably, the noise remover i.e. the noise removing unit 66, 66', or the first through the third coring sections 891 through 893 removes the noise component by the coring processing. This enables to simplify the noise component removal processing or the noise component removal control, and to easily control the noise removal amount, using the information relating to a threshold value i.e. the coring coefficients "th" and "−th".

Preferably, the frequency divider divides the input image into the frequency components each having the frequency band by repeating, a predetermined multiple number of times, a processing of: dividing the input image i.e. the input image IN into the high frequency component e.g. the H-image, or the HH-image, the HL-image and the LH-image obtained by the first subband divider D1, and the low frequency component e.g. the L-image or the LL-image, using a Wavelet transformation; and dividing the low frequency component e.g. the LL-image isolated from the high frequency component e.g. the HH-image, the HL-image, and the LH-image into a high frequency component e.g. the H-image, or the HH-image, the HL-image and the LH-image, and a low frequency component e.g. the L-image or the LL-image in the succeeding processing step.

In the above arrangement, the input image can be divided into the frequency components each having the corresponding frequency band, using the Wavelet transformation theoretically free of image degradation. Thereby, a high-quality image can be obtained. Also, use of the Wavelet transformation is advantageous in simplifying the arrangement of the image processor 6b.

Preferably, the noise remover i.e. the first through the third coring sections 891 through 893, or the NR unit 89 removes the noise component by the coring processing. The edge preserving section i.e. the image processor 6b, or the NR unit 89 preserves the edge component in the high frequency component i.e. the HH-image, the HL-image, and the LH-image to be inputted to the NR unit 89 shown in FIG. 21 in the coring processing, using the noise remover. The edge preserving section preserves the edge component in the high frequency component by changing the coring degree to be used in the coring processing, based on the edge preservation information i.e. the edge preservation coefficient E calculated by the edge preservation information calculator i.e. the coring weighting coefficient calculator 894.

In the above arrangement, the edge component in the high frequency component is preserved by changing the coring degree to be used in performing the coring processing, based on the edge preservation information. This enables to efficiently preserve the edge component in the high frequency component, utilizing the coring processing.

Preferably, the noise remover i.e. the first through the third coring sections 891 through 893 changes the coring degree to be used in performing the coring processing by changing the coring coefficient depending on the coring level information obtained by multiplying with the weighting coefficient i.e. the coring weighting coefficient relating to the coring degree by the multipliers 897 and 898, based on the edge preservation information i.e. the edge preservation coefficient E, i.e. depending on the coring level information obtained by multiplying the coring level set by the first and the second coring level setters 895 and 896, with the coring weighting coefficient.

In the above arrangement, the coring degree is changed by changing the coring coefficient depending on the coring level information obtained by multiplying with the weighting coefficient relating to the coring degree based on the edge preservation information. This enables to realize the arrangement of changing the coring degree in a simplified construction.

Preferably, the noise remover i.e. the noise removing unit 66, 66', or the first through the third coring sections 891 through 893 is so configured as to change the graphical gradient "k" of the coring coefficients "–th" through "th" of the coring characteristic 666 in the coring processing.

In the above arrangement, it is possible to adjust the coring characteristic by changing the graphical gradient of the coring coefficients of the coring characteristic in the coring processing. This enables to prevent likelihood that a certain pixel whose absolute value is e.g. smaller than the coring coefficient "th" (pixels values in the range "th" through "–th") may be removed without an exception, with the result that a detail component relating to the texture of the image may be removed. In other words, the arrangement enables to obtain a proper image according to needs, in which removal of a detail component in the image is suppressed, with a negligibly small noise being allowed to remain in the image.

Preferably, the edge preservation information is an edge preservation coefficient E which is changed as follows. If the edge intensity of the low frequency component is larger than the predetermined threshold value "e2", the edge preservation coefficient E is set to a predetermined maximal value e.g. 1.0; if the edge intensity is smaller than the predetermined threshold value "e1" smaller than the threshold value "e2", the edge preservation coefficient E is set to a predetermined minimal value e.g. 0; and if the edge intensity is not smaller than the threshold value "e1" and not larger than the threshold value "e2", the edge preservation coefficient E is set to a value between the minimal value and the maximal value depending on the edge intensity.

In the above arrangement, the edge preservation coefficient is given in such a simplified manner that if the edge intensity of the low frequency component is larger than the threshold value "e2", the edge preservation information is set to the predetermined maximal value; if the edge intensity is smaller than the threshold value "e1", the edge preservation information is set to the predetermined minimal value; and if the edge intensity is not smaller than the threshold value "e1" and not larger than the threshold value "e2", the edge preservation information is set to any value between the minimal value and the maximal value. This makes it easy to perform the edge preservation processing, using the edge preservation coefficient.

Preferably, the input image is a wide dynamic range image. This enables to perform an image processing with respect to the wide dynamic range image with improved noise removal performance and improved edge preservation performance. The same advantage is also applied to the image processing method and the image sensing apparatus to be described below.

In the image processing method according to the first through the third embodiment, in the frequency dividing step, an input image is divided into a plurality of frequency components each having a frequency band; and in a noise component removing step, a noise component is removed from a high frequency component in the frequency components each having the frequency band obtained in the frequency dividing step. Then, in an edge preservation information calculating step, an edge intensity is detected based on a low frequency component in the frequency components each having the frequency band obtained in the frequency dividing step, and edge preservation information relating to a degree of preserving an edge component is calculated based on the detected edge intensity. Then, in an edge preserving step, the edge component in the high frequency component is preserved, based on the edge preservation information calculated in the edge preservation information calculating step; and in a frequency synthesizing step, the high frequency component whose noise component is removed in the noise component removing step and whose edge component is preserved in the edge preserving step, and the low frequency component is synthesized in each of the frequency bands.

In the above arrangement, the input image is divided into the frequency components each having the corresponding frequency band in the frequency dividing step, and the noise component is removed from the high frequency component in the frequency components each having the corresponding frequency band obtained in the frequency dividing step. Thus, since the noise component is removed with respect to each of the frequency bands e.g. depending on the noise removal amount set in each of the frequency bands, the noise component can be removed finely. Then, the edge intensity is detected based on the low frequency component in the frequency components each having the corresponding frequency band, and the edge preservation information relating to the degree of preserving the edge component is calculated, based on the detected edge intensity. In other words, the edge intensity is detected in each of the frequency bands, and the edge preservation information is determined based on the detected edge intensity. Thus, the edge preservation information is determined by detecting the edge intensity based on the low frequency with less likelihood of noise component residuals, in place of using the high frequency component. This enables to preserve the edge component finely, without likelihood that the edge component may be erroneously detected and preserved as the noise component. Thereby, even if the input image is a wide dynamic range image, image processing with improved noise removal performance and improved edge preservation performance can be performed, thereby enabling to obtain a high-quality image.

In the image sensing apparatus according to the first through the third embodiments i.e. the digital camera 1, 1a, 1b, the image sensor 3, as the image sensing section of the claimed invention, performs a wide dynamic range imaging; a frequency divider divides a wide dynamic range image acquired by the image sensing section into a plurality of frequency components each having a frequency band; and a noise remover removes a noise component from a high frequency component in the frequency components each having the frequency band obtained by the frequency division processing by the frequency divider. Then, an edge preservation information calculator detects an edge intensity based on a low frequency component in the frequency components each having the frequency band obtained by the frequency division processing by the frequency divider, and calculates edge preservation information relating to a degree of preserving an edge component based on the detected edge intensity. Then, an edge preserving section preserves the edge component in the high frequency component, based on the edge preservation information calculated by the edge preservation information calculator, and a frequency synthesizer synthesizes the high frequency component whose noise component is removed by the noise remover and whose edge component is preserved by the edge preserving section, and the low frequency component, in each of the frequency bands.

In the above arrangement, the wide dynamic range image acquired by the image sensing section is divided into the frequency components each having the corresponding frequency band, and the noise component is removed from the high frequency component in the frequency components each having the corresponding frequency band obtained by the frequency division processing by the frequency divider. In other words, since the noise component is removed in each of the frequency bands e.g. depending on the noise removal amount set in each of the frequency bands, the noise component can be removed finely. Then, the edge intensity is detected based on the low frequency component in the frequency components each having the corresponding frequency band, and the edge preservation information relating to the degree of preserving the edge component is calculated based on the detected edge intensity. In other words, the edge intensity is detected in each of the frequency bands, and the edge preservation information is determined based on the detected edge intensity. Thus, the edge preservation information is determined by detecting the edge intensity based on the low frequency with less likelihood of noise component residuals, in place of using the high frequency component. Thereby, the edge component can be preserved finely, without likelihood that the edge component may be erroneously detected and preserved as the noise component. This enables to perform an image processing with respect to the wide dynamic range image with improved noise removal performance and improved edge preservation performance, thereby enabling to obtain a high-quality image.

Preferably, the image sensing section includes the image sensor 3 which generates an electric signal commensurate with an incident light amount, and which has a photoelectric conversion characteristic including a linear characteristic area where the electric signal is linearly transformed and outputted in accordance with the incident light amount, and a logarithmic characteristic area where the electric signal is logarithmically transformed and outputted in accordance with the incident light amount.

In the above arrangement, since the image sensor 3 is capable of logarithmically transforming and outputting the electric signal in accordance with the incident light amount, a wide dynamic range image can be easily obtained by using the image sensor 3.

The image processing device according to the first through the third embodiments i.e. the image processor 6, 6a, 6b may have the following arrangement. Specifically, the image processing device includes: a frequency divider for performing a frequency division processing of dividing an input image into a plurality of frequency components each having a frequency band; a noise remover for performing a noise component removal processing of removing a noise component from a high frequency component in the frequency components each having the frequency band obtained by the frequency division processing by the frequency divider; an edge preservation information calculator for detecting an edge intensity based on a low frequency component in the frequency components each having the frequency band obtained by the frequency division processing by the frequency divider, and calculating edge preservation information relating to a degree of preserving an edge component based on the detected edge intensity; an edge preserving section for preserving the edge component in the high frequency component, based on the edge preservation information calculated by the edge preservation information calculator; and a frequency synthesizer for synthesizing the high frequency component whose noise component is removed by the noise remover and whose edge component is preserved by the edge preserving section, and a reprocessed low frequency component obtained by performing the processing by the frequency divider, the noise remover, the edge preservation information calculator, and the edge preserving section with respect to the low frequency component again, in each of the frequency bands.

Preferably, the frequency divider includes: a low frequency generator for generating the low frequency component by performing a low-pass filter processing; and a downsampler for performing a downsampling processing with respect to the low frequency component generated by the low frequency generator, and the frequency divider divides the input image into the frequency components each having the frequency band by performing the low-pass filter processing by the low frequency generator, and the downsampling processing by the downsampler with respect to the input image.

Preferably, the processing of obtaining the reprocessed low frequency component is performed a predetermined multiple number of times, and the frequency generator exclusively performs the low-pass filter processing in a last one of the multiple times.

The invention can take the following modifications.

(A) In the embodiments, a linear-logarithmic sensor having a photoelectric conversion characteristic including a linear characteristic in a low luminance area, and a logarithmic or linear-logarithmic characteristic in a high luminance area is used as the image sensor 3 which has the different photoelectric conversion characteristics and is capable of performing a wide dynamic range imaging. Alternatively, there may be used a sensor which has a linear photoelectric conversion characteristic both in the low luminance area and the high luminance area i.e. a first linear characteristic and a second linear characteristic; and has a feature that a graphical gradient in each of the linear characteristics is changed depending on the luminance level. Further alternatively, there may be used an image sensor having three or more different photoelectric conversion characteristics, in place of the two different photoelectric conversion characteristics i.e. the linear characteristic and the logarithmic characteristic, or the first linear characteristic and the second linear characteristic. Further alternatively, there may be used an image sensor that enables to obtain a wide dynamic range image by acquiring an image in a high luminance area and an image in a low luminance area by a one-time imaging operation i.e. a one-time exposure operation, and by synthesizing these two images. To summarize, as far as the image sensor is capable of acquiring an image having a wide dynamic range, any image sensor can be used. In the embodiments, the image acquired by the image sensor 3 is used as the wide dynamic range image to be inputted to the image processor 6, 6a, 6b. Alternatively, any wide dynamic range image other than the image acquired by the image sensor 3 can be used. It is needless to say, however, that the image processor 6, 6a, 6b is operative to perform an image processing with respect to an ordinary image other than the wide dynamic range image, in addition to the operation of receiving the wide dynamic range image, and performing the aforementioned processing with respect to the wide dynamic range image.

(B) In the first and the second embodiments, the processing step number and the tap number of the LPF are respectively set to the predetermined values e.g. 4 (n=4) and 7 (filter size is 7×7). Alternatively, a noise detector for detecting a noise amount in each of the processing steps may be provided so that the processing steps are repeated i.e. the processing step number is increased until the detected noise amount is equal to or smaller than a predetermined threshold value.

(C) In the embodiments, the image processor 6, 6a, 6b in the digital camera 1, 1a, 1b performs various processing relating to noise removal with respect to a sensed image e.g. frequency division processing, synthesis processing, coring processing, and edge preservation processing. Alternatively, the various processing may be performed by a processor other than the digital camera. Specifically, the various processing may be performed by a host processor provided with a user interface (UI) e.g. a personal computer or a PDA (Personal Digital Assistant), which is directly and wiredly connected to the digital camera 1 using e.g. a USB, or which is wirelessly connected to a network system by e.g. a wireless LAN, or which is so configured as to transmit information using a storage medium such as a memory card.

The foregoing embodiments and/or modifications primarily include the inventions having the following arrangements.

An image processing device according to an aspect comprises: a frequency divider for performing a frequency division processing of dividing an input image into a plurality of frequency components each having a frequency band; a noise remover for performing a noise component removal processing of removing a noise component from a high frequency component in the frequency components each having the frequency band obtained by the frequency division processing by the frequency divider; an edge preservation information calculator for detecting an edge intensity based on a low frequency component in the frequency components each having the frequency band obtained by the frequency division processing by the frequency divider, and calculating edge preservation information relating to a degree of preserving an edge component based on the detected edge intensity; an edge preserving section for preserving the edge component in the high frequency component, based on the edge preservation information calculated by the edge preservation information calculator; and a frequency synthesizer for synthesizing the high frequency component whose noise component is removed by the noise remover and whose edge component is preserved by the edge preserving section, and the low frequency component, in the each of the frequency bands.

Preferably, the frequency divider includes: a low frequency generator for generating the low frequency component by performing a low-pass filter processing; and a downsampler for performing a downsampling processing with respect to the low frequency component generated by the low frequency generator, and the input image is divided into the frequency components in the each of the frequency bands by repeating the low-pass filter processing by the low frequency generator, and the downsampling processing by the downsampler with respect to the input image a predetermined multiple number of times.

Preferably, the edge preserving section preserves the edge component in the high frequency component by the noise component removal processing by the noise remover by changing a degree of removing the noise component in the noise component removal processing, based on the edge preservation information calculated by the edge preservation information calculator.

Preferably, the image processing device further comprises: a high frequency generator for generating the high frequency component from the frequency components each having the frequency band obtained by the frequency division processing by the frequency divider, wherein the noise remover performs a coring processing with respect to the high frequency component generated by the high frequency generator, and changes the degree of removing the noise component in the noise component removal processing by weight-averaging the high frequency component after the coring processing is performed and the high frequency component before the coring processing is performed, using the edge preservation information.

Preferably, the edge preserving section isolates the edge component from the high frequency component as a first high frequency component, based on the edge preservation information calculated by the edge preservation information calculator; and preserves the edge component in the first high frequency component by synthesizing a second high frequency component obtained by removing the noise component from the first high frequency component by the noise remover, after the edge component is isolated from the first high frequency component, and the edge component isolated from the first high frequency component.

Preferably, the image processing device further comprises a high frequency generator for performing a high frequency generation processing of generating the high frequency component from the frequency components each having the frequency band obtained by the frequency division processing by the frequency divider, wherein the edge preserving section isolates the edge component from the high frequency component generated by the high frequency generation processing by the high frequency generator by: generating an edge-preserved low-frequency component whose edge component is preserved by weight-averaging the low frequency component generated by a low-pass filter processing by a low frequency generator, and the frequency component before the low-pass filter processing is performed, using the edge preservation information; and generating the high frequency component by subtracting the edge-preserved low-frequency component from the frequency component before the low-pass filter processing is performed in the high frequency generation processing.

Preferably, the noise remover removes the noise component by a coring processing.

Preferably, the frequency divider divides the input image into the frequency components each having the frequency band by repeating, a predetermined multiple number of times, a processing of dividing the input image into the high frequency component and the low frequency component by a Wavelet transformation, and dividing the low frequency component isolated from the high frequency component into a high frequency component and a low frequency component.

Preferably, the noise remover removes the noise component by a coring processing, and the edge preserving section preserves the edge component in the high frequency component by the coring processing, using the noise remover, and the edge preserving section preserves the edge component in the high frequency component by changing a coring degree in the coring processing, based on the edge preservation information calculated by the edge preservation information calculator.

Preferably, the noise remover changes the coring degree by changing a coring coefficient depending on coring level information obtained by multiplying with a weighting coefficient relating to the coring degree based on the edge preservation information.

Preferably, the noise remover is so configured as to change a graphical gradient of coring coefficients of a coring characteristic in the coring processing.

Preferably, the edge preservation information is an edge preservation coefficient which is changed as follows: if the edge intensity of the low frequency component is larger than a predetermined first threshold value, the edge preservation coefficient is set to a predetermined fixed maximal value; if the edge intensity is smaller than a predetermined second threshold value smaller than the first threshold value, the edge preservation coefficient is set to a predetermined fixed minimal value; and if the edge intensity is not smaller than the second threshold value and not larger than the first threshold value, the edge preservation coefficient is set to a value between the minimal value and the maximal value depending on the edge intensity.

Preferably, the input image is a wide dynamic range image.

An image processing method according to another aspect of the invention comprises: a frequency dividing step of dividing an input image into a plurality of frequency components each having a frequency band; a noise component removing step of removing a noise component from a high frequency component in the frequency components each having the frequency band obtained in the frequency dividing step; an edge preservation information calculating step of detecting an edge intensity based on a low frequency component in the frequency components each having the frequency band obtained in the frequency dividing step, and calculating edge preservation information relating to a degree of preserving an edge component based on the detected edge intensity; an edge preserving step of preserving the edge component in the high frequency component, based on the edge preservation information calculated in the edge preservation information calculating step; and a frequency synthesizing step of synthesizing the high frequency component whose noise component is removed in the noise component removing step and whose edge component is preserved in the edge preserving step, and the low frequency component, in the each of the frequency bands.

Preferably, the input image is a wide dynamic range image.

An image sensing apparatus according to yet another aspect of the invention comprises: an image sensing section so configured as to perform a wide dynamic range imaging; a frequency divider for performing a frequency division processing of dividing a wide dynamic range image acquired by the image sensing section into a plurality of frequency components in a plurality of frequency bands; a noise remover for removing a noise component from a high frequency component in the frequency components each having the frequency band obtained by the frequency division processing by the frequency divider; an edge preservation information calculator for detecting an edge intensity based on a low frequency component in the frequency components each having the frequency band obtained by the frequency division processing by the frequency divider, and calculating edge preservation information relating to a degree of preserving an edge component based on the detected edge intensity; an edge preserving section for preserving the edge component in the high frequency component, based on the edge preservation information calculated by the edge preservation information calculator; and a frequency synthesizer for synthesizing the high frequency component whose noise component is removed by the noise remover and whose edge component is preserved by the edge preserving section, and the low frequency component, in the each of the frequency bands.

Preferably, the image sensing section includes an image sensor which generates an electric signal commensurate with an incident light amount, and which has a photoelectric conversion characteristic including a linear characteristic area where the electric signal is linearly transformed and outputted in accordance with the incident light amount, and a logarithmic characteristic area where the electric signal is logarithmically transformed and outputted in accordance with the incident light amount.

Preferably, the frequency generator exclusively performs the low-pass filter processing with respect to the input image in a last one of the multiple times.

An image processing device according to still another aspect of the invention comprises: a frequency divider for performing a frequency division processing of dividing an input image into a plurality of frequency components each having a frequency band; a noise remover for performing a noise component removal processing of removing a noise component from a high frequency component in the frequency components each having the frequency band obtained by the frequency division processing by the frequency divider; an edge preservation information calculator for detecting an edge intensity based on a low frequency component in the frequency components each having the frequency band obtained by the frequency division processing by the frequency divider, and calculating edge preservation information relating to a degree of preserving an edge component based on the detected edge intensity; an edge preserving section for preserving the edge component in the high frequency component, based on the edge preservation information calculated by the edge preservation information calculator; and a frequency synthesizer for synthesizing the high frequency component whose noise component is removed by the noise remover and whose edge component is preserved by the edge preserving section, and a reprocessed low frequency component obtained by performing the processing by the frequency divider, the noise remover, the edge preservation information calculator, and the edge preserving section with respect to the low frequency component again, in the each of the frequency bands.

Preferably, the frequency divider includes: a low frequency generator for generating the low frequency component by performing a low-pass filter processing; and a downsampler for performing a downsampling processing with respect to the low frequency component generated by the low frequency generator, and the frequency divider divides the input image into the frequency components each having the frequency band by performing the low-pass filter processing by the low frequency generator, and the downsampling processing by the downsampler with respect to the input image.

Preferably, the processing of obtaining the reprocessed low frequency component is performed a predetermined multiple number of times, and the low frequency generator exclusively performs the low-pass filter processing in a last one of the multiple times.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image processing device, comprising:
    a frequency divider for performing a frequency division processing of dividing an input image into a plurality of frequency components each having a frequency band;
    a noise remover for performing a noise component removal processing of removing a noise component from a high frequency component in the frequency components of each of the frequency bands obtained by the frequency division processing by the frequency divider;
    an edge preservation information calculator for detecting an edge intensity based on a low frequency component in the frequency components of each of the frequency bands obtained by the frequency division processing by the frequency divider, and calculating edge preservation information relating to a degree of preserving an edge component based on the detected edge intensity;
    an edge preserving section for preserving the edge component in the high frequency component, based on the edge preservation information calculated by the edge preservation information calculator, in the each of the frequency bands; and
    a frequency synthesizer for synthesizing the high frequency component whose noise component is removed by the noise remover and whose edge component is preserved by the edge preserving section, and the low frequency component, in the each of the frequency bands.

2. The image processing device according to claim 1, wherein
    the frequency divider includes:
    a low frequency generator for generating the low frequency component by performing a low-pass filter processing; and
    a downsampler for performing a downsampling processing with respect to the low frequency component generated by the low frequency generator, and
    the input image is divided into the frequency components in the each of the frequency bands by repeating the low-pass filter processing by the low frequency generator, and the downsampling processing by the downsampler with respect to the input image a predetermined multiple number of times.

3. The image processing device according to claim 1, wherein
    the edge preserving section preserves the edge component in the high frequency component by the noise component removal processing by the noise remover by changing a degree of removing the noise component in the noise component removal processing, based on the edge preservation information calculated by the edge preservation information calculator.

4. The image processing device according to claim 3, further comprising:
    a high frequency generator for generating the high frequency component from the frequency components each having the frequency band obtained by the frequency division processing by the frequency divider, wherein
    the noise remover performs a coring processing with respect to the high frequency component generated by the high frequency generator, and changes the degree of removing the noise component in the noise component removal processing by weight-averaging the high frequency component after the coring processing is performed and the high frequency component before the coring processing is performed, using the edge preservation information.

5. The image processing device according to claim 4, wherein
    the noise remover is so configured as to change a graphical gradient of coring coefficients of a coring characteristic in the coring processing.

6. The image processing device according to claim 1, wherein
    the edge preservation information is an edge preservation coefficient which is changed as follows:
    if the edge intensity of the low frequency component is larger than a predetermined first threshold value, the edge preservation coefficient is set to a predetermined fixed maximal value;
    if the edge intensity is smaller than a predetermined second threshold value smaller than the first threshold value, the edge preservation coefficient is set to a predetermined fixed minimal value; and
    if the edge intensity is not smaller than the second threshold value and not larger than the first threshold value, the edge preservation coefficient is set to a value between the minimal value and the maximal value depending on the edge intensity.

7. The image processing device according to claim 1, wherein
    the input image is a wide dynamic range image.

8. An image processing method, comprising:
    a frequency dividing step of dividing an input image into a plurality of frequency components each having a frequency band;
    a noise component removing step of removing a noise component from a high frequency component in the frequency components of each of the frequency bands obtained in the frequency dividing step;
    an edge preservation information calculating step of detecting an edge intensity based on a low frequency component in the frequency components of each of the frequency bands obtained in the frequency dividing step, and calculating edge preservation information relating to a degree of preserving an edge component based on the detected edge intensity;

an edge preserving step of preserving the edge component in the high frequency component, based on the edge preservation information calculated in the edge preservation information calculating step, in the each of the frequency bands; and a frequency synthesizing step of synthesizing the high frequency component whose noise component is removed in the noise component removing step and whose edge component is preserved in the edge preserving step, and the low frequency component, in the each of the frequency bands.

9. The image processing method according to claim 8, wherein
the input image is a wide dynamic range image.

10. An image sensing apparatus, comprising:
an image sensing section so configured as to perform a wide dynamic range imaging;
a frequency divider for performing a frequency division processing of dividing a wide dynamic range image acquired by the image sensing section into a plurality of frequency components in a plurality of frequency bands;
a noise remover for removing a noise component from a high frequency component in the frequency components of each of the frequency bands obtained by the frequency division processing by the frequency divider;
an edge preservation information calculator for detecting an edge intensity based on a low frequency component in the frequency components of each of the frequency bands obtained by the frequency division processing by the frequency divider, and calculating edge preservation information relating to a degree of preserving an edge component based on the detected edge intensity;
an edge preserving section for preserving the edge component in the high frequency component, based on the edge preservation information calculated by the edge preservation information calculator, in the each of the frequency bands; and
a frequency synthesizer for synthesizing the high frequency component whose noise component is removed by the noise remover and whose edge component is preserved by the edge preserving section, and the low frequency component, in the each of the frequency bands.

11. The image sensing apparatus according to claim 10, wherein
the image sensing section includes an image sensor which generates an electric signal commensurate with an incident light amount, and which has a photoelectric conversion characteristic including a linear characteristic area where the electric signal is linearly transformed and outputted in accordance with the incident light amount, and a logarithmic characteristic area where the electric signal is logarithmically transformed and outputted in accordance with the incident light amount.

12. The image processing device according to claim 2, wherein
the frequency generator exclusively performs the low-pass filter processing with respect to the input image in a last one of the multiple times.

13. An image processing device, comprising:
a frequency divider for performing a frequency division processing of dividing an input image into a plurality of frequency components each having a frequency band;
a noise remover for performing a noise component removal processing of removing a noise component from a high frequency component in the frequency components of each of the frequency bands obtained by the frequency division processing by the frequency divider;
an edge preservation information calculator for detecting an edge intensity based on a low frequency component in the frequency components of each of the frequency bands obtained by the frequency division processing by the frequency divider, and calculating edge preservation information relating to a degree of preserving an edge component based on the detected edge intensity;
an edge preserving section for preserving the edge component in the high frequency component, based on the edge preservation information calculated by the edge preservation information calculator, in the each of the frequency bands; and
a frequency synthesizer for synthesizing the high frequency component whose noise component is removed by the noise remover and whose edge component is preserved by the edge preserving section, and a reprocessed low frequency component obtained by performing the processing by the frequency divider, the noise remover, the edge preservation information calculator, and the edge preserving section with respect to the low frequency component again, in the each of the frequency bands.

14. The image processing device according to claim 13, wherein
the frequency divider includes:
a low frequency generator for generating the low frequency component by performing a low-pass filter processing; and
a downsampler for performing a downsampling processing with respect to the low frequency component generated by the low frequency generator, and
the frequency divider divides the input image into the frequency components each having the frequency band by performing the low-pass filter processing by the low frequency generator, and the downsampling processing by the downsampler with respect to the input image.

15. The image processing device according to claim 14, wherein
the processing of obtaining the reprocessed low frequency component is performed a predetermined multiple number of times, and
the low frequency generator exclusively performs the low-pass filter processing in a last one of the multiple times.

16. An image processing device, comprising:
a frequency divider configured to divide an input image into a plurality of frequency bands, each of said frequency bands comprising a high frequency portion and a low frequency portion;
a noise removing system configured to remove a noise component from the high frequency portion of each of said frequency bands;
an edge preservation information calculator configured to calculate an edge intensity in each of said frequency bands on the basis of the corresponding low frequency portion thereof and edge preservation information in each of said frequency bands on the basis of the corresponding edge intensity thereof;
an edge preserving system configured to preserve an edge component in the high frequency portion of each of said frequency bands on the basis of edge preservation information; and a frequency synthesizer configured to synthesize an output image on the basis of the outputs of the noise removing system and the edge preserving system.

17. The image processing device according to claim 16, said frequency divider further comprising:
- a generator configured to generate the low frequency portion of each of said frequency bands by performing a low-pass filter processing;
- a downsampler configured to downsample the low frequency portion of each said frequency bands.

18. The image processing device according to claim 16, further comprising:
- a generator configured to generate said high frequency portion for each of said frequency bands by performing high-pass filter processing; and
- wherein said noise removing system is further configured to perform coring processing with respect to the high frequency portion of each of said frequency bands and to perform a weighted-averaging, on the basis of edge preservation information in each of said frequency bands, of the high-frequency portion before coring processing and the high frequency portion after coring processing.

19. The image processing device according to claim 16, wherein:
- said frequency divider is further configured to divide the input image in a stepwise manner, so that in step 1 the input image occupies a first frequency band that is divided into high and low frequency portions, in step 2 the low frequency portion from step 1 forms a second frequency band that is further subdivided into high and low frequency portions, and this process is repeated so that in step n the low frequency portion from step n−1 forms an nth frequency band that is further subdivided into high and low frequency portions, wherein n is a predetermined number.

20. The image processing device according to claim 1, wherein the edge preserving section isolates the edge component from the high frequency component as a first high frequency component, based on the edge preservation information calculated by the edge preservation information calculator; and preserves the edge component in the first high frequency component by synthesizing a second high frequency component obtained by removing the noise component from the first high frequency component by the noise remover, after the edge component is isolated from the first high frequency component, and the edge component isolated from the first high frequency component.

21. The image processing device according to claim 20, further comprising a high frequency generator for performing a high frequency generation processing of generating the high frequency component from the frequency components each having the frequency band obtained by the frequency division processing by the frequency divider, wherein the edge preserving section isolates the edge component from the high frequency component generated by the high frequency generation processing by the high frequency generator by: generating an edge-preserved low-frequency component whose edge component is preserved by weight-averaging the low frequency component generated by a low-pass filter processing by a low frequency generator, and the frequency component before the low-pass filter processing is performed, using the edge preservation information; and generating the high frequency component by subtracting the edge-preserved low-frequency component from the frequency component before the low-pass filter processing is performed in the high frequency generation processing.

22. The image processing device according to claim 20, wherein the noise remover removes the noise component by a coring processing.

23. The image processing device according to claim 1, wherein the frequency divider divides the input image into the frequency components each having the frequency band by repeating, a predetermined multiple number of times, a processing of dividing the input image into the high frequency component and the low frequency component by a Wavelet transformation, and dividing the low frequency component isolated from the high frequency component into a high frequency component and a low frequency component.

24. The image processing device according to claim 23, wherein the noise remover removes the noise component by a coring processing, and the edge preserving section preserves the edge component in the high frequency component by the coring processing, using the noise remover, and the edge preserving section preserves the edge component in the high frequency component by changing a coring degree in the coring processing, based on the edge preservation information calculated by the edge preservation information calculator.

25. The image processing device according to claim 24, wherein the noise remover changes the coring degree by changing a coring coefficient depending on coring level information obtained by multiplying with a weighting coefficient relating to the coring degree based on the edge preservation information.

* * * * *